United States Patent
Montalvo

(10) Patent No.: US 11,968,539 B2
(45) Date of Patent: *Apr. 23, 2024

(54) SYSTEM, METHOD, AND APPARATUS FOR PROVIDING OPTIMIZED NETWORK RESOURCES

(71) Applicant: Digital Global Systems, Inc., Tysons Corner, VA (US)

(72) Inventor: Armando Montalvo, Winter Garden, FL (US)

(73) Assignee: DIGITAL GLOBAL SYSTEMS, INC., Tysons Corner, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/526,329

(22) Filed: Dec. 1, 2023

(65) Prior Publication Data

US 2024/0107323 A1 Mar. 28, 2024

Related U.S. Application Data

(63) Continuation of application No. 18/237,970, filed on Aug. 25, 2023, now Pat. No. 11,843,953, which is a
(Continued)

(51) Int. Cl.
*H04W 16/10* (2009.01)
*H04W 24/02* (2009.01)
*H04W 24/08* (2009.01)
*H04W 28/08* (2023.01)
*H04W 72/0453* (2023.01)
*H04W 16/14* (2009.01)

(52) U.S. Cl.
CPC .......... *H04W 16/10* (2013.01); *H04W 24/02* (2013.01); *H04W 24/08* (2013.01); *H04W 28/0925* (2020.05); *H04W 28/0967* (2020.05); *H04W 72/0453* (2013.01); *H04W 16/14* (2013.01)

(58) Field of Classification Search
CPC ..... H04W 24/08; H04W 16/14; H04W 24/06; H02M 1/12; H02M 1/44; H02M 7/537
See application file for complete search history.

(56) References Cited

U.S. PATENT DOCUMENTS 6,990,087 B2  1/2006  Rao et al.
7,408,907 B2  8/2008  Diener
(Continued)

FOREIGN PATENT DOCUMENTS

CN   114173379 A   3/2022
WO   2023091664 A1  5/2023

OTHER PUBLICATIONS

Digital Global Systems, U.S. Appl. No. 18/237,970, filed Aug. 25, 2023, Non-Provisional Patent Application; Entire Document.

*Primary Examiner* — Nam T Huynh
(74) *Attorney, Agent, or Firm* — NEO IP

(57) ABSTRACT

Systems, methods, and apparatuses for providing optimization of network resources. The system is operable to monitor the electromagnetic environment, analyze the electromagnetic environment, and extract environmental awareness of the electromagnetic environment. The system extracts the environmental awareness of the electromagnetic environment by including customer goals. The system is operable to use the environmental awareness with the customer goals and/or user defined policies and rules to extract actionable information to help the customer optimize the network resources.

17 Claims, 81 Drawing Sheets

Related U.S. Application Data continuation-in-part of application No. 18/086,115, filed on Dec. 21, 2022, now Pat. No. 11,751,064, said application No. 18/085,791 is a continuation of application No. 18/085,733, filed on Dec. 21, 2022, now Pat. No. 11,711,726, said application No. 18/085,904 is a continuation of application No. 18/085,791, filed on Dec. 21, 2022, now Pat. No. 11,659,400, said application No. 18/086,115 is a continuation-in-part of application No. 18/085,904, filed on Dec. 21, 2022, now Pat. No. 11,659,401, said application No. 18/085,733 is a continuation-in-part of application No. 17/901,035, filed on Sep. 1, 2022, now Pat. No. 11,570,627.

(60) Provisional application No. 63/370,184, filed on Aug. 2, 2022.

(56) References Cited

U.S. PATENT DOCUMENTS

| | | |
|---|---|---|
| 7,471,654 B2 | 12/2008 | Mueckenheim et al. |
| 8,229,368 B1 | 7/2012 | Immendorf et al. |
| 8,254,393 B2 | 8/2012 | Horvitz |
| 8,675,781 B2 | 3/2014 | Adnani et al. |
| 8,744,466 B2 | 6/2014 | Hirano et al. |
| 8,886,794 B2 | 11/2014 | Adnani et al. |
| 8,972,311 B2 | 3/2015 | Srikanteswara et al. |
| 9,197,260 B2 | 11/2015 | Adnani et al. |
| 9,246,576 B2 | 1/2016 | Yanai et al. |
| 9,338,685 B2 | 5/2016 | Saghir et al. |
| 9,350,404 B2 | 5/2016 | Adnani et al. |
| 9,356,727 B2 | 5/2016 | Immendorf et al. |
| 9,408,210 B2 | 8/2016 | Pikhletsky et al. |
| 9,439,078 B2 | 9/2016 | Menon et al. |
| 9,538,528 B2 | 1/2017 | Wagner et al. |
| 9,572,055 B2 | 2/2017 | Immendorf et al. |
| 9,578,516 B2 | 2/2017 | Liu et al. |
| 9,635,669 B2 | 4/2017 | Gormley et al. |
| 9,674,836 B2 | 6/2017 | Gormley et al. |
| 9,686,789 B2 | 6/2017 | Gormley et al. |
| 9,749,902 B2 | 8/2017 | Horn et al. |
| 9,769,834 B2 | 9/2017 | Immendorf et al. |
| 9,819,441 B2 | 11/2017 | Immendorf et al. |
| 9,900,899 B2 | 2/2018 | Jiang et al. |
| 9,923,700 B2 | 3/2018 | Gormley et al. |
| 9,942,775 B2 | 4/2018 | Yun et al. |
| 10,051,518 B2 | 8/2018 | Horn et al. |
| 10,070,444 B2 | 9/2018 | Markwart et al. |
| 10,104,559 B2 | 10/2018 | Immendorf et al. |
| 10,194,324 B2 | 1/2019 | Yun et al. |
| 10,349,309 B2 | 7/2019 | Horn et al. |
| 10,356,661 B2 | 7/2019 | Horn et al. |
| 10,389,616 B2 | 8/2019 | Ryan et al. |
| 10,402,689 B1 | 9/2019 | Bogdanovych et al. |
| 10,405,159 B2 | 9/2019 | Dauneria et al. |
| 10,432,798 B1 | 10/2019 | Wong et al. |
| 10,477,342 B2 | 11/2019 | Williams |
| 10,506,543 B1 | 12/2019 | Edge et al. |
| 10,536,210 B2 | 1/2020 | Zhao et al. |
| 10,541,712 B1 | 1/2020 | Ayala et al. |
| 10,582,401 B2 | 3/2020 | Mengwasser et al. |
| 10,592,683 B1 | 3/2020 | Lim et al. |
| 10,605,890 B1 | 3/2020 | Yun et al. |
| 10,700,721 B2 | 6/2020 | Ayala et al. |
| 10,701,217 B2 | 6/2020 | Wong et al. |
| 10,701,574 B2 | 6/2020 | Gormley et al. |
| 10,784,974 B2 | 9/2020 | Menon |
| 10,812,992 B1 | 10/2020 | Tran et al. |
| 10,813,102 B2 | 10/2020 | Yun et al. |
| 10,917,797 B2 | 2/2021 | Menon et al. |
| 10,952,178 B2 | 3/2021 | Edge et al. |
| 10,959,203 B2 | 3/2021 | Edge et al. |
| 11,012,340 B2 | 5/2021 | Ryan et al. |
| 11,018,784 B2 | 5/2021 | Ryan et al. |
| 11,018,957 B1 | 5/2021 | Ezra et al. |
| 11,019,514 B2 | 5/2021 | Ayala et al. |
| 11,032,014 B2 | 6/2021 | O'Shea et al. |
| 11,035,972 B2 | 6/2021 | Colombo et al. |
| 11,096,036 B2 | 8/2021 | Poornachandran et al. |
| 11,101,903 B2 | 8/2021 | Yun |
| 11,115,336 B2 | 9/2021 | Sabella et al. |
| 11,153,762 B1 | 10/2021 | Routt |
| 11,190,946 B1 | 11/2021 | Montalvo |
| 11,202,206 B2 | 12/2021 | Taneja et al. |
| 11,259,189 B2 | 2/2022 | Montalvo et al. |
| 11,272,372 B2 | 3/2022 | Montalvo et al. |
| 11,277,161 B2 | 3/2022 | Ayala et al. |
| 11,277,750 B2 | 3/2022 | Montalvo et al. |
| 11,277,751 B2 | 3/2022 | Montalvo |
| 11,284,267 B2 | 3/2022 | Montalvo et al. |
| 11,310,676 B2 | 4/2022 | Gormley et al. |
| 11,349,582 B2 | 5/2022 | Yun et al. |
| 11,394,475 B1 | 7/2022 | Vaca et al. |
| 11,395,149 B2 | 7/2022 | Montalvo |
| 11,412,033 B2 | 8/2022 | Ganguli et al. |
| 11,540,295 B2 | 12/2022 | Yun et al. |
| 11,570,627 B1 | 1/2023 | Montalvo |
| 11,616,279 B2 | 3/2023 | Brunette et al. |
| 11,638,160 B2 | 4/2023 | Montalvo et al. |
| 11,653,213 B2 | 5/2023 | Montalvo |
| 11,659,400 B1 | 5/2023 | Montalvo |
| 11,659,401 B1 | 5/2023 | Montalvo |
| 11,665,547 B2 | 5/2023 | Montalvo |
| 11,683,695 B1 | 6/2023 | Montalvo |
| 11,700,533 B2 | 7/2023 | Montalvo |
| 11,711,726 B1 | 7/2023 | Montalvo |
| 11,751,064 B2 | 9/2023 | Montalvo |
| 2004/0028003 A1 | 2/2004 | Diener et al. |
| 2012/0120887 A1 | 5/2012 | Deaton et al. |
| 2013/0315112 A1 | 11/2013 | Gormley et al. |
| 2013/0331114 A1 | 12/2013 | Gormley et al. |
| 2014/0185580 A1 | 7/2014 | Fang et al. |
| 2014/0204766 A1 | 7/2014 | Immendorf et al. |
| 2014/0206279 A1 | 7/2014 | Immendorf et al. |
| 2014/0206343 A1 | 7/2014 | Immendorf et al. |
| 2014/0301216 A1 | 10/2014 | Immendorf et al. |
| 2014/0302796 A1 | 10/2014 | Gormley et al. |
| 2014/0335879 A1 | 11/2014 | Immendorf et al. |
| 2015/0016429 A1 | 1/2015 | Menon et al. |
| 2015/0215794 A1 | 7/2015 | Gormley et al. |
| 2015/0215949 A1 | 7/2015 | Gormley et al. |
| 2015/0245374 A1 | 8/2015 | Mitola et al. |
| 2015/0289265 A1 | 10/2015 | Gormley et al. |
| 2015/0296386 A1 | 10/2015 | Menon et al. |
| 2015/0350914 A1 | 12/2015 | Baxley et al. |
| 2016/0050690 A1 | 2/2016 | Yun et al. |
| 2016/0366685 A1 | 12/2016 | Gormley et al. |
| 2017/0041802 A1 | 2/2017 | Sun et al. |
| 2017/0064564 A1 | 3/2017 | Yun et al. |
| 2017/0148467 A1 | 5/2017 | Franklin et al. |
| 2017/0187450 A1 | 6/2017 | Jalali |
| 2017/0238201 A1 | 8/2017 | Gormley et al. |
| 2017/0245280 A1 | 8/2017 | Yi et al. |
| 2017/0280411 A1 | 9/2017 | Noonan |
| 2018/0070362 A1 | 3/2018 | Ryan et al. |
| 2018/0295607 A1 | 10/2018 | Lindoff et al. |
| 2018/0316627 A1 | 11/2018 | Cui et al. |
| 2018/0324595 A1 | 11/2018 | Shima |
| 2018/0352441 A1 | 12/2018 | Zheng et al. |
| 2018/0376006 A1 | 12/2018 | Russell et al. |
| 2019/0129407 A1 | 5/2019 | Cella et al. |
| 2019/0199756 A1 | 6/2019 | Correnti et al. |
| 2019/0339688 A1 | 11/2019 | Cella et al. |
| 2019/0342202 A1 | 11/2019 | Ryan et al. |
| 2020/0007249 A1 | 1/2020 | Derr et al. |
| 2020/0036459 A1 | 1/2020 | Menon |
| 2020/0059800 A1 | 2/2020 | Menon et al. |
| 2020/0081484 A1 | 3/2020 | Lee et al. |
| 2020/0145032 A1 | 5/2020 | Ayala et al. |
| 2020/0145852 A1 | 5/2020 | Ayala et al. |
| 2020/0153467 A1 | 5/2020 | Ayala et al. |
| 2020/0153535 A1 | 5/2020 | Kankanamge et al. |

(56) References Cited

U.S. PATENT DOCUMENTS

| | | |
|---|---|---|
| 2020/0186265 A1 | 6/2020 | Yun |
| 2020/0187213 A1 | 6/2020 | Yun et al. |
| 2020/0213006 A1 | 7/2020 | Graham et al. |
| 2020/0217882 A1 | 7/2020 | Lee et al. |
| 2020/0336228 A1 | 10/2020 | Ryan et al. |
| 2020/0344619 A1 | 10/2020 | Gormley et al. |
| 2020/0383127 A1 | 12/2020 | Zhu et al. |
| 2020/0412749 A1 | 12/2020 | Rollet |
| 2021/0045127 A1 | 2/2021 | Yun et al. |
| 2021/0092647 A1 | 3/2021 | Yang et al. |
| 2021/0112436 A1 | 4/2021 | Hoffner et al. |
| 2021/0176613 A1 | 6/2021 | Purkayastha et al. |
| 2021/0182283 A1 | 6/2021 | Carney et al. |
| 2021/0194912 A1 | 6/2021 | Ward et al. |
| 2021/0203576 A1 | 7/2021 | Padfield et al. |
| 2021/0227427 A1 | 7/2021 | Mishra et al. |
| 2021/0266716 A1 | 8/2021 | Dowlatkhah et al. |
| 2021/0274412 A1 | 9/2021 | Dowlatkhah et al. |
| 2021/0288731 A1 | 9/2021 | Yun et al. |
| 2021/0289376 A1 | 9/2021 | Chou et al. |
| 2021/0390329 A1 | 12/2021 | Ren et al. |
| 2021/0392503 A1 | 12/2021 | Montalvo et al. |
| 2021/0409959 A1 | 12/2021 | Montalvo et al. |
| 2022/0158676 A1 | 5/2022 | Adnani et al. |
| 2022/0167182 A1 | 5/2022 | Ramamurthi et al. |
| 2022/0201525 A1 | 6/2022 | Adnani |
| 2022/0201556 A1 | 6/2022 | Yang et al. |
| 2022/0210688 A1 | 6/2022 | Baglin et al. |
| 2022/0254369 A1 | 8/2022 | Ryu et al. |
| 2022/0346029 A1 | 10/2022 | Al-Mufti et al. |
| 2022/0353732 A1 | 11/2022 | Filippou et al. |
| 2023/0086899 A1 | 3/2023 | Banjade et al. |
| 2023/0090727 A1 | 3/2023 | Yun et al. |
| 2023/0110731 A1 | 4/2023 | Montalvo et al. |
| 2023/0199523 A1 | 6/2023 | Adnani |

Traditional Base Station with RRH

Centralized RAN with multiple RRHs

Disaggregated RAN

| Plane | ID | Name | Contents | Periodicity |
|---|---|---|---|---|
| U-Plane | 1a | DL Frequency Domain IQ Data | DL user data (PDSCH), control channel data (PDCCH, etc.) | symbol |
| | 1b | UL Frequency Domain IQ Data | UL user data (PUSCH), control channel data (PUCCH, etc.) | symbol |
| | 1c | PRACH Frequency Domain IQ Data | UL PRACH data | slot or symbol |
| C-Plane | 2a | Scheduling Commands (Beamforming is not supported) | Scheduling information, FFT size, CP length, Subcarrier spacing, UL PRACH scheduling | ~ slot |
| S-Plane | S | Timing and Synchronization | IEEE 1588 PTP packets | |

FIG. 16

Front Haul Interface Latency (numerology 3 – mmWave)

| | Model Parameters | C-Plane | | U-Plane | | |
|---|---|---|---|---|---|---|
| | | DL | UL | DL | UL | |
| O-RU | T2amin | T2a_min_cp_dl=50 | T2a_min_cp_ul=50 | T2a_min_up=25 | NA | |
| | T2amax | T2a_max_cp_dl=140 | T2a_max_cp_ul=140 | T2a_max_up=140 | NA | |
| | | Tadv_cp_dl | NA | NA | NA | |
| | Ta3min | NA | NA | NA | NA | Ta3_min=20 |
| | Ta3max | NA | NA | NA | NA | Ta3_max=32 |
| O-DU | T1amin | T1a_min_cp_dl=70 | T1a_min_cp_ul=60 | T1a_min_up=35 | NA | |
| | T1amax | T1a_max_cp_dl=100 | T1a_max_cp_ul=70 | T1a_max_up=50 | NA | |
| | Ta4min | NA | NA | NA | NA | Ta4_min=0 |
| | Ta4max | NA | NA | NA | NA | Ta4_max=45 |

FIG. 19

Front Haul Interface Latency (numerology 0 – Sub6)

|  | Model Parameters | C-Plane | U-Plane | | |
|---|---|---|---|---|---|
|  |  | DL | UL | DL | UL |
| O-RU | T2amin | T2a_min_cp_dl=400 | T2a_min_cp_ul=400 | T2a_min_up=200 | NA |
|  | T2amax | T2a_max_cp_dl=1120 | T2a_max_cp_ul=1120 | T2a_max_up=1120 | NA |
|  |  | Tadv_cp_dl | NA | NA | NA |
|  | Ta3min | NA | NA | NA | Ta3_min=160 |
|  | Ta3max | NA | NA | NA | Ta3_max=256 |
| O-DU | T1amin | T1a_min_cp_dl=560 | T1a_min_cp_ul=480 | T1a_min_up=280 | NA |
|  | T1amax | T1a_max_cp_dl=800 | T1a_max_cp_ul=560 | T1a_max_up=400 | NA |
|  | Ta4min | NA | NA | NA | Ta4_min=0 |
|  | Ta4max | NA | NA | NA | Ta4_max=360 |

FIG. 20

Front Haul Interface Latency (numerology 1 – Sub6)

| | Model Parameters | C-Plane | | U-Plane | | | |
|---|---|---|---|---|---|---|---|
| | | DL | UL | DL | UL | DL | UL |
| O-RU | T2amin | T2a_min_cp_dl=285 | T2a_min_cp_ul=285 | T2a_min_up=71 | | | |
| | T2amax | T2a_max_cp_dl=429 | T2a_max_cp_ul=429 | T2a_max_up=428 | | | |
| | | Tadv_cp_dl | | | | | |
| | Ta3min | NA | NA | NA | NA | Ta3_min=20 | |
| | Ta3max | NA | NA | NA | NA | Ta3_max=32 | |
| O-DU | T1amin | T1a_min_cp_dl=285 | T1a_min_cp_ul=285 | T1a_min_up=96 | | NA | |
| | T1amax | T1a_max_cp_dl=429 | T1a_max_cp_ul=300 | T1a_max_up=196 | | NA | |
| | Ta4min | NA | NA | NA | NA | Ta4_min=0 | |
| | Ta4max | NA | NA | NA | NA | Ta4_max=75 | |

| Preamble (8 Bytes) | Destination MAC Address (6 Bytes) | Source MAC Address (6 Bytes) | VLAN Tag (4 Bytes) | Type/Length (Ethertype) (2 Bytes) | Payload (42 ... 1500 Bytes) | FCS (4 Bytes) | IFG (12 Bytes) |
|---|---|---|---|---|---|---|---|

FIG. 26

Section Type: any

| Octet | 0 (msb) | 1 | 2 | 3 | 4 | 5 | 6 | 7 (lsb) | # of bytes |
|---|---|---|---|---|---|---|---|---|---|
| Octet 1 | ecpriVersion | | | | | ecpriReserved | | ecpriConcatenation | 1 |
| Octet 2 | ecpriMessage | | | | | | | | 1 |
| Octet 3 | ecpriPayload | | | | | | | | 2 |
| Octet 5 | ecpriRtcid/ecpriPcid | | | | | | | | 2 |
| Octet 7 | ecpriSeqid | | | | | | | | 2 |

FIG. 27

| 0 (msb) | 1 | 2 | 3 | 4 | 5 | 6 | 7 | 8 | 9 | 10 | 11 | 12 | 13 | 14 | 15 (lsb) | Number of Octets |
|---|---|---|---|---|---|---|---|---|---|---|---|---|---|---|---|---|
| CU_Port_ID | | | | BandSector_ID | | | | CC_ID | | | | RU_Port_ID | | | | 2 |

| Section Type 1,3: DL/UL IQ Data Messages ||||||||| # of bytes | Octet |
| 0 (msb) | 1 | 2 | 3 | 4 | 5 | 6 | 7 (lsb) | | |
|---|---|---|---|---|---|---|---|---|---|
| transport header, see xRAN specification section 3.13 ||||||||  8 | Octet 1 |
| dataDirection | payloadVersion || filterIndex |||| | 1 | Octet 9 |
| frameID |||||||| 1 | Octet 10 |
| subframeID ||| slotID ||||| 1 | Octet 11 |
| slotID ||| symbolId ||||| 1 | Octet 12 |
| sectionID |||||||| 1 | Octet 13 |
| sectionID ||| rb | syminc | startPrbu ||| 1 | Octet 14 |
| startPrbu |||||||| 1 | Octet 15 |
| numPrbu |||||||| 1 | Octet 16 |
| udCompHdr (not always present) |||||||| 1 | Octet 17 |
| reserved (not always present) |||||||| 1 | Octet 18 |
| UdCompHdr (not always present) |||||||| 1 | Octet 17/19 |
| iSample (1st RE in the PRB) |||||||| 1* | Octet 18/20 |
| qSample (1st RE in the PRB) |||||||| 1* | Octet 19/21* |
| ... |||||||| | |
| iSample (12th RE in the PRB) |||||||| 1* | Octet 40/42* |
| qSample (12th RE in the PRB) + padding when needed |||||||| 1* | Octet 41/43* |
| udComp Param (not always present) |||||||| 1* | Octet 42/44* |
| iSample (1st RE in the PRB) |||||||| 1* | Octet 43/45* |
| qSample (1st in the PRB) |||||||| 1* | Octet 44/46* |
| ... |||||||| | |
| iSample (12th RE in the PRB) |||||||| 1* | Octet 65/67* |
| qSample (12th RE in the PRB) + padding when needed |||||||| 1* | Octet 66/68* |
| ... |||||||| | |
| sectionID |||||||| 1 | Octet M |
| sectionID ||| rb | syminc | startPrbu ||| 1 | M+1 |
| startPrbu |||||||| 1 | M+2 |
| numPrb |||||||| 1 | M+3 |
| udCompHdr (not always present) |||||||| 1 | M+4 |
| reserved (not always present) |||||||| 1 | M+5 |
| UdCompHdr (not always present) |||||||| 1 | M+4/6 |
| iSample (1st RE in the PRB) |||||||| 1* | M+5/7 |
| qSample (1st RE in the PRB) |||||||| 1* | M+4/6* |
| ... |||||||| | |
| iSample (12th RE in the PRB) |||||||| 1* | M+27/29* |
| qSample (12th RE in the PRB) + padding when needed |||||||| 1* | M+28/30* |
| udComp Param (not always present) |||||||| 1* | M+29/31* |
| iSample (1st RE in the PRB) |||||||| 1* | M+30/32* |
| qSample (1st in the PRB) |||||||| 1* | M+31/33* |
| ... |||||||| | |
| iSample (12th RE in the PRB) |||||||| 1* | M+52/54* |
| qSample (12th RE in the PRB) + padding when needed |||||||| 1* | M+53/55* |

FIG. 28

| Section Type 1,3: DL/UL IQ Data Messages | | | | | | | | # of bytes | Octet |
|---|---|---|---|---|---|---|---|---|---|
| 0 (msb) | 1 | 2 | 3 | 4 | 5 | 6 | 7 (lsb) | | |
| transport header, see xRAN specification section 3.13 | | | | | | | | 8 | Octet 1 |
| dataDirection | payloadVersion | | | filterIndex | | | | 1 | Octet 9 |
| frameID | | | | | | | | 1 | Octet 10 |
| subframeID | | | | slotID | | | | 1 | Octet 11 |
| slotID | | | symbolId | | | | | 1 | Octet 12 |

FIG. 29

| Section Type 1,3: DL/UL IQ Data Messages | | | | | | | | # of bytes | Octet |
|---|---|---|---|---|---|---|---|---|---|
| 0 (msb) | 1 | 2 | 3 | 4 | 5 | 6 | 7 (lsb) | | |
| transport header, see xRAN specification section 3.13 | | | | | | | | 8 | Octet 1 |
| dataDirection | payloadVersion | | | filterIndex | | | | 1 | Octet 9 |
| frameID | | | | | | | | 1 | Octet 10 |
| subframeID | | | | slotID | | | | 1 | Octet 11 |
| slotID | | symbolId | | | | | | 1 | Octet 12 |
| sectionID | | | | | | | | 1 | Octet 13 |
| sectionID | | | | rb | symInc | startPrbu | | 1 | Octet 14 |
| startPrbu | | | | | | | | 1 | Octet 15 |
| numPrbu | | | | | | | | 1 | Octet 16 |
| udCompHdr (not always present) | | | | | | | | 1 | Octet 17 |
| reserved (not always present) | | | | | | | | 1 | Octet 18 |

FIG. 30

| Section Type 1,3: DL/UL IQ Data Messages | | | | | | | | | |
|---|---|---|---|---|---|---|---|---|---|
| 0 (msb) | 1 | 2 | 3 | 4 | 5 | 6 | 7 (lsb) | # of bytes | Octet |
| transport header, see xRAN specification section 3.13 | | | | | | | | 8 | Octet 1 |
| dataDirection | payloadVersion | | | filterIndex | | | | 1 | Octet 9 |
| frameID | | | | | | | | 1 | Octet 10 |
| subframeID | | | | slotID | | | | 1 | Octet 11 |
| slotID | | | symbolId | | | | | 1 | Octet 12 |
| sectionID | | | | | | | | 1 | Octet 13 |
| sectionID | | | rb | syminc | | startPrbu | | 1 | Octet 14 |
| startPrbu | | | | | | | | 1 | Octet 15 |
| numPrbu | | | | | | | | 1 | Octet 16 |
| udCompHdr (not always present) | | | | | | | | 1 | Octet 17 |
| reserved (not always present) | | | | | | | | 1 | Octet 18 |
| UdCompHdr (not always present) | | | | | | | | 1 | Octet 17/19 |
| iSample (1$^{st}$ RE in the PRB) | | | | | | | | 1* | Octet 18/20 |
| qSample (1$^{st}$ RE in the PRB) | | | | | | | | 1* | Octet 19/21* |
| ... | | | | | | | | | |
| iSample (12$^{th}$ RE in the PRB) | | | | | | | | 1* | Octet 40/42* |
| qSample (12$^{th}$ RE in the PRB) + padding when needed | | | | | | | | 1* | Octet 41/43* |
| udComp Param (not always present) | | | | | | | | 1* | Octet 42/44* |
| iSample (1$^{st}$ RE in the PRB) | | | | | | | | 1* | Octet 43/45* |
| qSample (1$^{st}$ in the PRB) | | | | | | | | 1* | Octet 44/46* |
| ... | | | | | | | | | |
| iSample (12$^{th}$ RE in the PRB) | | | | | | | | 1* | Octet 65/67* |
| qSample (12$^{th}$ RE in the PRB) + padding when needed | | | | | | | | 1* | Octet 66/68* |
| ... | | | | | | | | | |
| sectionID | | | | | | | | 1 | Octet M |
| sectionID | | | rb | syminc | | startPrbu | | 1 | M+1 |
| startPrbu | | | | | | | | 1 | M+2 |
| numPrb | | | | | | | | 1 | M+3 |
| udCompHdr (not always present) | | | | | | | | 1 | M+4 |
| reserved (not always present) | | | | | | | | 1 | M+5 |
| UdCompHdr (not always present) | | | | | | | | 1 | M+4/6 |
| iSample (1$^{st}$ RE in the PRB) | | | | | | | | 1* | M+5/7 |
| qSample (1$^{st}$ RE in the PRB) | | | | | | | | 1* | M+4/6* |
| ... | | | | | | | | | |
| iSample (12$^{th}$ RE in the PRB) | | | | | | | | 1* | M+27/29* |
| qSample (12$^{th}$ RE in the PRB) + padding when needed | | | | | | | | 1* | M+28/30* |
| udComp Param (not always present) | | | | | | | | 1* | M+29/31* |
| iSample (1$^{st}$ RE in the PRB) | | | | | | | | 1* | M+30/32* |
| qSample (1$^{st}$ in the PRB) | | | | | | | | 1* | M+31/33* |
| ... | | | | | | | | | |
| iSample (12$^{th}$ RE in the PRB) | | | | | | | | 1* | M+52/54* |
| qSample (12$^{th}$ RE in the PRB) + padding when needed | | | | | | | | 1* | M+53/55* |

FIG. 31

| Section Type | Target Scenario | Remarks |
|---|---|---|
| 0 | Unused Resource Blocks or symbols in Downlink or Uplink | Not supported |
| 1 | Most DL/UL radio channels | Supported |
| 2 | reserved for future use | N/A |
| 3 | PRACH and mixed-numerology channels | Only PRACH is supported. Mixed numerology is not supported. |
| 4 | Reserved for future use | Not supported |
| 5 | UE scheduling information (UE-ID assignment to section) | Not supported |
| 6 | Channel information | Not supported |
| 7 | LAA | Not supported |
| 8-255 | Reserved for future use | N/A |

FIG. 32

| Section Type 1: DL/UL Control Messages | | | | | | | | # of bytes | Octet |
|---|---|---|---|---|---|---|---|---|---|
| 0 (msb) | 1 | 2 | 3 | 4 | 5 | 6 | 7 (lsb) | | |
| transport header, see xRAN specification section 3.13 | | | | | | | | 8 | Octet 1 |
| dataDirection | payloadVersion | | | filterIndex | | | | 1 | Octet 9 |
| frameID | | | | | | | | 1 | Octet 10 |
| subframeID | | | | slotID | | | | 1 | Octet 11 |
| slotID | | | symbolId | | | | | 1 | Octet 12 |
| numberOfSections | | | | | | | | 1 | Octet 13 |
| sectionType = 1 | | | | | | | | 1 | Octet 14 |

FIG. 33

| Section Type 0: Idle/Guard Periods |||||||| # of bytes | Octet |
|---|---|---|---|---|---|---|---|---|---|
| 0 (msb) | 1 | 2 | 3 | 4 | 5 | 6 | 7 (lsb) | | |
| transport header, see xRAN specification section 3.13 |||||||| 8 | Octet 1 |
| dataDirection | payloadVersion || filterIndex |||||  1 | Octet 9 |
| frameID |||||||| 1 | Octet 10 |
| subframeID |||| slotID |||| 1 | Octet 11 |
| slotID ||| symbolId ||||| 1 | Octet 12 |
| numberOfSections |||||||| 1 | Octet 13 |
| sectionType = 0 |||||||| 1 | Octet 14 |
| timeOffset |||||||| 2 | Octet 15 |
| frameStructure |||||||| 1 | Octet 17 |
| cpLength |||||||| 2 | Octet 18 |
| reserved |||||||| 1 | Octet 20 |
| sectionID |||||||| 1 | Octet 21 |
| sectionID |||| rb | symInc || startPrbc | 1 | Octet 22 |
| startPrbc |||||||| 1 | Octet 23 |
| numPrbc |||||||| 1 | Octet 24 |
| reMask[11:4] |||||||| 1 | Octet 25 |
| reMask[3:0] |||| numSymbol |||| 1 | Octet 26 |
| reserved (16 bits) |||||||| 2 | Octet 27 |
| ... |||||||| | |
| sectionID |||||||| 1 | Octet N |
| sectionID |||| rb | symInc || startPrbc | 1 | N+1 |
| startPrbc |||||||| 1 | N+2 |
| numPrbc |||||||| 1 | N+3 |
| reMask[11:4] |||||||| 1 | N+4 |
| reMask[3:0] |||| numSymbol |||| 1 | N+5 |
| reserved (16 bits) |||||||| 2 | N+6 |
|  |||||||| | Octet M |

FIG. 34

| Section Type 1: DL/UL Control Messages |||||||| # of bytes | Octet |
|---|---|---|---|---|---|---|---|---|---|
| 0 (msb) | 1 | 2 | 3 | 4 | 5 | 6 | 7 (lsb) | | |
| transport header, see xRAN specification section 3.13 |||||||| 8 | Octet 1 |
| dataDirection | payloadVersion || filterIndex |||||  1 | Octet 9 |
| frameID |||||||| 1 | Octet 10 |
| subframeID |||| slotID |||| 1 | Octet 11 |
| slotID ||| symbolId ||||| 1 | Octet 12 |
| numberOfSections |||||||| 1 | Octet 13 |
| sectionType = 1 |||||||| 1 | Octet 14 |
| udCompHdr |||||||| 1 | Octet 15 |
| reserved |||||||| 1 | Octet 16 |
| sectionID |||||||| 1 | Octet 17 |
| sectionID |||| rb | symInc | startPrbc || 1 | Octet 18 |
| startPrbc |||||||| 1 | Octet 19 |
| numPrbc |||||||| 1 | Octet 20 |
| reMask[11:4] |||||||| 1 | Octet 21 |
| reMask[3:0] |||| numSymbol |||| 1 | Octet 22 |
| ef = 1 | beamId[14:8] ||||||| 1 | Octet 23 |
| beamId[7:0] |||||||| 1 | Octet 24 |
| section extensions as indicated by "ef" |||||||| var | Octet 25 |
| ... ||||||||||
| sectionID |||||||| 1 | Octet N |
| sectionID |||| rb | symInc | startPrbc || 1 | N+1 |
| startPrbc |||||||| 1 | N+2 |
| numPrbc |||||||| 1 | N+3 |
| reMask[11:4] |||||||| 1 | N+4 |
| reMask[3:0] |||| numSymbol |||| 1 | N+5 |
| ef = 0 | beamId[14:8] ||||||| 1 | N+6 |
| beamId[7:0] |||||||| 1 | N+7 |
| section extensions as indicated by "ef" |||||||| var | N+8 |
| |||||||| | Octet M |

FIG. 35

| xran_cp_radioapp_common_header | xran_cp_radioapp_section1_header | xran_cp_radioapp_section1 | ..... | xran_cp_radioapp_section1 |
|---|---|---|---|---|

FIG. 36

| Section Type 3: PRACH & mixed numerology ||||||||  # of bytes |
|---|---|---|---|---|---|---|---|---|
| 0 (msb) | 1 | 2 | 3 | 4 | 5 | 6 | 7 (lsb) | |
| transport header, see xRAN specification section 3.13 |||||||| 8 |
| dataDirection | payloadVersion || filterIndex |||| 1 |
| frameID |||||||| 1 |
| subframeID |||| slotID |||| 1 |
| slotID ||| symbolId ||||| 1 |
| numberOfSections |||||||| 1 |
| sectionType = 3 |||||||| 1 |
| timeOffset |||||||| 2 |
| framStructure |||||||| 1 |
| cpLength |||||||| 2 |
| udCompHdr |||||||| 1 |
| sectionID |||||||| 1 |
| sectionID |||| rb | symInc | startPrbc || 1 |
| startPrbc |||||||| 1 |
| numPrbc |||||||| 1 |
| reMask[11:4] |||||||| 1 |
| reMask[3:0] |||| numSymbol |||| 1 |
| ef ||| beamId[14:8] ||||| 1 |
| beamId[7:0] |||||||| 1 |
| frequencyOffset |||||||| 3 |
| reserved (8 bits) |||||||| 1 |
| section extensions as indicated by "ef" |||||||| var |
| ... ||||||||  |
| sectionID ||||||||  |
| sectionID |||| rb | symInc | startPrbc || 1 |
| startPrbc |||||||| 1 |
| numPrbc |||||||| 1 |
| reMask[11:4] |||||||| 1 |
| reMask[3:0] |||| numSymbol |||| 1 |
| reserved (16 bits) |||||||| 1 |
| ef ||| beamId[14:8] ||||| 1 |
| beamId[7:0] |||||||| 1 |
| frequencyOffset |||||||| 3 |
| reserved (8 bits) |||||||| 1 |
| section extensions as indicated by "ef" |||||||| var |
| ||||||||  |

FIG. 37

| Section Type 5: UE Scheduling Information conveyance ||||||||||
|---|---|---|---|---|---|---|---|---|---|
| 0 (msb) | 1 | 2 | 3 | 4 | 5 | 6 | 7 (lsb) | # of bytes | Octet |
| transport header, see xRAN specification section 3.13 |||||||| 8 | Octet 1 |
| dataDirection | payloadVersion ||| filterIndex |||| 1 | Octet 9 |
| frameID |||||||| 1 | Octet 10 |
| subframeID |||| slotID |||| 1 | Octet 11 |
| slotID ||| symbolId ||||| 1 | Octet 12 |
| numberOfSections |||||||| 1 | Octet 13 |
| sectionType = 5 |||||||| 1 | Octet 14 |
| udCompHdr |||||||| 1 | Octet 15 |
| reserved |||||||| 1 | Octet 16 |
| sectionID |||||||| 1 | Octet 17 |
| sectionID |||| rb | symInc | startPrbc || 1 | Octet 18 |
| startPrbc |||||||| 1 | Octet 19 |
| numPrbc |||||||| 1 | Octet 20 |
| reMask[11:4] |||||||| 1 | Octet 21 |
| reMask[3:0] |||| numSymbol |||| 1 | Octet 22 |
| ef | ueId[14:8] ||||||| 1 | Octet 23 |
| ueId[7:0] |||||||| 1 | Octet 24 |
| section extensions as indicated by "ef" |||||||| var | Octet 25 |
| ... |||||||| | |
| sectionID |||||||| 1 | Octet N |
| sectionID |||| rb | symInc | startPrbc || 1 | N+1 |
| startPrbc |||||||| 1 | N+2 |
| numPrbc |||||||| 1 | N+3 |
| reMask[11:4] |||||||| 1 | N+4 |
| reMask[3:0] |||| numSymbol |||| 1 | N+5 |
| ef | ueId[14:8] ||||||| 1 | N+6 |
| ueId[7:0] |||||||| 1 | N+7 |
| section extensions as indicated by "ef" |||||||| var | N+8 |
| |||||||| | Octet M |

FIG. 39

| Section Type 6: Channel Information Conveyance ||||||||| # of bytes | Octet |
|---|---|---|---|---|---|---|---|---|---|
| 0 (msb) | 1 | 2 | 3 | 4 | 5 | 6 | 7 (lsb) | | |
| transport header, see xRAN specification section 3.13 |||||||| 8 | Octet 1 |
| dataDirection | payloadVersion || filterIndex |||||  1 | Octet 9 |
| frameID |||||||| 1 | Octet 10 |
| subframeID ||| slotID ||||| 1 | Octet 11 |
| slotID || symbolId |||||| 1 | Octet 12 |
| numberOfSections |||||||| 1 | Octet 13 |
| sectionType = 6 |||||||| 1 | Octet 14 |
| numberOfUEs |||||||| 1 | Octet 15 |
| reserved |||||||| 1 | Octet 16 |
| ef | ueId[14:8] ||||||| 1 | Octet 17 |
| ueId[7:0] |||||||| 1 | Octet 18 |
| regularizationFactor |||||||| 2 | Octet 19 |
| reserved |||| rb | symInc | startPrbc || 1 | Octet 21 |
| startPrbc |||||||| 1 | Octet 22 |
| numPrbc |||||||| 1 | Octet 23 |
| ciIsample (first PRB, first antenna) |||||||| var | Octet 24 |
| ciQsample (first PRB, first antenna) |||||||| var | |
| ciIsample (first PRB, second antenna) |||||||| var | |
| ciQsample (first PRB, second antenna) |||||||| var | |
| ... |||||||| | |
| ciIsample (first PRB, last antenna) |||||||| var | |
| ciQsample (first PRB, last antenna) |||||||| var | |
| ... |||||||| | |
| ciIsample (last PRB, last antenna) |||||||| var | |
| ciQsample (last PRB, last antenna) |||||||| var | |
| section extensions as indicated by "ef" |||||||| var | |
| ... |||||||| | |
| ef | ueId[14:8] ||||||| 1 | Octet N |
| ueId[7:0] |||||||| 1 | N+1 |
| regularizationFactor |||||||| 2 | N+2 |
| reserved |||| rb | symInc | startPrbc || 1 | N+4 |
| startPrbc |||||||| 1 | N+5 |
| numPrbc |||||||| 1 | N+6 |
| ciIsample (first PRB, first antenna) |||||||| var | N+7 |
| ciQsample (first PRB, first antenna) |||||||| var | |
| ciIsample (first PRB, second antenna) |||||||| var | |
| ciQsample (first PRB, second antenna) |||||||| var | |
| ... |||||||| | |
| ciIsample (first PRB, last antenna) |||||||| var | |
| ciQsample (first PRB, last antenna) |||||||| var | |
| ... |||||||| | |
| ciIsample (last PRB, last antenna) |||||||| var | |
| ciQsample (last PRB, last antenna) |||||||| var | |

FIG. 40

| Interface Management Procedures | UE Context Management Procedures | RRC Message Transfer Procedures |
|---|---|---|
| • F1 Setup<br>• Reset<br>• Error Indication<br>• gNB-DU Configuration Updates<br>• gNB-CU Configuration Updates<br>• gNB-DU Resource Indication | • UE Context Setup<br>• UE Context Modification (gNB-CU initiated)<br>• UE Context Modification Required (gNB-DU Initiated)<br>• UE Context Release<br>• UE Context Release Request<br>• UE Inactivity Notification<br>• Notify | • Initial UL RRC Message Transfer<br>• DL RRC Message Transfer<br>• UL RRC Message Transfer |
| SI & Paging Procedures | | Warning Message Transfer Procedures |
| • System Information Delivery<br>• Paging | | • Write-Replace Warning<br>• PWS Cancel<br>• PWS Restart Indication<br>• PWS Failure Indication |

FIG. 42

| Downlink User Data (PDU Type 0) | | | |
|---|---|---|---|
| PDU Type 0 | Spare | DL Discard Blocks | DL Flush | Report Polling |
| Spare | Report Delivery | User Data Exits | Assisted Info Report Poll | ReTx Flag |
| NR-U Sequence Number | | | |
| DL Discard NR PDCP PDU SN | | | |
| DL Discard Number of Blocks | | | |
| DL Discord NR PDCP PDU SN Start (first block) | | | |
| Discarded Block size (first block) | | | |
| ... | | | |
| DL Discard NR PDCP PDU SN Start (last block) | | | |
| Discarded Block size (last block) | | | |
| DL Report NR PDCP POU SN | | | |

FIG. 44

| Downlink Data Delivery Status (PDU Type 1) | | | |
|---|---|---|---|
| PDU Type 1 | Highest Tx NR PDCP SN Indication | Highest Delivered NR PDCP SN Indication | Final Frame Indication | Last Packet Report |
| Spare | Data Rate Indication | Highest ReTx NR PDCP SN Indication | Highest Delivered ReTx NR PDCP SN Indication | Cause Report |
| Desired Buffered Size for the Data Radio Bearer | | | |
| Desired Data Rate | | | |
| Number of Lost NR-U Sequence Number Ranges Reported | | | |
| Start of Lost NR-U Sequence Number Range | | | |
| End of Lost NR-U Sequence Number Range | | | |
| Highest Successful Delivered NR PDCP Sequence Number | | | |
| Highest Transmitted NR PDCP Sequence Number | | | |
| Cause Value | | | |
| Highest Successful Delivered RxTx NR PDCP Sequence Number | | | |
| Highest Retransmitted NR PDCP Sequence Number | | | |

FIG. 45

Interference Template

*Network [PWN] Date | time [Date | time] Location [Location]*

| | | | |
|---|---|---|---|
| Specified Channel | 2 | Total Analysis Time | 1 Hour |
| Start/Stop Frequency | 3560/3570 (MHz) | Start/Stop Time | 1300/1400 (UTC) |
| Channel Bandwidth | 10 (MHz) | Sample Rate | 50 MSPS (Optional) |
| Total Channels Surveyed | 15 | Resolution Bandwidth | 5 KHz (Optional) |
| Total Bandwidth | 150 (MHz) | Reference Point | Positioned in Network |

Interference Metrics

| Duration of Interference (Duty Cycle) | Observation Time | Analysis Time | Duty Cycle |
|---|---|---|---|
| | 180 seconds | 1 Hour | .05 |

| Observable | Average Value | Peak Value | Minimum |
|---|---|---|---|
| Signal to Noise Ratio (dB) | -2.1 | 6.22 | -7.3 |
| Signal to Interference Ratio (dB) | -4.2 | 5.13 | -8.4 |
| Data Throughput Rate (Bits/Sec) | 202.6 | 231.4 | 134.8 |
| RSRP (dBm) | -101.8 | -93.4 | -111.2 |
| RSRQ (dB) | -18.1 | -12.6 | -19.5 |
| EC/IO (dB) | -15.3 | 2.2 | -7.3 |
| Bit Error Rate | .032 | .014 | .047 |

Adjacent Channel Measurements (Channelized)

| Adjacent Channel Information | Avg. Power (dBm) | Peak Power (dBm) | Occupancy % |
|---|---|---|---|
| Channel 1 / 3550 – 3560 MHz | -62 | -74 | 32 |
| Channel 3 / 3570 – 3580 MHz | -51 | -61 | 48 |

Geolocation

| Geolocation Available | Reference Point |
|---|---|
| No | No (Optional) |

FIG. 71A

Additional Evidence of External Interference

Evidence Available
Yes

Type of Interference
Intermittent

Signal Characteristics

| Topic | Notes |
|---|---|
| Observation Description | Wideband Signal (Type) |
| Method of Observation | Spectrum Monitoring |
| Protocol | LTE |
| Modulation | QPSK |
| Envelope | PAR |
| Cyclostationary | Cycle Frequency = 20 |
| Center Frequency | 3565.250 MHz |
| Bandwidth | 1.5 MHz |
| Average Power | 20 dBFS |

FIG. 71B

SYSTEM, METHOD, AND APPARATUS FOR PROVIDING OPTIMIZED NETWORK RESOURCES

CROSS REFERENCES TO RELATED APPLICATIONS

This application is related to and claims priority from the following U.S. patents and patent applications. This application is a continuation of U.S. patent application Ser. No. 18/237,970, filed Aug. 25, 2023, which is a continuation-in-part of U.S. patent application Ser. No. 18/086,115, filed Dec. 21, 2022, which is a continuation-in-part of U.S. patent application Ser. No. 18/085,904, filed Dec. 21, 2022, which is a continuation of U.S. patent application Ser. No. 18/085,791, filed Dec. 21, 2022, which is a continuation of U.S. patent application Ser. No. 18/085,733, filed Dec. 21, 2022, which is a continuation-in-part of U.S. patent application Ser. No. 17/901,035, filed Sep. 1, 2022, which claims priority to and the benefit of U.S. Provisional Patent Application No. 63/370,184, filed Aug. 2, 2022. Each of the above listed applications is incorporated herein by reference in its entirety.

BACKGROUND OF THE INVENTION

1. Field of the Invention

The present invention relates to spectrum analysis and management for electromagnetic signals, and more particularly for providing optimized network resources.

2. Description of the Prior Art

It is generally known in the prior art to provide wireless communications spectrum management for detecting devices and for managing the space. Spectrum management includes the process of regulating the use of radio frequencies to promote efficient use and gain net social benefit. A problem faced in effective spectrum management is the various numbers of devices emanating wireless signal propagations at different frequencies and across different technological standards. Coupled with the different regulations relating to spectrum usage around the globe effective spectrum management becomes difficult to obtain and at best can only be reached over a long period of time.

Another problem facing effective spectrum management is the growing need from spectrum despite the finite amount of spectrum available. Wireless technologies and applications or services that require spectrum have exponentially grown in recent years. Consequently, available spectrum has become a valuable resource that must be efficiently utilized. Therefore, systems and methods are needed to effectively manage and optimize the available spectrum that is being used.

Prior art patent documents include the following:

U.S. Pat. No. 11,395,149 for System, method, and apparatus for providing dynamic, prioritized spectrum management and utilization by inventor Montalvo, filed Oct. 30, 2020 and issued Jul. 19, 2022, is directed to systems, methods, and apparatuses for providing dynamic, prioritized spectrum utilization management. The system includes at least one monitoring sensor, at least one data analysis engine, at least one application, a semantic engine, a programmable rules and policy editor, a tip and cue server, and/or a control panel. The tip and cue server is operable utilize the environmental awareness from the data processed by the at least one data analysis engine in combination with additional information to create actionable data.

U.S. Patent Publication No. 2018/0352441 for Devices, methods, and systems with dynamic spectrum sharing by inventors Zheng, et al., filed Jun. 4, 2018 and published Dec. 6, 2018, is directed to devices, methods, and systems with dynamic spectrum sharing. A wireless communication device includes a software-defined radio, a spectrum sensing sub-system, a memory, and an electronic processor. The software-defined radio is configured to generate an input signal, and wirelessly communicate with one or more radio nodes using a traffic data channel and a broadcast control channel. The spectrum sensing sub-system is configured to sense local spectrum information from the input signal. The electronic processor is communicatively connected to the memory and the spectrum sensing sub-system and is configured to receive the local spectrum information from the spectrum sensing sub-system, receive spectrum information from the one or more radio nodes, and allocate resources for the traffic data channel based on the local spectrum information and the spectrum information that is received from the one or more radio nodes.

U.S. Patent Publication No. 2018/0295607 for Method and apparatus for adaptive bandwidth usage in a wireless communication network by inventors Lindoff, et al., filed Oct. 10, 2017 and published Oct. 11, 2018, is directed to reconfiguration of a receiver bandwidth of the wireless device is initiated to match the second scheduling bandwidth, wherein the second scheduling bandwidth is larger than a first scheduling bandwidth currently associated with the wireless device, and wherein the first and second scheduling bandwidths respectively define the bandwidth used for scheduling transmissions to the wireless device.

U.S. Pat. No. 9,538,528 for Efficient co-existence method for dynamic spectrum sharing by inventors Wagner, et al., filed Oct. 6, 2011 and issued Jan. 3, 2017, is directed to an apparatus that defines a set of resources out of a first number of orthogonal radio resources and controls a transmitting means to simultaneously transmit a respective first radio signal for each resource on all resources of the set. A respective estimated interference is estimated on each of the resources of the set when the respective first radio signals are transmitted simultaneously. A first resource of the set is selected if the estimated interference on the first resource exceeds a first predefined level and, in the set, the first resource is replaced by a second resource of the first number of resources not having been part of the set. Each of the controlling and the estimating, the selecting, and the replacing is performed in order, respectively, for a predefined time.

U.S. Pat. No. 8,972,311 for Intelligent spectrum allocation based on user behavior patterns by inventors Srikanteswara, et al., filed Jun. 26, 2012 and issued Mar. 3, 2015, is directed to a platform to facilitate transferring spectrum rights is provided that includes a database to ascertain information regarding available spectrum for use in wireless communications. A request for spectrum use from an entity needing spectrum may be matched with available spectrum. This matching comprises determining a pattern in user requests overtime to optimize spectrum allocation. The Cloud Spectrum Services (CSS) process allows entities to access spectrum they would otherwise not have; it allows the end user to complete their download during congested periods while maintaining high service quality; and it allows the holder of rental spectrum to receive compensation for an otherwise idle asset.

U.S. Pat. No. 10,536,210 for Interference suppressing method and device in dynamic frequency spectrum access system by inventors Zhao, et al., filed Apr. 14, 2016 and issued Jan. 14, 2020, is directed to an interference suppressing method and device in a dynamic frequency spectrum access (DSA) system. The system includes: a frequency spectrum management device, a primary system including a plurality of primary devices, and a secondary system including a plurality of secondary devices. The method includes: transmitting position information of each of the secondary devices to the frequency spectrum management device; determining, by the frequency spectrum management device, a weight factor for a specific secondary device according to the received position formation; and performing a second-stage precoding, and in the second-stage precoding, adjusting, by using the weight factor, an estimated power of the specific secondary device leaking to the other secondary device.

U.S. Pat. No. 10,582,401 for Large scale radio frequency signal information processing and analysis system by inventors Mengwasser, et al., filed Apr. 15, 2019 and issued Mar. 3, 2020, is directed to a large-scale radio frequency signal information processing and analysis system that provides advanced signal analysis for telecommunication applications, including band capacity and geographical density determinations and detection, classification, identification, and geolocation of signals across a wide range of frequencies and across broad geographical areas. The system may utilize a range of novel algorithms for bin-wise processing, Rayleigh distribution analysis, telecommunication signal classification, receiver anomaly detection, transmitter density estimation, transmitter detection and location, geolocation analysis, telecommunication activity estimation, telecommunication utilization estimation, frequency utilization estimation, and data interpolation.

U.S. Pat. No. 10,070,444 for Coordinated spectrum allocation and de-allocation to minimize spectrum fragmentation in a cognitive radio network by inventors Markwart, et al., filed Dec. 2, 2011 and issued Sep. 4, 2018, is directed to An apparatus and a method by which a fragmentation probability is determined which indicates a probability of fragmentation of frequency resources in at least one network section for at least one network operating entity. Moreover, an apparatus and a method by which frequency resources in at least one network section are allocated and/or de-allocated, priorities of frequency resources are defined for at least one network operating entity individually, and allocating and/or de-allocating of the frequency resources for the at least one network operating entity is performed based on the priorities. For allocating and/or de-allocating of the frequency resources, also the fragmentation probability may be taken into account.

U.S. Patent Publication No. 2020/0007249 for Wireless signal monitoring and analysis, and related methods, systems, and devices by inventors Derr, et al., filed Sep. 12, 2019 and published Jan. 2, 2020, is directed to wireless signal classifiers and systems that incorporate the same may include an energy-based detector configured to analyze an entire set of measurements and generate a first single classification result, a cyclostationary-based detector configured to analyze less than the entire set of measurements and generate a second signal classification result; and a classification merger configured to merge the first signal classification result and the second signal classification result. Ensemble wireless signal classification and systems and devices the incorporate the same are disclosed. Some ensemble wireless signal classification may include energy-based classification processes and machine learning-based classification processes. Incremental machine learning techniques may be incorporated to add new machine learning-based classifiers to a system or update existing machine learning-based classifiers.

U.S. Patent Publication No. 2018/0324595 for Spectral sensing and allocation using deep machine learning by inventor Shima, filed May 7, 2018 and published Nov. 8, 2018, is directed to methods and systems for identifying occupied areas of a radio frequency (RF) spectrum, identifying areas within that RF spectrum that are unusable for further transmissions, and identifying areas within that RF spectrum that are occupied but that may nonetheless be available for additional RF transmissions are provided. Implementation of the method then systems can include the use of multiple deep neural networks (DNNs), such as convolutional neural networks (CNN's), that are provided with inputs in the form of RF spectrograms. Embodiments of the present disclosure can be applied to cognitive radios or other configurable communication devices, including but not limited to multiple inputs multiple output (MIMO) devices and 5G communication system devices.

U.S. Patent Publication No. 2017/0041802 for Spectrum resource management device and method by inventors Sun, et al., filed May 27, 2015 and published Feb. 9, 2017, is directed to a spectrum resource management device: determines available spectrum resources of a target communication system, so that aggregation interference caused by the target communication system and a communication system with a low right against a communication system with a high right in a management area does not exceed an interference threshold of the communication system with a high right; reduces available spectrum resources of the communication system with a low right, so that the interference caused by the communication system with a low right against the target communication system does not exceed an interference threshold of the target communication system; and updates the available spectrum resources of the target communication system according to the reduced available spectrum resources of the communication system with a low right, so that the aggregation interference does not exceed the interference threshold of the communication system with a high right.

U.S. Pat. No. 9,900,899 for Dynamic spectrum allocation method and dynamic spectrum allocation device by inventors Jiang, et al., filed Mar. 26, 2014 and issued Feb. 20, 2018, is directed to a dynamic spectrum allocation method and a dynamic spectrum allocation device. In the method, a centralized node performs spectrum allocation and transmits a spectrum allocation result to each communication node, so that the communication node operates at a corresponding spectrum resource in accordance with the spectrum allocation result and performs statistics of communication quality measurement information. The centralized node receives the communication quality measurement information reported by the communication node, and determines whether or not it is required to trigger the spectrum re-allocation for the communication node in accordance with the communication quality measurement information about the communication node. When it is required to trigger the spectrum re-allocation, the centralized node re-allocates the spectrum for the communication node.

U.S. Pat. No. 9,578,516 for Radio system and spectrum resource reconfiguration method thereof by inventors Liu, et al., filed Feb. 7, 2013 and issued, Feb. 21, 2017, is directed to a radio system and a spectrum resource reconfiguration method thereof. The method comprises: a Reconfigurable Base Station (RBS) divides subordinate nodes into groups according to attributes of the subordinate nodes, and sends a reconfiguration command to a subordinate node in a designated group, and the RBS and the subordinate node execute reconfiguration of spectrum resources according to the reconfiguration command; or, the RBS executes reconfiguration of spectrum resources according to the reconfiguration command; and a subordinate User Equipment (UE) accessing to a reconfigured RBS after interruption. The reconfiguration of spectrum resources of a cognitive radio system can be realized.

U.S. Pat. No. 9,408,210 for Method, device and system for dynamic frequency spectrum optimization by inventors Pikhletsky, et al., filed Feb. 25, 2014 and issued Aug. 2, 2016, is directed to a method, a device and a system for dynamic frequency spectrum optimization. The method includes: predicting a traffic distribution of terminal(s) in each cell of multiple cells; generating multiple frequency spectrum allocation schemes for the multiple cells according to the traffic distribution of the terminal(s) in each cell, wherein each frequency spectrum allocation scheme comprises frequency spectrum(s) allocated for each cell; selecting a frequency spectrum allocation scheme superior to a current frequency spectrum allocation scheme of the multiple cells from the multiple frequency spectrum allocation schemes according to at least two network performance indicators of a network in which the multiple cells are located; and allocating frequency spectrum(s) for the multiple cells using the selected frequency spectrum allocation scheme. This improves the utilization rate of the frequency spectrum and optimizes the multiple network performance indicators at the same time.

U.S. Pat. No. 9,246,576 for Apparatus and methods for dynamic spectrum allocation in satellite communications by inventors Yanai, et al., filed Mar. 5, 2012 and issued Jan. 26, 2016, is directed to a communication system including Satellite Communication apparatus providing communication services to at least a first set of communicants, the first set of communicants including a first plurality of communicants, wherein the communication services are provided to each of the communicants in accordance with a spectrum allocation corresponding thereto, thereby to define a first plurality of spectrum allocations apportioning a first predefined spectrum portion among the first set of communicants; and Dynamic Spectrum Allocations apparatus operative to dynamically modify at least one spectrum allocation corresponding to at least one of the first plurality of communicants without exceeding the spectrum portion.

U.S. Pat. No. 8,254,393 for Harnessing predictive models of durations of channel availability for enhanced opportunistic allocation of radio spectrum by inventor Horvitz, filed Jun. 29, 2007 and issued Aug. 28, 2012, is directed to a proactive adaptive radio methodology for the opportunistic allocation of radio spectrum is described. The methods can be used to allocate radio spectrum resources by employing machine learning to learn models, via accruing data over time, that have the ability to predict the context-sensitive durations of the availability of channels. The predictive models are combined with decision-theoretic cost-benefit analyses to minimize disruptions of service or quality that can be associated with reactive allocation policies. Rather than reacting to losses of channel, the proactive policies seek switches in advance of the loss of a channel. Beyond determining durations of availability for one or more frequency bands statistical machine learning also be employed to generate price predictions in order to facilitate a sale or rental of the available frequencies, and these predictions can be employed in the switching analyses The methods can be employed in non-cooperating distributed models of allocation, in centralized allocation approaches, and in hybrid spectrum allocation scenarios.

U.S. Pat. No. 6,990,087 for Dynamic wireless resource utilization by inventors Rao, et al., filed Apr. 22, 2003 and issued Jan. 24, 2006, is directed to a method for dynamic wireless resource utilization includes monitoring a wireless communication resource; generating wireless communication resource data; using the wireless communication resource data, predicting the occurrence of one or more holes in a future time period; generating hole prediction data; using the hole prediction data, synthesizing one or more wireless communication channels from the one or more predicted holes; generating channel synthesis data; receiving data reflecting feedback from a previous wireless communication attempt and data reflecting a network condition; according to the received data and the channel synthesis data, selecting a particular wireless communication channel from the one or more synthesized wireless communication channels; generating wireless communication channel selection data; using the wireless communication channel selection data, instructing a radio unit to communicate using the selected wireless communication channel; and instructing the radio unit to discontinue use of the selected wireless communication channel after the communication has been completed.

U.S. Pat. No. 10,477,342 for Systems and methods of using wireless location, context, and/or one or more communication networks for monitoring for, preempting, and/or mitigating pre-identified behavior by inventor Williams, filed Dec. 13, 2017 and issued Nov. 12, 2019, is directed to systems and methods of using location, context, and/or one or more communication networks for monitoring for, preempting, and/or mitigating pre-identified behavior. For example, exemplary embodiments disclosed herein may include involuntarily, automatically, and/or wirelessly monitoring/mitigating undesirable behavior (e.g., addiction related undesirable behavior, etc.) of a person (e.g., an addict, a parolee, a user of a system, etc.). In an exemplary embodiment, a system generally includes a plurality of devices and/or sensors configured to determine, through one or more communications networks, a location of a person and/or a context of the person at the location; predict and evaluate a risk of a pre-identified behavior by the person in relation to the location and/or the context; and facilitate one or more actions and/or activities to mitigate the risk of the pre-identified behavior, if any, and/or react to the pre-identified behavior, if any, by the person.

SUMMARY OF THE INVENTION

The present invention relates to spectrum analysis and management for electromagnetic signals, and more particularly for providing optimized network resources. Furthermore, the present invention relates to spectrum analysis and management for electromagnetic (e.g., radio frequency (RF)) signals, and for automatically identifying baseline data and changes in state for signals from a multiplicity of devices in a wireless communications spectrum, and for providing remote access to measured and analyzed data through a virtualized computing network. In an embodiment, signals and the parameters of the signals are identified and indications of available frequencies are presented to a user. In another embodiment, the protocols of signals are also identified. In a further embodiment, the modulation of signals, data types carried by the signals, and estimated signal origins are identified.

It is an object of this invention to prioritize and manage applications in the wireless communications spectrum, while also optimizing application performance.

In one embodiment, the present invention provides a system for dynamic spectrum utilization management in an electromagnetic environment comprising: at least one sensor unit operable to measure radiofrequency (RF) data, an RF analysis engine operable to extract physical layer data from the measured RF data, wherein the RF analysis engine is operable to analyze or process the extracted physical layer data from the measured RF data, wherein the at least one sensor unit and the RF analysis engine are provided in a single chip, a single chipset, multiple chips, multiple chipsets, or on a single circuit board for real time dynamic spectrum sharing for the electromagnetic environment, wherein the single chip, the single chipset, the multiple chips, the multiple chipsets, or the single circuit board are provided on a single electronic device, wherein the single electronic device is operable to send the analyzed or processed extracted physical layer data to a distributed data unit (DDU), a centralized unit (CU), a radio unit (RU), and/or a Multi-Access Edge Computing (MEC) layer, and wherein the analyzed or processed extracted physical layer data is used by the DDU, the CU, the RU, and/or MEC layer to create actionable data for optimizing network resources.

In another embodiment, the present invention provides a system for dynamic spectrum utilization management in an electromagnetic environment comprising: at least one sensor unit operable to measure radiofrequency (RF) data, an RF analysis engine operable to provide physical layer data based on the measured RF data, a customer programmable statistical interface, and a Multi-Access Edge Computing (MEC) layer in a network slice or a subnetwork, wherein the MEC layer is in communication with a radio access network (RAN) and a core network, wherein the at least one sensor unit, the RF analysis engine, the customer programmable statistical interface are provided in a single chip, a single chipset, multiple chips, multiple chipsets, or on a single circuit board, wherein the single chip, the single chipset, the multiple chips, the multiple chipsets, or the single circuit board are provided on an electronic device, wherein the electronic device is operable to send the analyzed or processed extracted physical layer data to the MEC layer, and wherein the analyzed or processed extracted physical layer data is used by the MEC layer to create actionable data for optimizing network resources.

In yet another embodiment, the present invention provides an apparatus for dynamic spectrum utilization management in an electromagnetic environment comprising: an electronic device including a single chip, a single chipset, multiple chips, multiple chipsets, or a single circuit board, wherein the single chip, the single chipset, the multiple chips, the multiple chipsets, or the single circuit board includes at least one sensor unit operable to measure radiofrequency (RF) data and an RF analysis engine operable to provide physical layer data based on the measured RF data, wherein the RF analysis engine is operable to analyze or process the extracted physical layer data from the measured RF data, wherein the electronic device is operable to send the analyzed or processed extracted physical layer data to a distributed data unit (DDU), a centralized unit (CU), a radio unit (RU), and/or a Multi-Access Edge Computing (MEC) layer, wherein the analyzed or processed extracted physical layer data is used by the DDU, the CU, the RU, and/or MEC layer to create actionable data for optimizing network resources.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 16 is a table describing supported data flow for a single radio unit with a single component carrier.

FIG. 19 is a table of default values used for the implementation of O-DU and O-RU/SU simulation with a mmWave scenario.

FIG. 20 is a table of default values used for the implementation of O-DU and O-RU/SU simulation with numerology 0.

FIG. 21 is a table of default values used for the implementation of O-DU and O-RU/SU simulation with numerology 1.

FIG. 25 illustrates one embodiment of a native ethernet frame with VLAN.

FIG. 26 illustrates one embodiment of eCRPI header field definitions.

FIG. 27 illustrates bit allocations of ecpriRtcid/ecpriPcid.

FIG. 28 illustrates xRAN packet components for DL/UL IQ data messages.

FIG. 29 illustrates one embodiment of a common radio application header.

FIG. 30 illustrates one embodiment of a data section application header.

FIG. 31 illustrates one embodiment of an xRAN packet data payload.

FIG. 32 illustrates a table of section types and target scenarios.

FIG. 33 illustrates one embodiment of a radio application common header.

FIG. 34 illustrates a structure of a Section Type 0 message.

FIG. 35 illustrates a structure of a Section Type 1 message.

FIG. 36 illustrates an entire Section Type 1 message.

FIG. 37 illustrates a structure of a Section Type 3 message.

FIG. 39 illustrates a structure of a Section Type 5 message.

FIG. 40 illustrates a structure of a Section Type 6 message.

FIG. 42 is a table of F1 interface functionalities.

FIG. 44 is a table of PDU Type 0 downlink user data.

FIG. 45 is a table of PDU Type 1 downlink delivery status.

FIG. 47 also illustrates three control loops.

FIG. 71A illustrates one embodiment of an interference template including interference metrics, adjacent channel measurements, and geolocation.

FIG. 71B illustrates one embodiment of an interference template including additional evidence of external interference.

DETAILED DESCRIPTION

Figure 1:
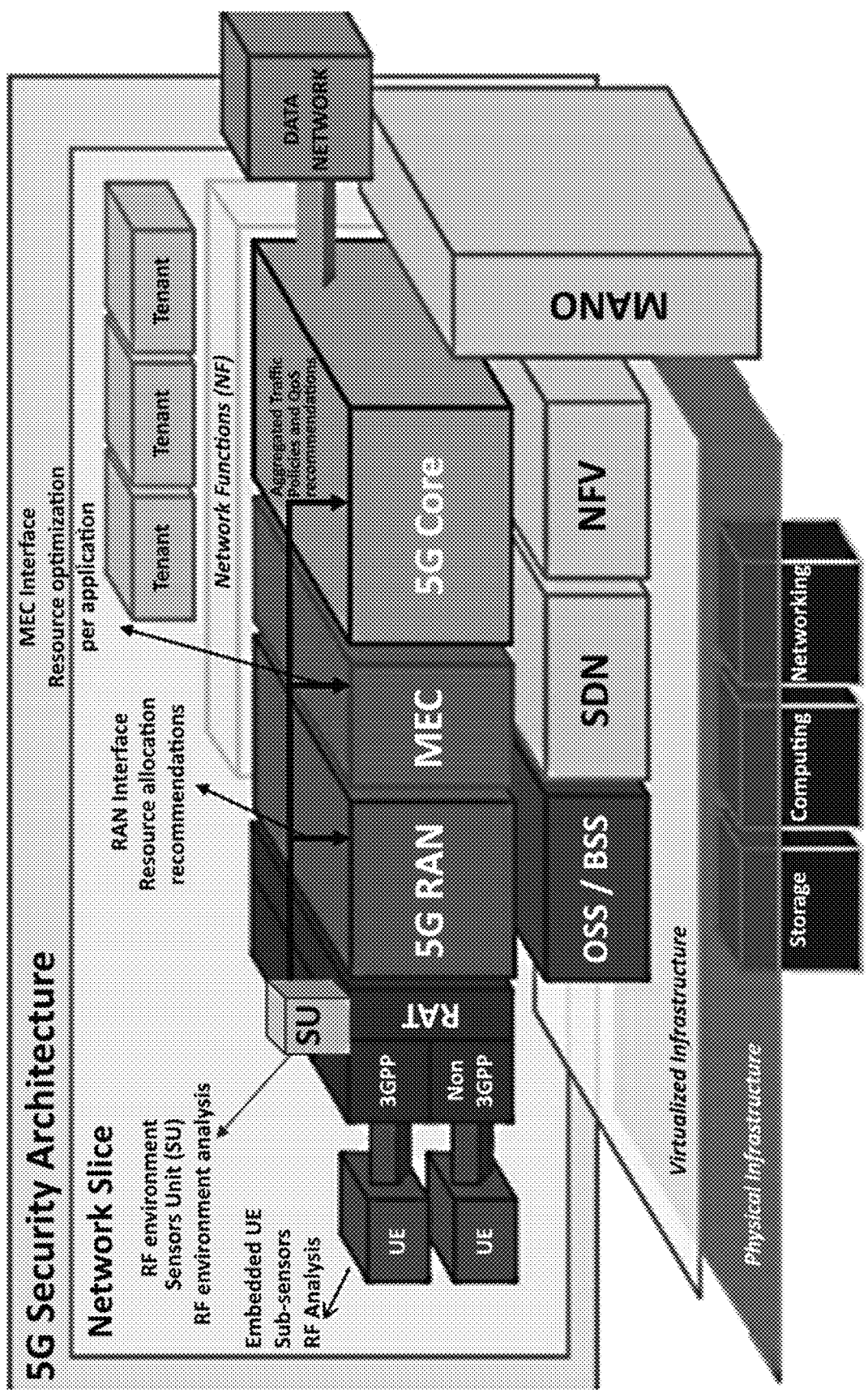
FIG. 1 illustrates one embodiment of a network.

The present invention is generally directed to spectrum analysis and management for electromagnetic signals, and more particularly for providing methods for network resources optimization by providing at least one chip, chipsets, or circuit boards with functionality related to the physical layer (layer 1 of the OSI network model) by using data obtained from sensors capturing data from the electromagnetic environment. More particularly, the present invention provides for RF awareness via extraction of physical layer (layer 1) data via the software operable on a single chip, a single chipset, multiple chips, multiple chipsets, or on a single circuit board improves performance for modulation and/or demodulation, and beam forming for better RF awareness in real time for spectrum management, interference detection, and with low latency and high reliability, thereby enhancing 5-layer performance with equalizers, demodulators, and beam formation by reducing computation and/or improving the performance of these components or functions.

In one embodiment, the present invention provides a system for dynamic spectrum utilization management in an electromagnetic environment comprising: at least one sensor unit operable to measure radiofrequency (RF) data, an RF analysis engine operable to extract physical layer data from the measured RF data, wherein the RF analysis engine is operable to analyze or process the extracted physical layer data from the measured RF data, wherein the at least one sensor unit and the RF analysis engine are provided in a single chip, a single chipset, multiple chips, multiple chipsets, or on a single circuit board for real time dynamic spectrum sharing for the electromagnetic environment, wherein the single chip, the single chipset, the multiple chips, the multiple chipsets, or the single circuit board are provided on a single electronic device, wherein the single electronic device is operable to send the analyzed or processed extracted physical layer data to a distributed data unit (DDU), a centralized unit (CU), a radio unit (RU), and/or a Multi-Access Edge Computing (MEC) layer, and wherein the analyzed or processed extracted physical layer data is used by the DDU, the CU, the RU, and/or MEC layer to create actionable data for optimizing network resources.

In another embodiment, the present invention provides a system for dynamic spectrum utilization management in an electromagnetic environment comprising: at least one sensor unit operable to measure radiofrequency (RF) data, an RF analysis engine operable to provide physical layer data based on the measured RF data, a customer programmable statistical interface, and a Multi-Access Edge Computing (MEC) layer in a network slice or a subnetwork, wherein the MEC layer is in communication with a radio access network (RAN) and a core network, wherein the at least one sensor unit, the RF analysis engine, the customer programmable statistical interface are provided in a single chip, a single chipset, multiple chips, multiple chipsets, or on a single circuit board, wherein the single chip, the single chipset, the multiple chips, the multiple chipsets, or the single circuit board are provided on an electronic device, wherein the electronic device is operable to send the analyzed or processed extracted physical layer data to the MEC layer, and wherein the analyzed or processed extracted physical layer data is used by the MEC layer to create actionable data for optimizing network resources.

In yet another embodiment, the present invention provides an apparatus for dynamic spectrum utilization management in an electromagnetic environment comprising: an electronic device including a single chip, a single chipset, multiple chips, multiple chipsets, or a single circuit board, wherein the single chip, the single chipset, the multiple chips, the multiple chipsets, or the single circuit board includes at least one sensor unit operable to measure radiofrequency (RF) data and an RF analysis engine operable to provide physical layer data based on the measured RF data, wherein the RF analysis engine is operable to analyze or process the extracted physical layer data from the measured RF data, wherein the electronic device is operable to send the analyzed or processed extracted physical layer data to a distributed data unit (DDU), a centralized unit (CU), a radio unit (RU), and/or a Multi-Access Edge Computing (MEC) layer, wherein the analyzed or processed extracted physical layer data is used by the DDU, the CU, the RU, and/or MEC layer to create actionable data for optimizing network resources.

The system is operable to monitor the electromagnetic (e.g., RF) environment, analyze the electromagnetic environment, and extract environmental awareness of the electromagnetic environment. In a preferred embodiment, the system extracts the environmental awareness of the electromagnetic environment by including customer goals. In another embodiment, the system uses the environmental awareness with the customer goals and/or user defined policies and rules to extract actionable information to help the customer optimize the customer goals. The system combines and correlates other information sources with the extracted actionable information to enhance customer knowledge through dynamic spectrum utilization and prediction models.

In another embodiment, the at least one monitoring sensor includes at least one spectrum monitoring unit. Examples of monitoring units include those disclosed in U.S. Pat. Nos. 10,122,479, 10,219,163, 10,231,206, 10,237,770, 10,244,504, 10,257,727, 10,257,728, 10,257,729, 10,271,233, 10,299,149, 10,498,951, and 10,529,241, and U.S. Publication Nos. 20190215201, 20190364533, and 20200066132, each of which is incorporated herein by reference in its entirety. In one embodiment, the at least one spectrum monitoring unit includes a housing, at least one processor and memory, at least one receiver, and at least one sensor constructed and configured for sensing and measuring the electromagnetic environment.

FIG. 1 illustrates one embodiment of a network. The network (e.g., 5G network) includes both physical infrastructure and virtualized infrastructure. The physical infrastructure includes storage, computing resources, and networking resources. The virtualized infrastructure includes at least one radio access network (RAN), a multi-access edge computing (MEC) layer, and a core network. The core is operable to provide cellular and data services. The core provides network functions (NFs) and NF services. The core also is operable to provide network function virtualization (NFV) and software defined networking (SDN). NFV is operable to replace network functions (e.g., firewalls, load balancers, routers) with virtualized instances running as software. This eliminates the need to invest in many expensive hardware elements and can also accelerate installation times, thereby providing revenue generating services to the customer faster. The virtualized infrastructure further includes management and orchestration (MANO). The MANO is operable to coordinate network resources and network services. The MANO includes, but is not limited to, a NFV orchestrator (NFVO), a virtual network function manager (VNFM), and a virtual infrastructure manager (VIM). The virtualized infrastructure preferably also includes Operation Support Systems/Business Support Systems (OSS/BSS).

The present invention is operable to provide physical layer management operable to be optimized by slice or customer. This includes optimization of network resources based on physical layer measurements and/or slice or customer goals. The present invention is operable to aggregate a plurality of RAN resources associated with a slice or a customer subnetwork and optimize the plurality of RAN resources based on the RF environment and the quality of service (QoS) required by at least one application.

The network includes at least one network slice. Each network slice is administered by a mobile virtual network operator (MVNO). At least one tenant occupies each network slice (e.g., two tenants are operable to share a network slice) offered by the MVNO. At least one user equipment (UE) is connected to the network via 3rd Generation Partnership Project (3GPP) protocols and/or non-3GPP protocols using at least one radio access technology (RAT). The at least one RAT includes, but is not limited to, BLUETOOTH, WI-FI, Global System for Mobile Communications (GSM), Universal Mobile Telecommunications System (UMTS), Long-Term Evolution (LTE), 5G New Radio (NR), long range (LoRa), and/or Push-to-Talk (PTT). The UE includes, but is not limited to, a smartphone, a mobile device, a tablet, a computer, a router, an internet of things (IoT) transceiver, and/or any other user equipment transmitting and/or receiving wireless radiofrequency messages. In one embodiment, one or more of the at least one UE includes embedded sub-sensors and/or is operable to perform RF analysis.

The at least one RAT interfaces with a radio access network (RAN). The RAN is operable to provide network connectivity to the at least one UE using at least one radio frequency. The RAN is operable to communicate with a multi-access edge computing (MEC) layer. The MEC is operable to provide resource optimization per application. The MEC is operable to communicate with a core. The core is operable to provide aggregated traffic policies and/or quality of service (QoS) recommendations.

In one embodiment, at least one sensor unit (SU) is used with a network (e.g., 5G network) to provide RF awareness in spectrum bands as shown in FIG. 1. In one embodiment, the spectrum bands include spectrum bands of interest and/or adjacent bands to the spectrum bands of interest. The at least one SU is preferably operable to share information with the RAN, the MEC, and/or the core. In one embodiment, information from the at least one sensor unit is passed to the RAN, the MEC, and/or the core of each slice in the network as shown in FIG. 1. By interacting with the MEC, applications that require optimization of physical layer resources (e.g., low latency, high reliability, high bandwidth, spectrum sharing) are operable to be optimized by properly assigning resources based on RF environmental conditions as well as network resource availability. Advantageously, properly assigning resources allows for the applications to work properly. The at least one sensor unit interfaces with the RAN to communicate resource assignment recommendations for implementation. The sensors also interface with the core in each slice through an Access and Mobility Management Function (AMF) in the core to help aggregate resources for applications and services requiring special physical layer parameters.

In one embodiment, the at least one sensor unit is collocated with the at least one RU in the RAN. Alternatively, the at least one sensor unit is within an area of coverage of the access point's RU (e.g., between 10 m to 1 km depending on the area of coverage of a single access or base station). In one embodiment, the at least one sensor unit connects to at least one DU in the RAN through a data format as described infra.

In one embodiment, one or more of the at least one sensor unit is operable to use existing antennas of the RUs in the RAN. In one embodiment, the one or more of the at least one sensor unit is included as an RU board within the RU structure in the RAN. In one embodiment, the one or more of the at least one sensor unit is assigned an identifier (e.g., RU identifier number). In one embodiment, the identifier is assigned using 3GPP and/or ORAN standards. In one embodiment, one or more of remaining sensor units (e.g., sensor units not operable to use existing antennas of the RUs in the RAN) are distributed into the DUs and/or CUs of the RAN. In one embodiment, antennas are deployed within the coverage range of each access point or base station (e.g., if one or more of the at least one sensor unit is not operable to use existing antennas of the RUs in the RAN) and resulting data is passed to the MEC through the core orchestration connection.

In one embodiment, the present invention includes a RAN interface operable to provide resource allocation recommendations, a MEC interface operable to provide resource optimization per application, and/or a core interface operable to provide aggregated traffic policies and/or quality of service (QoS) recommendations.

The system is operable to provide at least one network resources optimization recommendation from the MEC to the core. In one embodiment, during network setup and through the orchestration layer (e.g., using the MANO functions), a MEC function is configured to receive CU information from each RAN in the customer subnet or slice containing the RF awareness information and/or pertinent actionable data, which is routed to the network optimization application software. In one embodiment, the network optimization application software includes decision gates. In one embodiment, the network optimization application software is run in the MEC as a third-party function. In one embodiment, the core and/or the MEC are reconfigured through the MANO and/or the MEC orchestrator to act on data provided by the network optimization application software and/or allow the MEC application to generate RAN commands to change appropriate RAN parameters.

Figure 2:
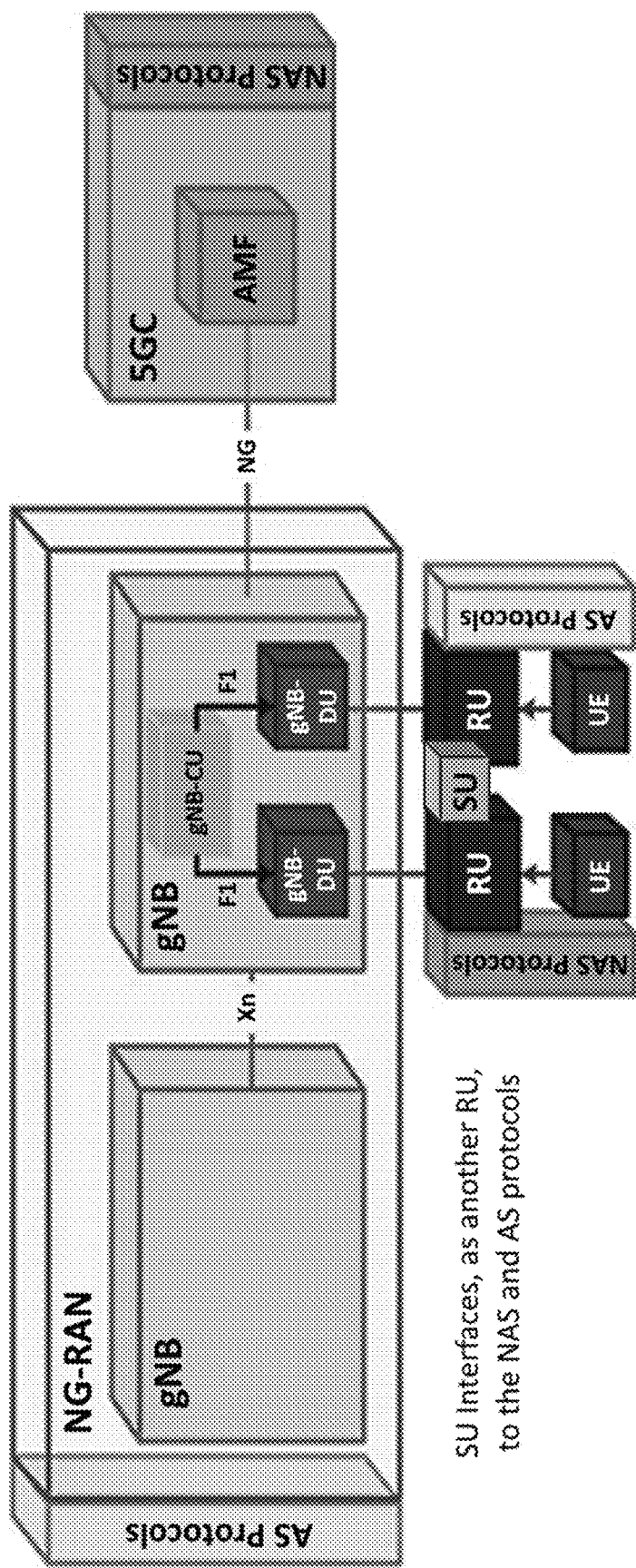
FIG. 2 illustrates one embodiment of a RAN interface.

FIG. 2 illustrates one embodiment of a RAN interface. The at least one sensor unit is operable to act like an additional radio unit (RU), and thus is operable to interact with a base station. In one embodiment, the base station includes, but is not limited to, a Node B (NB), an eNode B (evolved NB), a gNB-CU (a next generation node base station central unit), a gNB-DU (a next generation node base station distributed unit), a base transceiver station (BTS), a radio base station, a radio transceiver, a transceiver function, a basic service set (BSS), an extended service set (ESS), and/or an access point (AP) (e.g., a wireless access point). In one embodiment, the at least one sensor unit is operable to interface with the base station through Non-Access Stratum (NAS) and Access Stratum (AS) functional layer protocols. The at least one sensor unit is further operable to interface with the core through the AMF to help affect connection management and resource aggregations per application.

Figure 3:
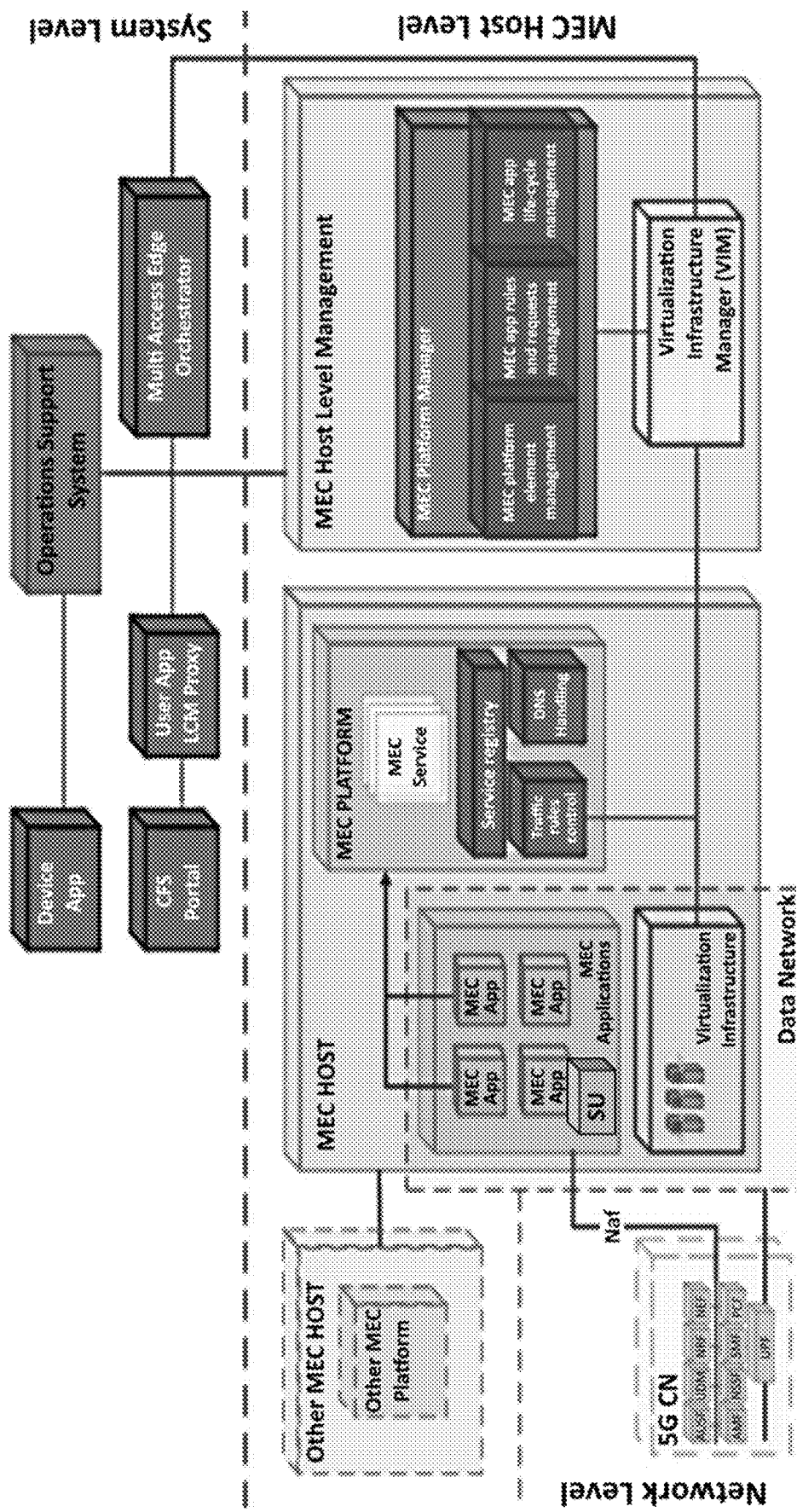
FIG. 3 illustrates one embodiment of a Multi-Access Edge Computing (MEC) layer.

As previously described, a Multi-Access Edge Computing (MEC) layer is included in the slice to support cloud computing at the slice portion of the network as shown in FIG. 3. The MEC allows for applications and/or cloud computing at the edge of the network. The MEC level includes at least one MEC Host. The at least one MEC Host preferably includes a MEC Platform, MEC applications, and/or MEC Virtualization Infrastructure. In one embodiment, the MEC applications are hosted on a MEC application server. The MEC application server is preferably operable to support multi-tenancy. The MEC applications are provided by at least one equipment vendor, at least one customer, at least one service provider, and/or at least one third party. The at least one MEC Host is operable to provide a virtualization environment to run the MEC applications.

The MEC Platform includes, but is not limited to, a MEC Service, a service registry, traffic rules control, and/or domain name service (DNS) handling. The MEC Platform is operable to run the MEC applications using the MEC Virtualization Infrastructure. The MEC Host is preferably operable to interface with at least one other MEC Host, which includes at least one other MEC Platform.

The MEC Host is in network communication with MEC Host Level Management. The MEC Host Level Management preferably includes a MEC Platform Manager and/or a Virtualization Infrastructure Manager (VIM). The MEC Platform Manager is operable to provide MEC Platform element management, MEC application rules and requests management, and/or MEC application life-cycle management. The MEC Host Level Management is operable to interface with system level resources including, but not limited to, a device application, a Customer Facing Service (CFS) portal, a user application life-cycle management (LCM) proxy, an operations support system, and/or a MEC orchestrator.

In one embodiment, the at least one sensor unit interfaces with an optimization application in the MEC Host as another application with its associate service registry and management as shown in FIG. 3.

In one embodiment, the at least one sensor unit interfaces with the MEC through the core (e.g., the 5G slice's core) or the NAF function from the CU interface. In one embodiment, network resource optimization and/or customer decision gates (e.g., for mission critical applications) are conducted in the MEC. In one embodiment, the network resource optimization and/or the customer decision gates are provided as at least one MEC application in the MEC platform. In one embodiment, the at least one MEC application is configured in the MEC management layers through virtual infrastructure management at the orchestration and MANO levels. In one embodiment, the MEC is compatible with 3GPP release 16. The present invention is compatible with additional 3GPP protocols and releases.

Figure 4:
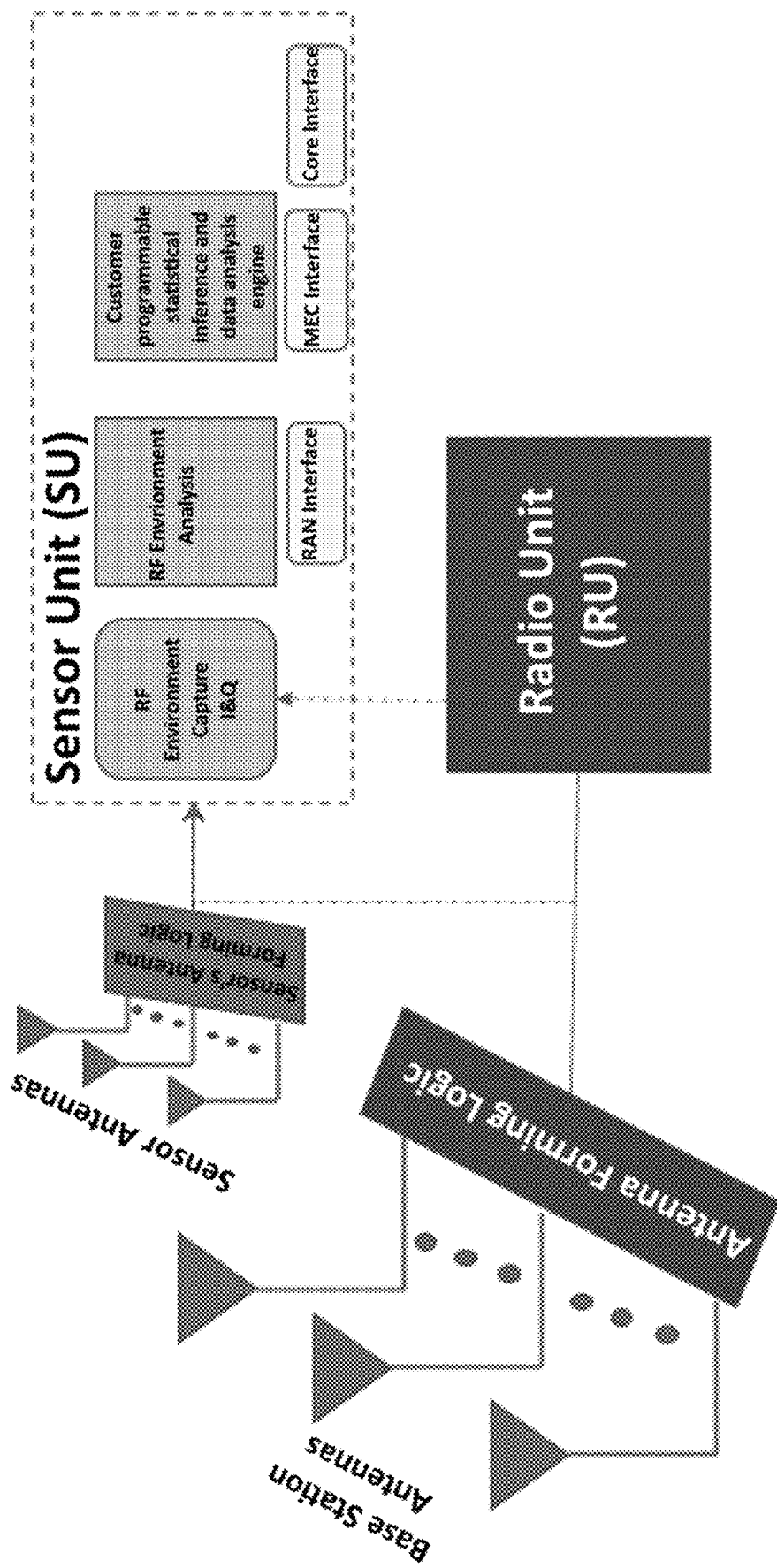
FIG. 4 illustrates one embodiment of the at least one sensor unit operable to interface with the physical layer.
Figure 5:
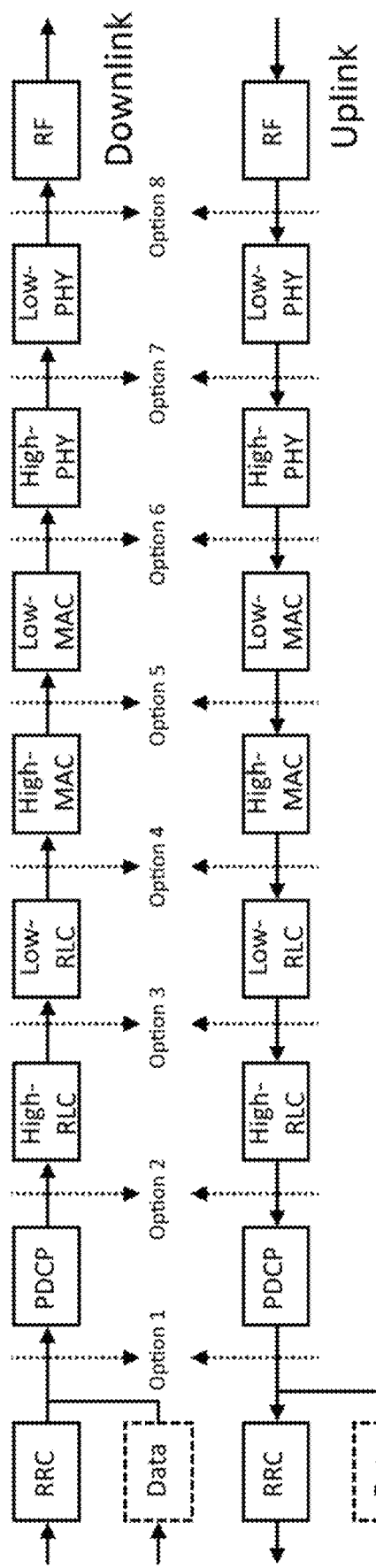
FIG. 5 illustrates possible functional splits between central and distributed units.
Figure 6:
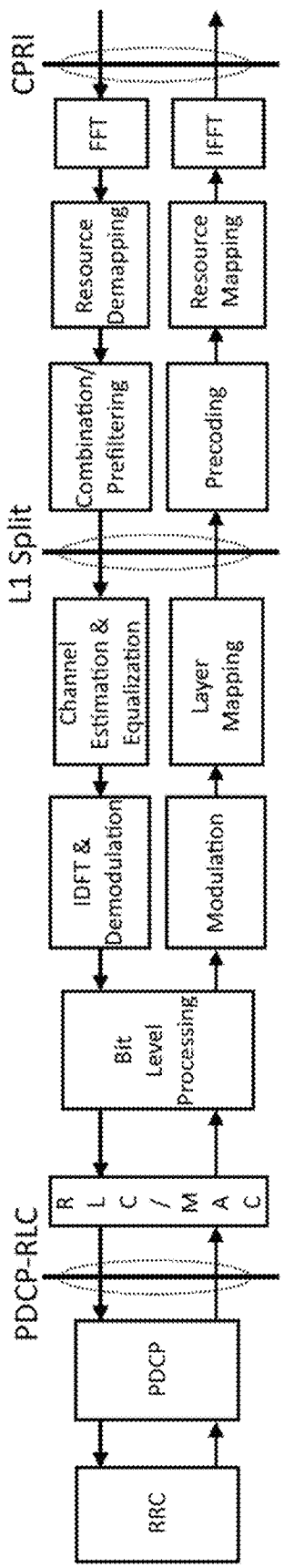
FIG. 6 illustrates another example of possible functional splits.
Figure 7:
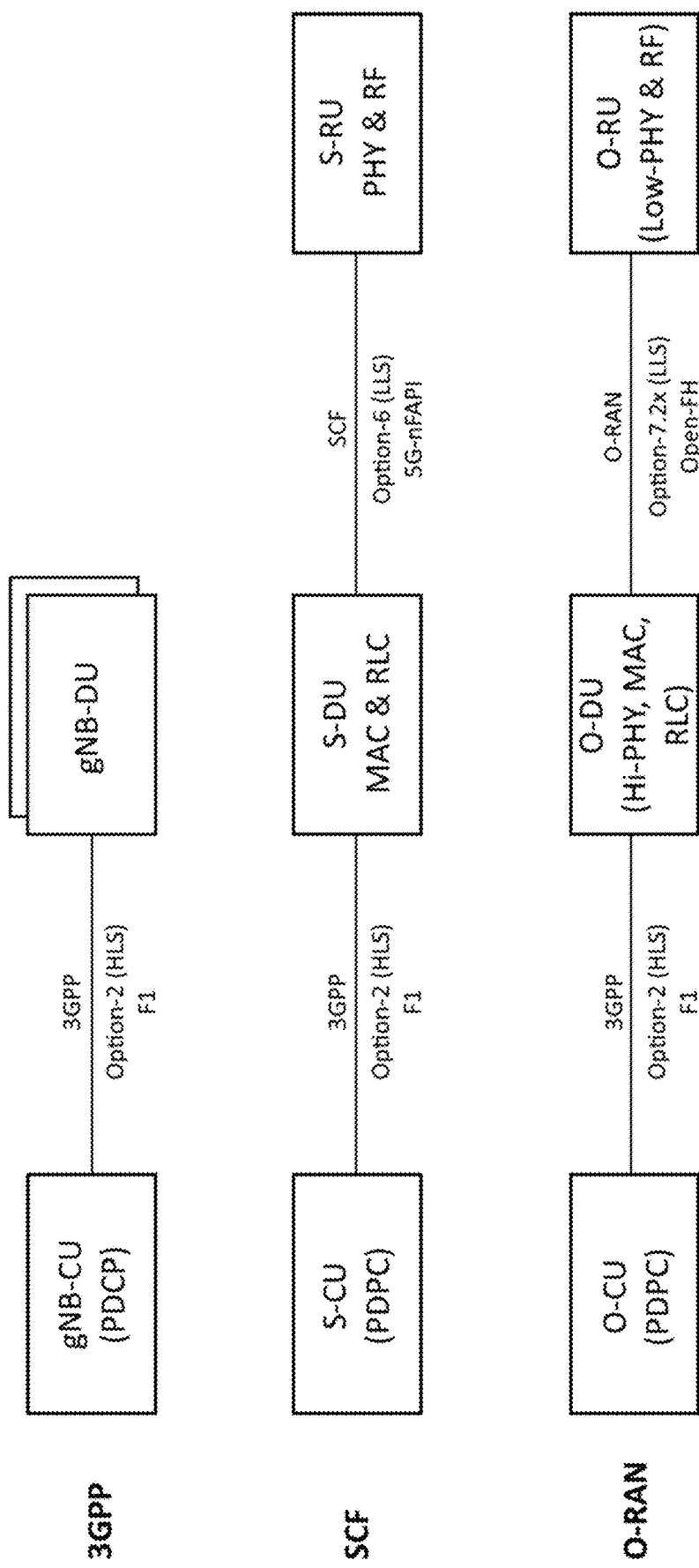
FIG. 7 illustrates 3GPP, Small Cell Forum (SCF), and O-RAN possible functional splits.

In one embodiment, the at least one sensor unit is operable to interface with the physical layer (e.g., base stations, radio units, antennas, associated antenna forming logic) as shown in FIG. 4. In one embodiment, the at least one sensor unit is operable to share at least one antenna with a base station. The at least one antenna preferably covers at least one band of interest and/or at least one adjacent band to the at least one band of interest to obtain situational awareness. Additionally or alternatively, the at least one sensor unit includes at least one antenna. In one embodiment, the at least one sensor unit captures data related to the RF environment. The at least one sensor unit is operable to analyze data captured by the at least one antenna from the base station and/or the at least one sensor unit, thereby creating analyzed data.

In one embodiment, information from the base station antennas is passed to the at least one sensor unit. In one embodiment, the RAN follows the O-RAN standards or the 3GPP new RAN standards, which provide for an interface to pass data (e.g., metadata) from each antenna to the RUs. In one embodiment, the data includes, but is not limited to, an antenna number, parameters associated with the antenna number, a beam number, parameters associated with the beam number, and/or I&Q data. In one embodiment, the system is operable to act as another RU or RU software embedded application in the RAN. In one embodiment, a destination RU is selected. In one embodiment, identification of the destination RU (e.g., using bits) is done during configuration and/or orchestration to add an RU independent of the existing RUs in the RAN.

Analyzed data is passed to a statistical inference and machine learning (ML) engine. The statistical inference and ML engine utilizes statistical learning techniques and/or control theory to learn the electromagnetic environment and make predictions about the electromagnetic environment. The statistical inference and ML engine is preferably programmed according to customer goals regarding a customer application. The statistical inference and data analysis engine preferably identifies relevant information required by the customer application to reach the customer goals. Advantageously, this decreases the amount of analyzed data that must be processed. The relevant information is used along with network information to identify physical layer resources (e.g., antenna, resource blocks, modulation parameters, bandwidth, spectrum sharing, spectrum aggregation) required for each application to perform properly. An optimization of resource assignment is conducted. In one embodiment, the optimization of resource assignment is conducted in the MEC as an application. Alternatively, the optimization of resource assignment is conducted in the at least one sensor unit.

In one embodiment, the statistical inference and ML engine interfaces with the MEC using at least one application. In one embodiment, the present invention follows the MEC application interphase protocols to communicate with the MEC MANO layer. Advantageously, performing optimization in the MEC as an application provides the lowest network transportation latency due to its proximity to the RAN. Further, performing optimization in the MEC as an application provides the ability to add computation and storage resources during configuration through the MANO and orchestration layer.

In one embodiment, the optimization of resource assignment is conducted in the at least one sensor unit. Advantageously, if the optimization is performed in the at least one sensor unit, no interface is needed with the RU, DU, and/or CU of the RAN. All data is passed to the MEC and core of all slices of the customer subnetwork. The main advantage is minimizing latency at the cost of power and computation limitations (e.g., optimizations are operable to be performed for a limited number of customer goals). In one embodiment, if multiple RU and DU are aggregated in a single CU, the system requires a plurality of sensor units.

As previously described, in one embodiment, the at least one sensor unit is operable to share at least one antenna with the base station. In one embodiment, no antenna forming logic is used, and antenna outputs are provided in the analog domain if a splitter is used for the at least one antenna. Alternatively, antenna forming logic is used, and antenna outputs are shared with the at least one sensor unit by passing information (e.g., beam identifier along with the antenna forming logic analog output or digital output). The at least one sensor unit is operable to derive associated I & Q data for RF environment analysis. Additionally or alternatively, the at least one sensor unit includes at least one antenna. For example, if the at least one antenna from the base station is not operable to be shared and/or does not include the at least one band of interest, then the at least one sensor unit includes at least one antenna and is operable to provide antenna forming logic. In one embodiment, the radio unit is operable to share I & Q data (e.g., RF, IF, or baseband), and the at least one sensor unit is operable to consume the I & Q data. The I & Q data is preferably time-stamped. Additionally, the at least one sensor unit is preferably provided with any information specifying receiver beam information to obtain information including, but not limited to, beam azimuth, elevation, and/or beamwidth.

As previously described, the system is operable to optimize resources (e.g., in a 5G network). Resource optimization is typically done in the core, where aggregated key performance indicators (KPIs) from different access points are used to evaluate conditions of the network and inform the network management layer. In 5G networks, the RAN functions of the slice's core still use these KPIs for each slice in the customer subnetwork. MAC and IP layers are optimized based on customer network performance preference in the MANO layers of each subnetwork. The present invention is operable to provide RF awareness and actionable data, thus performing physical layer optimization (e.g., in the MEC) and making suggestions to the core about physical layer parameters. In one embodiment, the RF awareness information is filtered by the customer goals to provide actionable data for each customer goal or mission critical application. Priorities between applications are preferably configured during network set up or pushed down to the MEC through the MANO orchestration layer. The MEC is operable to service multiple slices, and each slice's core is operable to be configured to share information through the orchestration and management layers.

Standards for 5G networks include, but are not limited to, (1) 3GPP TS 36.201, Version 17.0.0 (Mar. 31, 2022); (2) 3GPP TS 36.211, Version 17.2.0 (Jun. 23, 2022); (3) 3GPP TS 36.212, Version 17.1.0 (Apr. 1, 2022); (4) 3GPP TS 36.213, Version 17.2.0 (Jun. 23, 2022); (5) 3GPP TS 36.214, Version 17.0.0 (Mar. 31, 2022); (6) 3GPP TS 36.216, Version 17.0.0 (Mar. 31, 2022); (7) 3GPP TS 36.201, Version 16.0.0 (Jul. 14, 2020); (8) 3GPP TS 36.211, Version 16.7.0 (Sep. 28, 2021); (9) 3GPP TS 36.212, Version 16.7.0 (Jan. 5, 2022); (10) 3GPP TS 36.213, Version 16.8.0 (Jan. 5, 2022); (11) 3GPP TS 36.214, Version 16.2.0 (Mar. 31, 2021); (12) 3GPP TS 36.216, Version 16.0.0 (Jul. 14, 2020); (13) 3GPP TS 38.321, Version 17.1.0 (Jul. 17, 2022); (14) 3GPP TS 38.321, Version 16.8.0 (Jul. 17, 2022); (15) 3GPP TS 23.501, Version 17.5.0 (Jun. 15, 2022); (16) 3GPP TS 23.501, Version 16.13.0 (Jun. 15, 2022); (17) 3GPP TS 23.558, Version 17.4.0 (Jun. 13, 2022); (18) 3GPP TS 28.531, Version 17.4.0 (Jun. 16, 2022); and (19) 3GPP TS 28.531, Version 16.12.0 (Dec. 23, 2021), each of which is incorporated herein by reference in its entirety.

Figure 8:
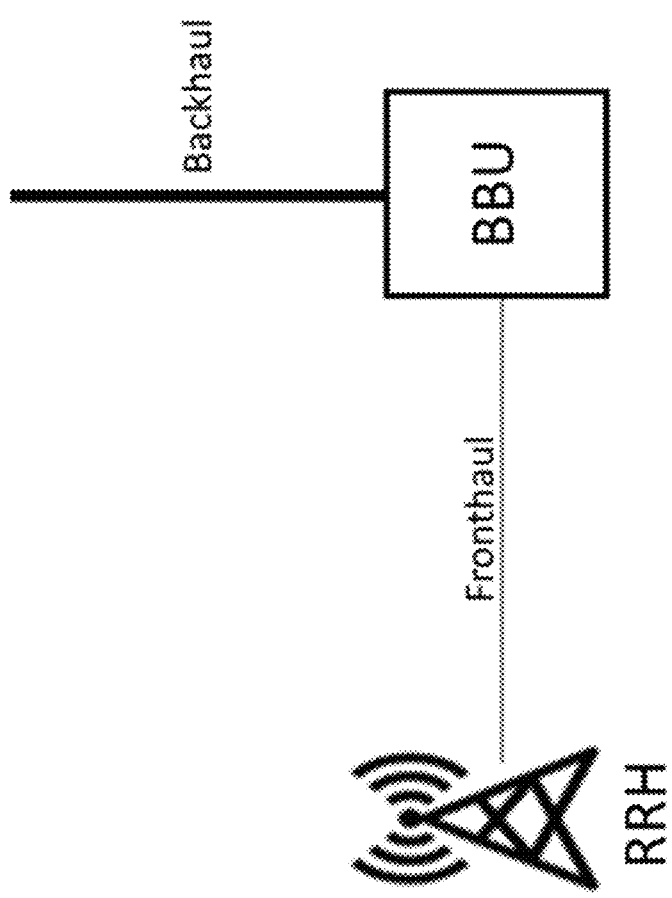
FIG. 8 illustrates an example of a traditional base station with a remote radio head (RRH).

FIG. 8 illustrates an example of a traditional base station with a remote radio head (RRH). The base station or base band unit (BBU) and the RRH connected via a high bandwidth fiber connection (i.e., fronthaul). Generally, current LTE macro cell sites include equipment positioned at the bottom of a tower and an RRH positioned at the top of the tower.

Figure 9:
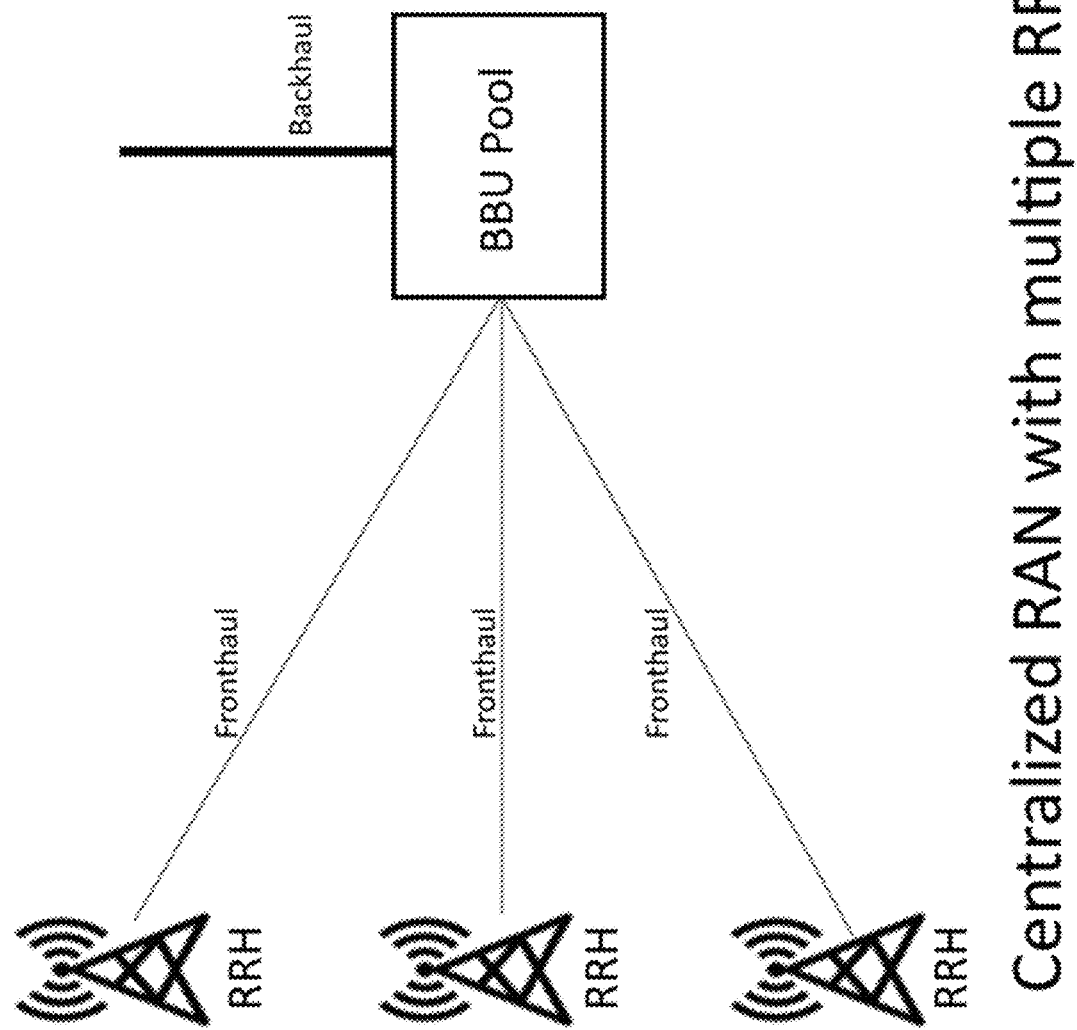
FIG. 9 illustrates an example of a centralized RAN (C-RAN).

FIG. 9 illustrates an example of a centralized RAN (C-RAN). A plurality of RRHs is connected to a BBU pool via a plurality of fronthaul connections. Generally, the BBU pool is located a few miles from the RRH.

Figure 10:
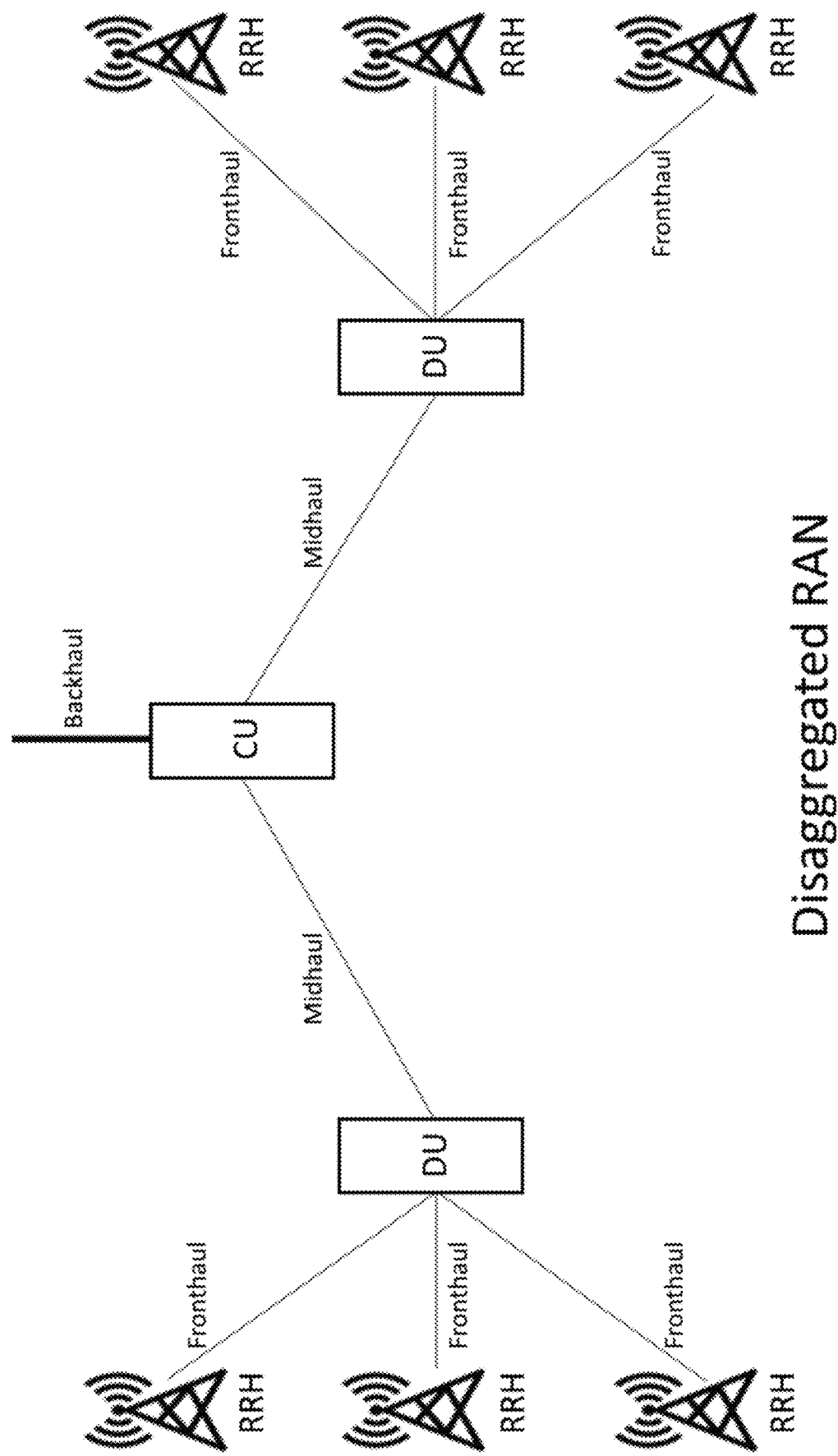
FIG. 10 illustrates one embodiment of an open, disaggregated RAN.

A plurality of protocol standards including, but not limited to, Common Public Radio Interface (CPRI), Open Base Station Architecture Initiative (OBSAI), and Open Radio Equipment Interface (ETSI-ORI), govern transport of data on the fronthaul. CPRI is the most used standard for LTE. Advantageously, CPRI allows for customization, so RAN vendors included a significant amount of proprietary customization. However, this proprietary customization led to a significant amount of interoperability issues between radio equipment and baseband processing equipment from different vendors. To resolve the interoperability issues, an open, disaggregated RAN has been proposed as shown in FIG. 10.

Additionally, transporting LTE data rates using CPRI transport required significant fiber bandwidth, which is expensive and created deployment problems. As such, many vendors have determined that CPRI is not sufficient for fronthaul requirements. 5G applications often require low latency, which makes fiber bandwidth a significant issue. In some embodiments, 5G is operable to deliver at least 10 times up to at least 100 times faster data rates than LTE. In one embodiment, a 5G base station is operable to deliver a data rate of at least 10 Gpbs. In comparison, an LTE base station is operable to deliver a data rate of less than 1 Gbps.

5G deployments utilize enhanced CPRI (eCPRI) or radio over ethernet (RoE) for transport on the fronthaul between DUs and RUs. eCPRI is a fronthaul protocol defined by the CPRI Forum. The eCPRI protocol is operable to deliver higher data rates via compression techniques. RoE is protocol defined by the IEEE 1914.3 working group. The RoE protocol defines encapsulation and mappings of radio protocols via ethernet frames. Option 7-2 supports both eCPRI and RoE transport options. The partition of features is operable to change the information payload between RAN components.

Figure 11:
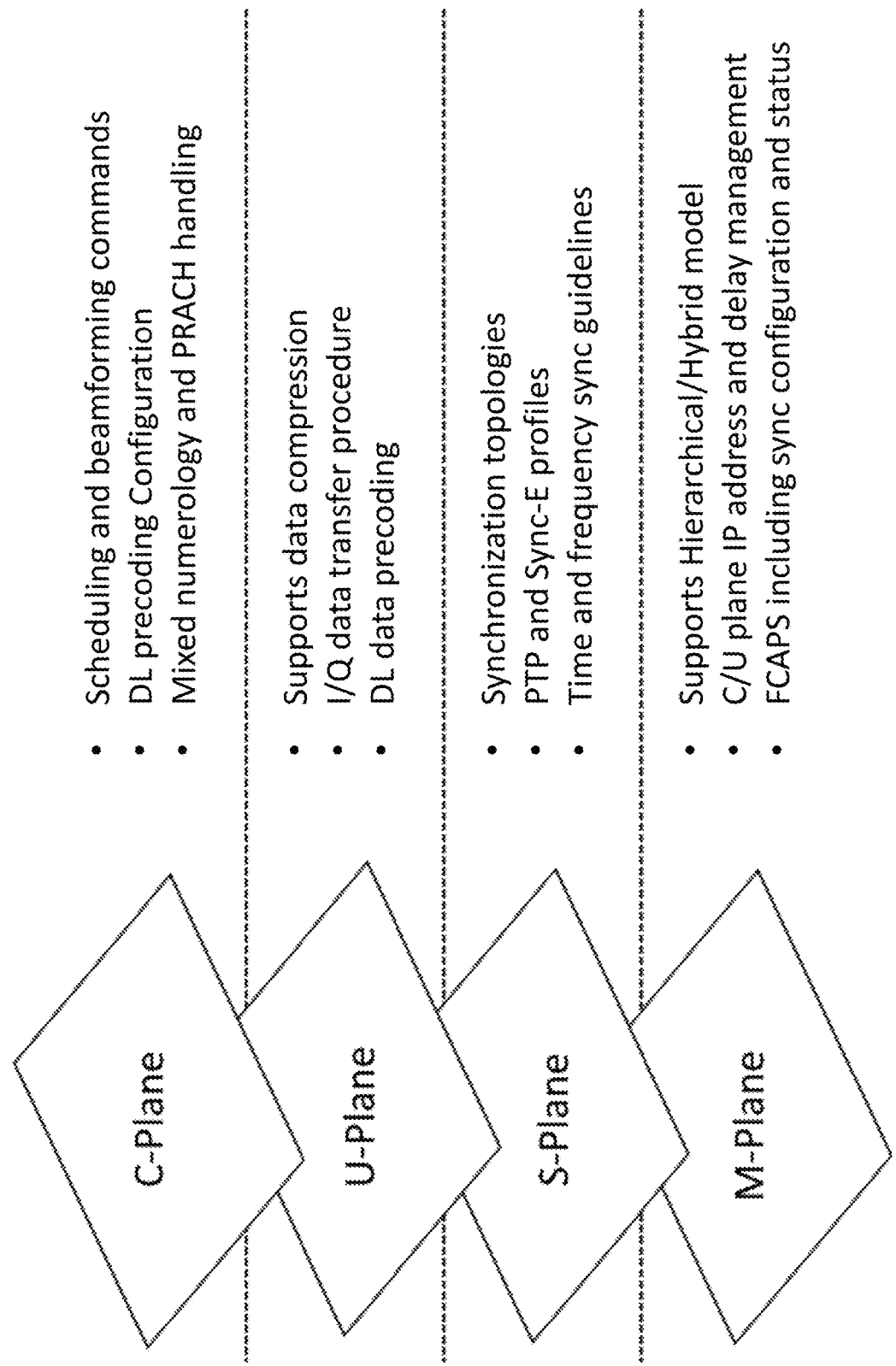
FIG. 11 illustrates one embodiment of several planes of operation described in the O-RAN Fronthaul specification.

The O-RAN Fronthaul specification addresses the issues with interoperability between the radio equipment and baseband processing equipment. The O-RAN Fronthaul specification defines several planes of operation, including a control plane (C-Plane), user plane (U-Plane), a synchronization plane (S-Plane), and a management plane (M-Plane) as shown in FIG. 11. The C-Plane is operable to utilize message to define scheduling and coordination required to transfer control signal data (e.g., beamforming for 5G). The U-Plane is operable to utilize messages to define transfer of user data. The S-Plane provides timing and synchronization between the DU and the RU. The M-Plane is operable to provide management of the radio unit via messages.

Figure 12:
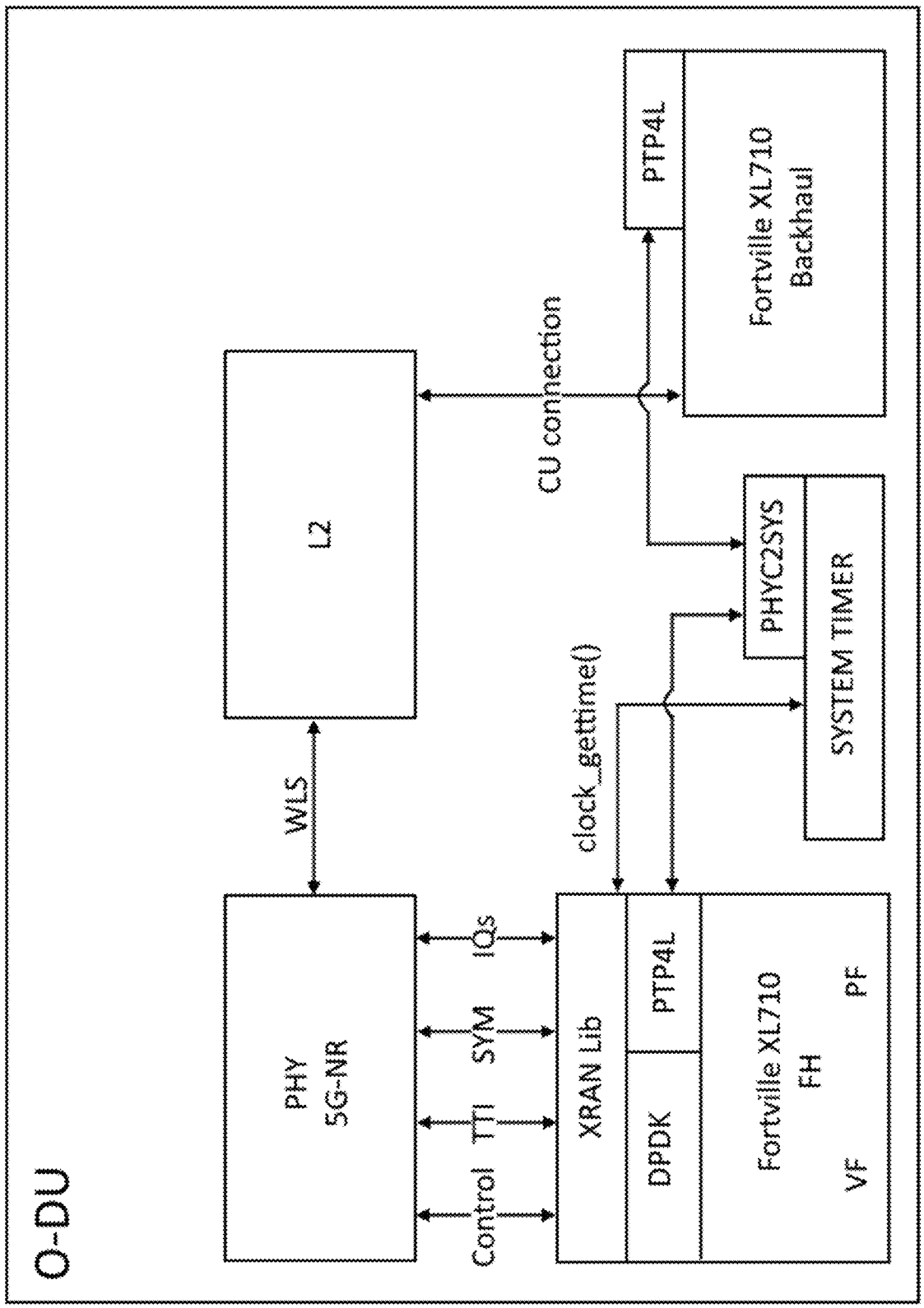
FIG. 12 illustrates one embodiment of a fronthaul interface according to the O-RAN Fronthaul specification.

FIG. 12 illustrates one embodiment of a fronthaul interface according to the O-RAN Fronthaul specification. The O-RAN fronthaul provides communication between the O-RAN distributed unit (O-DU) and the O-RAN radio unit (O-RU). In one embodiment, the system includes a sensor unit (SU) including multiple hardware and software components.

In one embodiment, the SU is integrated into the DU. In one embodiment, the SU appears like a PHY algorithm and appends data to the WLS-CU interface message.

Hardware components include two networking ports. The two networking ports are operable to communication to the fronthaul network and the backhaul and/or midhaul network. The two networking ports are also operable to receive precision time protocol (PTP) synchronization. A system timer is operable to provide timing to the gNB application. Software components include a PTP software (e.g., a Linux PTP) to synchronize to the system timer to a global time (e.g., GPS timer), a PTP4L program operable to synchronize an oscillator on a network interface controller (NIC) to the PTP grandmaster (GM), a Phyc2sys program to synchronize the system timer to the oscillator on the NIC, a data plane development kit (DPDK) operable to provide an interface to an ethernet port, and/or an xRAN library to provide U-Plane and C-Plane functionality. PHY uses the xRAN library to access an interface to the O-RU. PHY uses a set of MAC/PHY APIs and a shared memory interface (WLS) to communicate with an L2 application. The L2 application is operable to use the backhaul and/or midhaul networking port to connect to the CU. The xRAN library and PHY are operable to communicate control (C-Plane) information, transmission time interval (TTI) information, symbol timing information, and/or IQ data.

Figure 13:
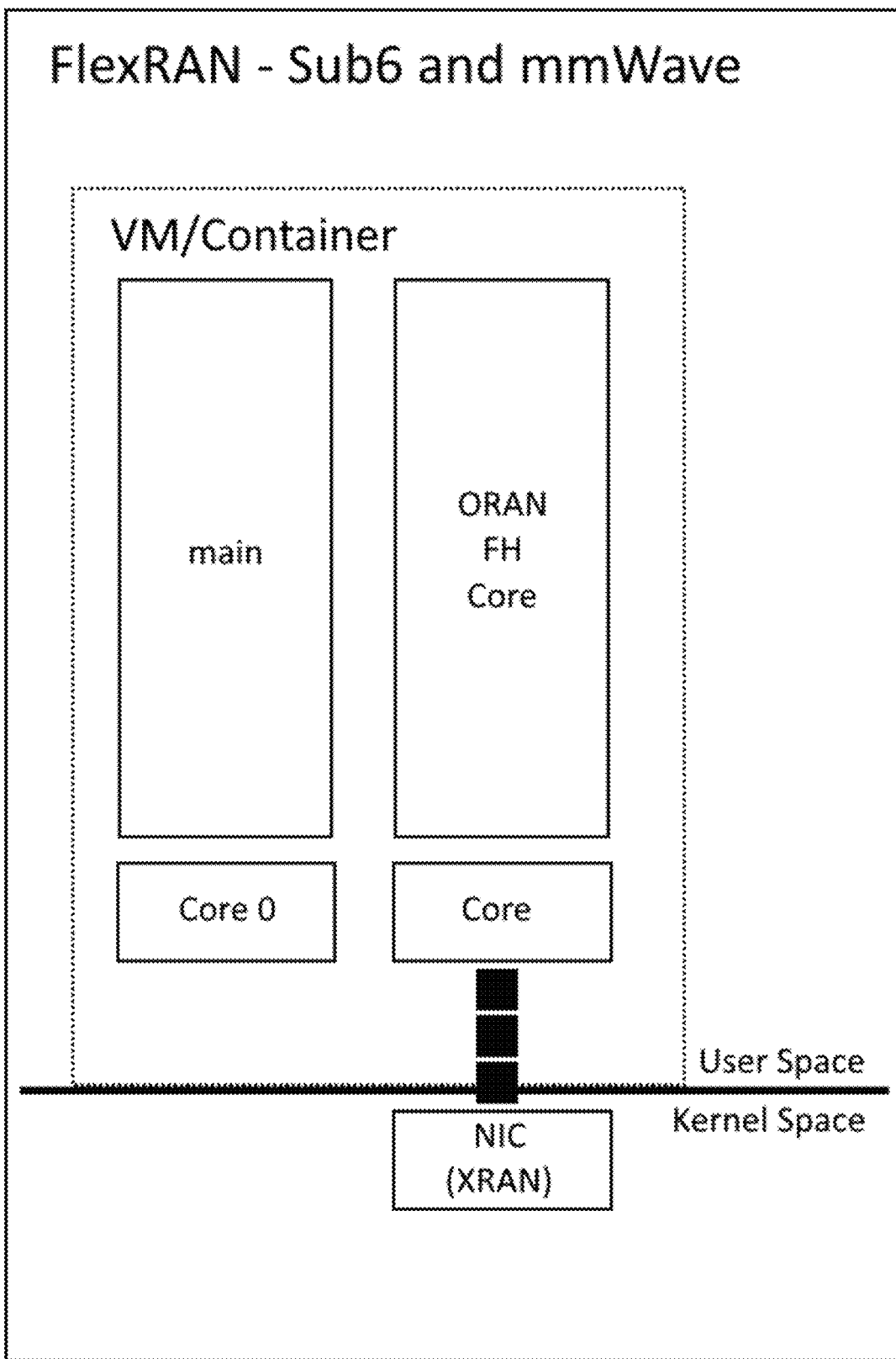
FIG. 13 illustrates one embodiment of the O-RU/SU part of the xRAN split.

FIG. 13 illustrates one embodiment of the O-RU/SU part of the xRAN split. In one embodiment, the at least one sensor unit is embedded in the ORAN block.

Figure 14:
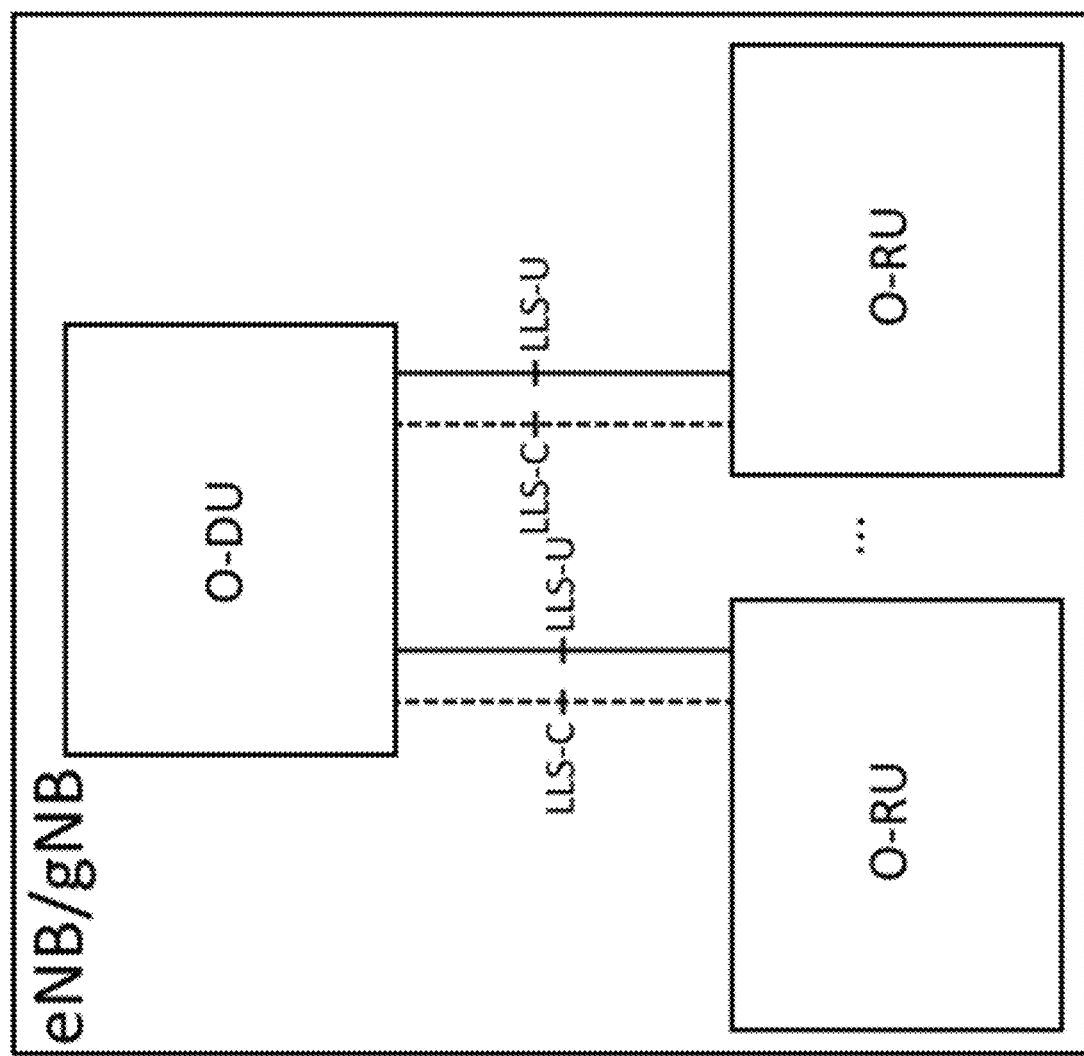
FIG. 14 illustrates e-NB/g-NB architecture including an O-DU and a plurality of radio units (O-RUs).

FIG. 14 illustrates e-NB/g-NB architecture including an O-DU and a plurality of radio units (O-RUs). In one embodiment, at least one SU is included in the e-NB/g-NB. In one embodiment, more than one RU and/or more than one SU is operable to be supported with the same implementation of the xRAN library.

In one embodiment, the SU is a stand alone unit (e.g., not incorporated into the RUs and/or DUs as computing software additions). In one embodiment, the stand-alone unit does not interface with the DUs and/or RUs in the ORAN. In one embodiment, the stand-alone unit interfaces with the MEC and/or the core.

Figure 15:
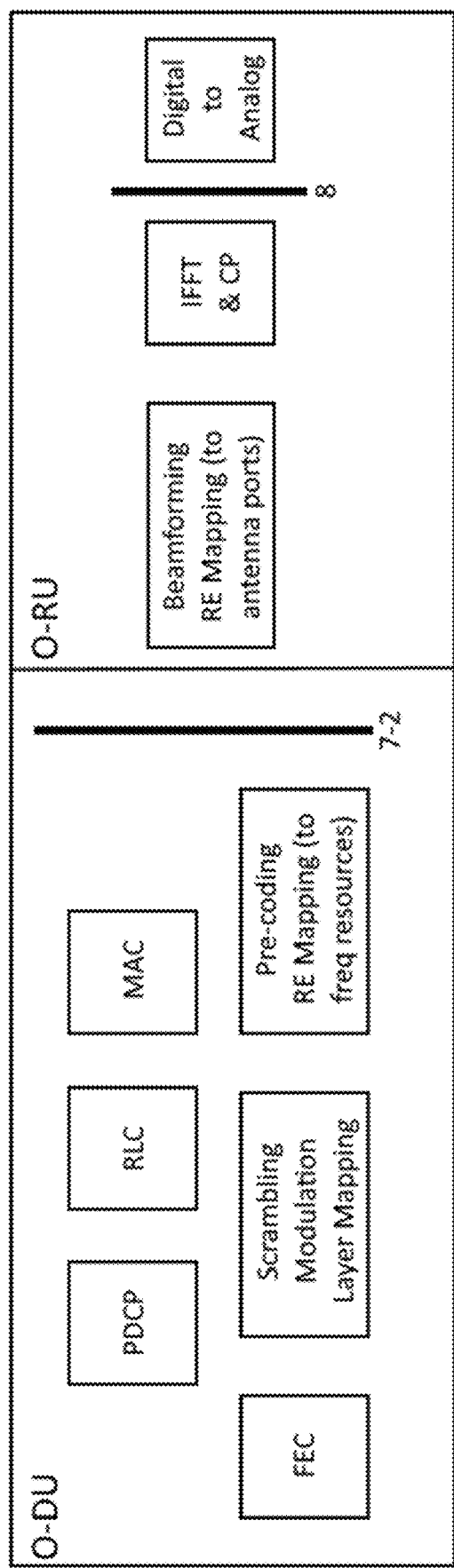
FIG. 15 illustrates one embodiment of a Layer 1 split.

As previously described, the O-RAN Fronthaul specification provides a plurality of splits of Layer 1 functionality between the O-DU and O-RU. FIG. 15 illustrates one embodiment of a Layer 1 split.

FIG. 16 is a table describing supported data flow for a single radio unit with a single component carrier. The U-Plane includes DL frequency domain IQ data, UL frequency domain IQ data, and PRACH frequency domain IQ data. The C-Plane includes scheduling commands. The S-plane includes timing and synchronization.

Figure 17:
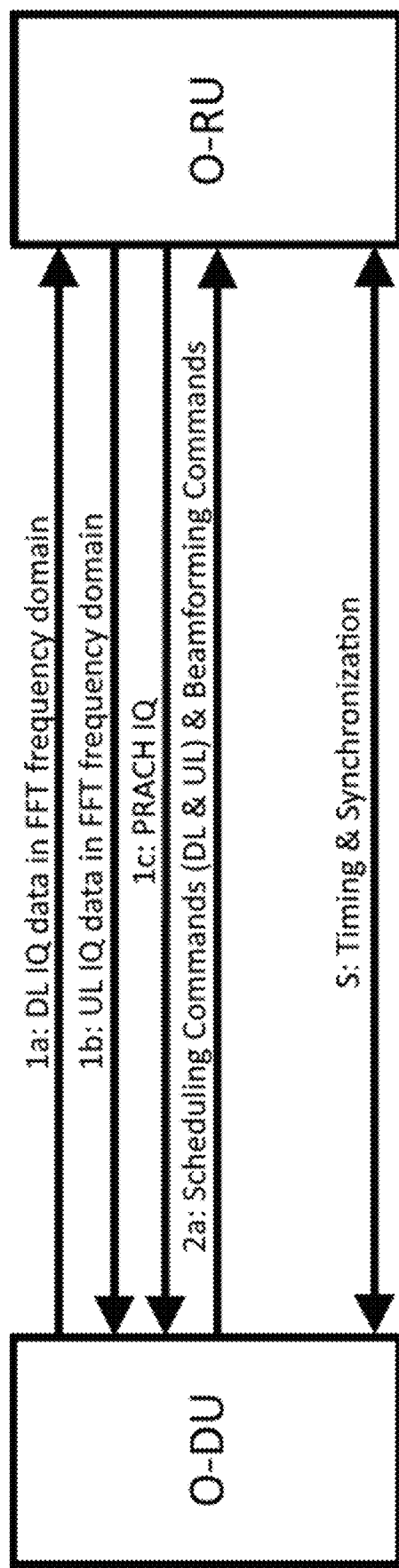
FIG. 17 illustrates one example of dataflows between the O-DU and the O-RU excluding M-Plane dataflows.

FIG. 17 illustrates one example of dataflows between the O-DU and the O-RU excluding M-Plane dataflows.

Figure 18:
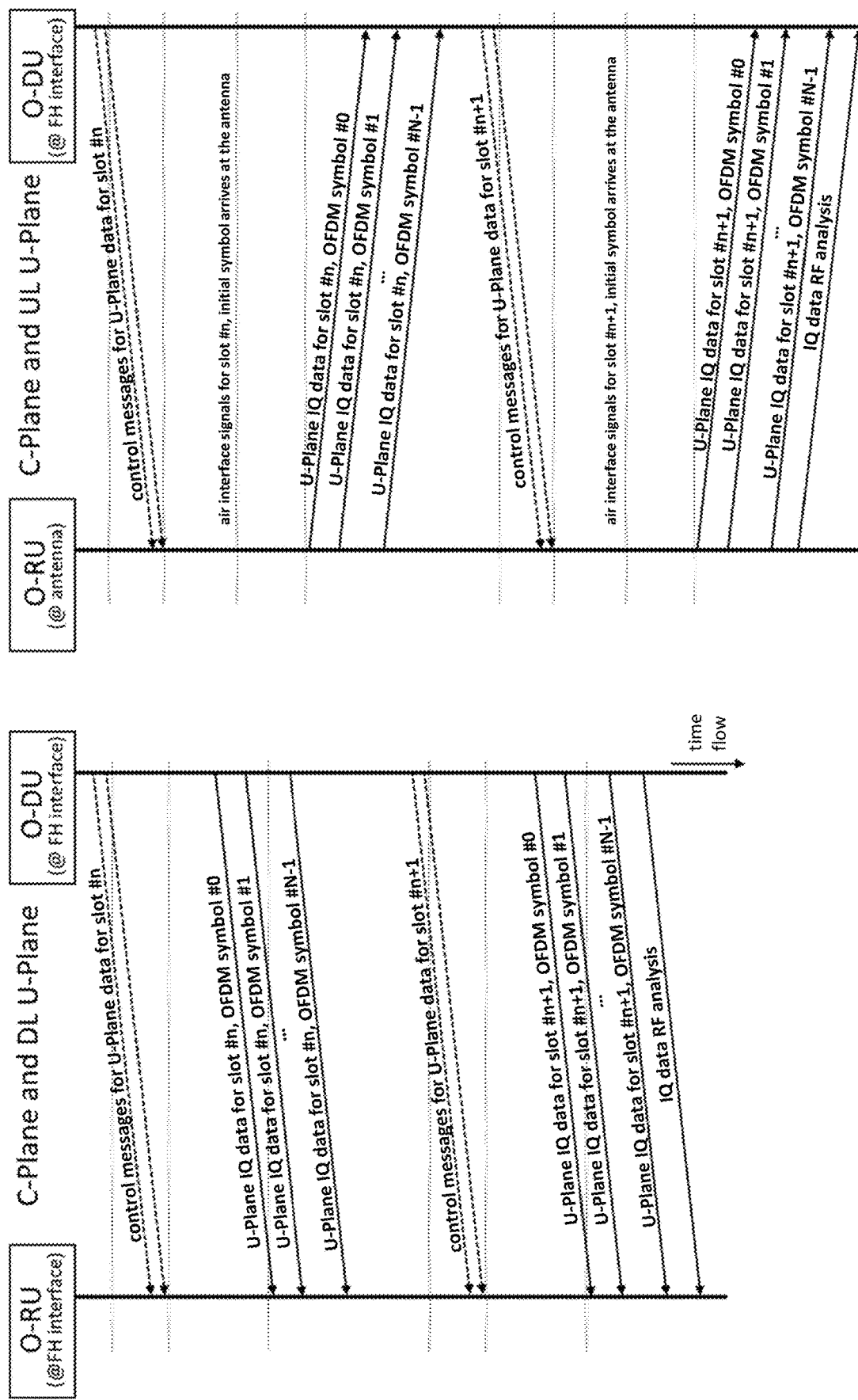
FIG. 18 illustrates an example of the C-Plane and U-Plane packet exchange.

FIG. 18 illustrates an example of the C-Plane and U-Plane packet exchange. The example shown in FIG. 18 does not include a Quality of Service (QoS) request.

The O-RAN Fronthaul specification defines a latency model of the fronthaul interface and interactions between the O-DU and the O-RU. The xRAN library is operable to support a defined transport method. The O-RAN Fronthaul specification further defines network transport requirements, and O-DU transmit and receive windows are based on the network transport requirements. Delay characteristics of at least one RU and/or at least one SU are determined within the timing domain framework (e.g., GPS time).

FIG. 19 is a table of default values used for the implementation of O-DU and O-RU/SU simulation with a mmWave scenario. FIGS. 20-21 are tables of default values used for the implementation of O-DU and O-RU/SU simulation with numerology 0 and numerology 1 examples, respectively, as defined in the O-RAN standard for Sub6 scenarios. The configuration is operable to be adjusted via configuration files for sample application and reference PHY.

Figure 22:
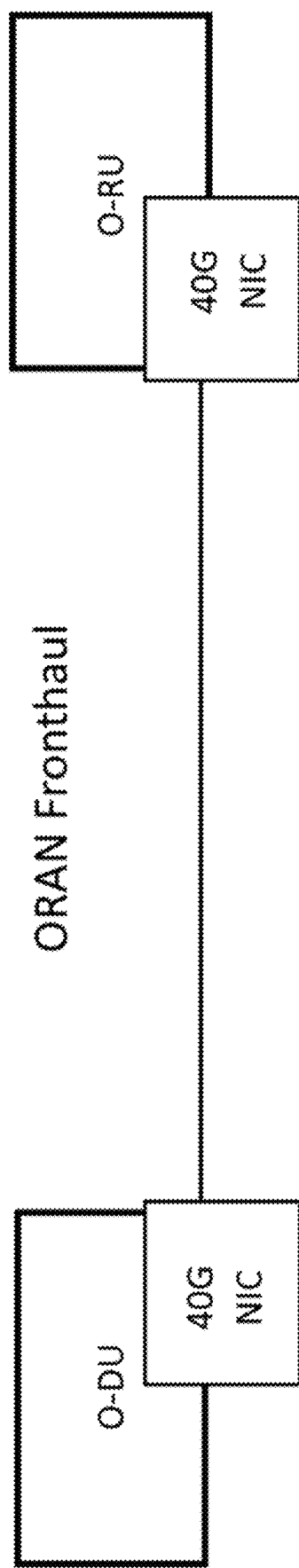
FIG. 22 illustrates one embodiment of an ORAN Fronthaul process.

FIG. 22 illustrates one embodiment of an ORAN Fronthaul process. The O-DU includes an O-DU network interface card (NIC), and the O-RU includes a O-RU NIC. The O-DU and the O-RU are connected between the O-DU NIC and the O-RU NIC.

In one embodiment, the xRAN library provides support for transporting In-band and Quadrature (IQ) samples between the O-DU and O-RU/SU within the xRAN architecture based on functional split option 7-2. The xRAN library defines xRAN packet formats operable to be used to transport radio samples via the fronthaul according to the O-RAN Fronthaul specification. Additionally, the xRAN library is operable to provide functionality to generate at least one xRAN packet, append IQ samples in a payload of the at least one xRAN packet, and/or extract IQ samples from the at least one xRAN packet.

Figure 23:
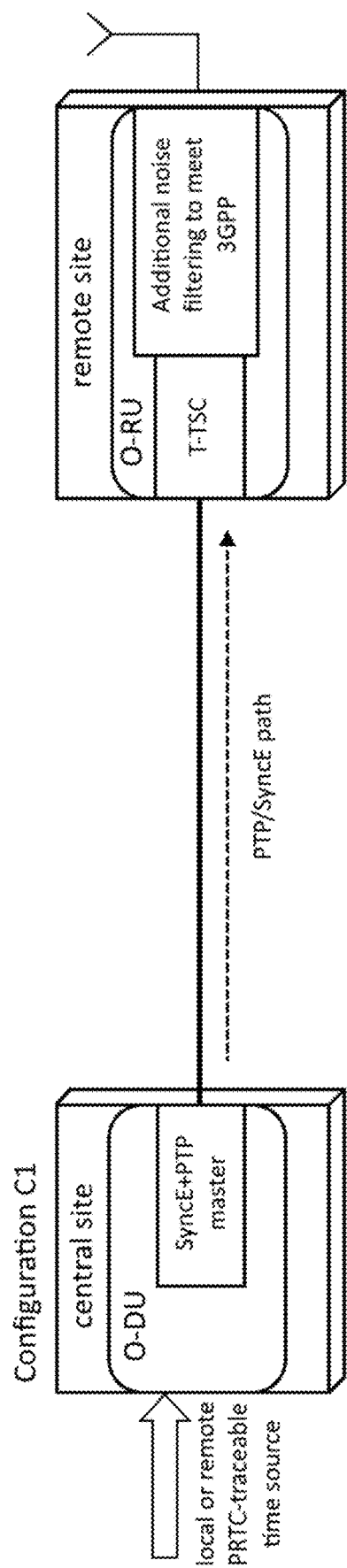
FIG. 23 illustrates Configuration LLS-C1.

FIG. 23 illustrates Configuration LLS-C1. Configuration LLS-C1 provides network timing distribution from the O-DU and to the O-RU via a point-to-point topology and a synchronized ethernet (SyncE).

Figure 24:
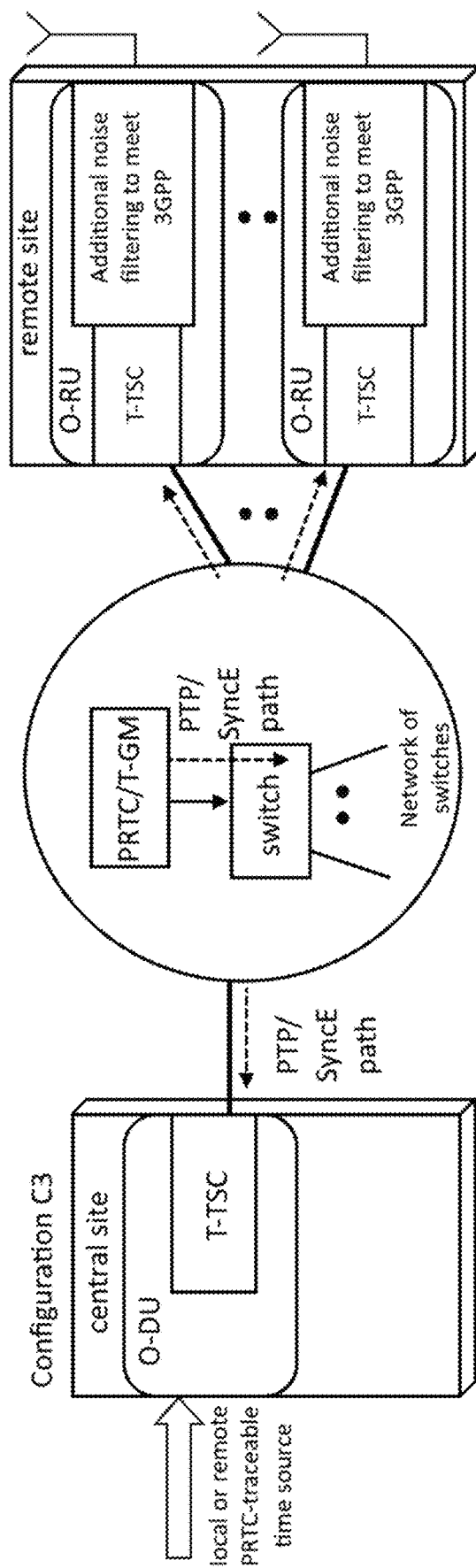
FIG. 24 illustrates Configuration LLS-C3.

FIG. 24 illustrates Configuration LLS-C3. Configuration LLS-C3 provides network timing distribution from the primary reference time clock/telecom grand master clock (PRTC/T-GM). A network of switches includes at least one ethernet switch.

The O-RAN Fronthaul specification defines a list of mandatory functionality. However, the list of mandatory functionality for the O-DU includes features that are not currently supported. See, e.g., Transport Layer and ORAN Fronthaul Protocol Implementation (2019), O-RAN Project Revision 70d9d920, available at https://docs.o-ran-sc.org/projects/o-ran-sc-o-du-phy/en/latest/Transport-Layer-and-ORAN-Fronthaul-Protocol-Implementation_fh.html #section-type-3-structure (last accessed Mar. 20, 2022), which is incorporated herein by reference in its entirety. Table 5 of Transport Layer and ORAN Fronthaul Protocol Implementation (2019) lists ORAN Mandatory and Optional Feature Support. Table 6 of Transport Layer and ORAN Fronthaul Protocol Implementation (2019) lists levels of validation for xRAN functionality.

O-RAN Fronthaul data is operable to be transported over ethernet or IPv4/IPv6. However, current implementation of the xRAN library only supports ethernet with a virtual local area network (VLAN). FIG. 25 illustrates one embodiment of a native ethernet frame with VLAN.

The O-RAN Fronthaul specification defines the transport header based on the eCPRI specification. FIG. 26 illustrates one embodiment of eCRPI header field definitions. FIG. 27 illustrates bit allocations of ecpriRtcid/ecpriPcid.

In one embodiment, an xRAN packet includes compression. In one embodiment, an xRAN packet including compression includes a Compression Header after each Application Header. The O-RAN Fronthaul specification defines the Compression Header. Alternatively, the xRAN packet does not include compression. In one embodiment, the xRAN packet not including compression does not include the Compression Header.

FIG. 28 illustrates xRAN packet components for DL/UL IQ data messages. In one embodiment, octet M+9 through M+12 and octet M+17 through M+19 is specified as sensor data. In one embodiment, the sensor data includes a location and/or a directionality relative to the DU.

FIG. 29 illustrates one embodiment of a common radio application header. In one embodiment, the filterIndex=0, frameId=[0:99], subframeId=[0:9], slotId=[0:7], and symbolId=[0:13].

In one embodiment, the common radio application header is followed by an application header that is operable to be repeated for each data section within an eCPRI message. FIG. 30 illustrates one embodiment of a data section application header. In one embodiment, a single section is used for an ethernet packet where IQ samples startPrbu is equal to 0 and numPrbu is equal to the number of RBs used. The rb field is not normally used (value=0). In one embodiment, the present invention assigns the rb field a specific value of 1. The symInc field is not normally used (value=0). In one embodiment, the present invention assigns the symInc field a specific value of 1. Alternative configurations are compatible with the present invention. Advantageously, this format provides flexibility. For example, and not limitation, octet 9 allows up to 8 payload versions and 16 filter indexes to be set. In one embodiment, at least one payload version and/or at least one filter index is operable to pass UL sensor information (e.g., if the UE includes sensor capabilities). In another embodiment, the at least payload version and/or the at least one filter index is operable to pass UE parameter values that have been optimized in the DL.

An xRAN packet data payload includes a plurality of physical resource blocks (PRBs). In one embodiment, each PRB includes 12 IQ samples. In one embodiment, the xRAN packet data payload includes udCompParam to indicate that compression is enabled. FIG. 31 illustrates one embodiment of an xRAN packet data payload.

In one embodiment, a C-Plane message includes a first header layer and a second header layer. The first header layer includes a standard eCPRI header including a message type and the second header layer includes an application layer operable to provide control and synchronization.

FIG. 32 illustrates a table of section types and target scenarios.

FIG. 33 illustrates one embodiment of a radio application common header. The radio application common header is operable to be used for time reference.

FIG. 34 illustrates a structure of a Section Type 0 message. The Section Type 0 message is operable to indicate idle or guard periods from the O-DU to the open radio unit (O-RU).

FIG. 35 illustrates a structure of a Section Type 1 message. The Section Type 1 message is operable to The Section Type 1 message includes a user data compression header (udCompHdr) including IQ compression information.

FIG. 36 illustrates an entire Section Type 1 message. The entire Section Type 1 message includes the radio application common header, the radio application Section 1 header, and radio application Section 1 information.

FIG. 37 illustrates a structure of a Section Type 3 message. The Section Type 3 message includes the radio application common header, a timeOffset, a frameStructure, a cpLength, and the udCompHdr.

Figure 38:
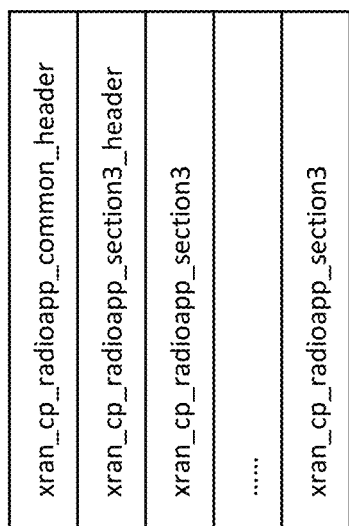
FIG. 38 illustrates an entire Section Type 3 message.

FIG. 38 illustrates an entire Section Type 3 message. The entire Section Type 3 message includes the radio application common header, the radio application Section 3 header, and radio application Section 3 information.

FIG. 39 illustrates a structure of a Section Type 5 message. The Section Type 5 message is operable to provide scheduling information for UEs.

FIG. 40 illustrates a structure of a Section Type 6 message. The Section Type 6 message is operable to provide UE channel information from the O-DU to the O-RU.

Communications between the DU and the CU are divided into control plane communications and user plane communications. The CU is the functional between control plane information and user plane information.

The F1 interface connects a gNodeB (gNB) CU to a gNB DU. The control plane of the F1 interface (F1-C) allows transfer of information between the CU and the DU, while the user plane of the F1 interface (F1-U) allows the transfer of user plane information (e.g., application data).

Figure 41:
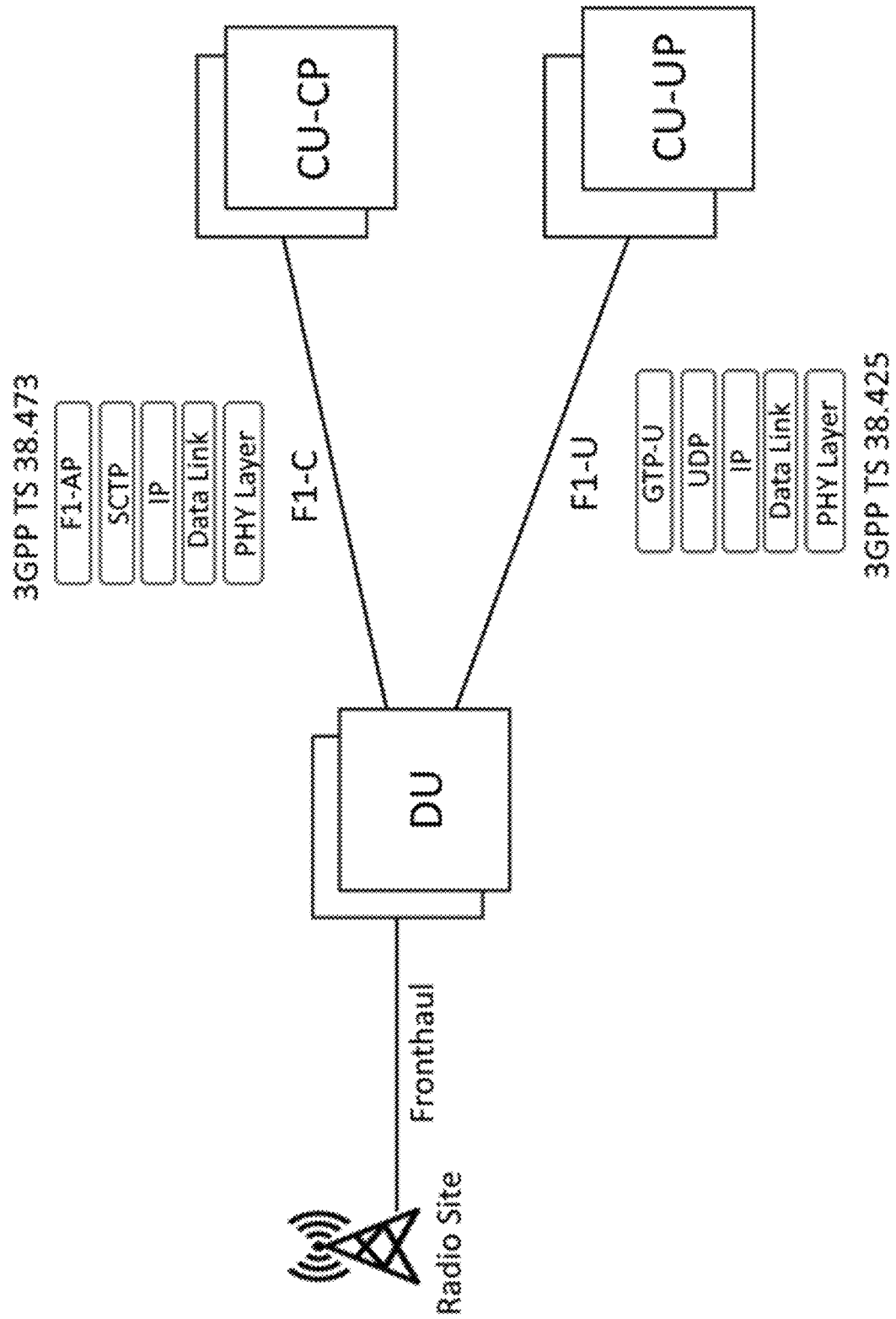
FIG. 41 illustrates the F1-C and F1-U protocol stacks.

FIG. 41 illustrates the F1-C and F1-U protocol stacks. F1-C uses stream control transmission protocol (SCTP) over internet protocol (IP) and is defined in 3GPP TS 38.473, Version 16.8.0 (Dec. 23, 2021), which is incorporated herein by reference in its entirety. In contrast, F1-U uses GPRS tunneling protocol user plane (GTP-U) over user datagram protocol (UDP) over internet protocol (IP) for transport layer and is defined in 3GPP TS 38.425, Version 16.3.0 (Apr. 9, 2021), which is incorporated herein by reference in its entirety. GPRS Tunnelling Protocol (GTP) is a protocol to carry general packet radio service (GPRS) in 5G radio network.

The F1 interface is an open interface and general information about F1 is found in 3GPP TS 38.470, Version 16.5.0 (Jul. 1, 2021), which is incorporated herein by reference in its entirety. The F1 interface supports the exchange of signaling and data information between the endpoints. The F1 interface separates the control plane and the user plane. Additionally, the F1 interface separates the Radio Network Layer from the Transport Network Layer. The F1 interface allows for connection of a gNB-CU and a gNB-DU supplied by different manufacturers. The F1 interface enables exchange of user equipment (UE)-associated information and non-UE associated information.

FIG. 42 is a table of F1 interface functionalities. The F1 interface functionalities include, but are not limited to, interface management functions, system information (SI) management functions, UE context management functions, radio resource control (RRC) message transfer functions, paging functions, warning message transfer functions, remote interface management (RIM) functions, trace functions, load management functions, self-optimization support functions, positioning functions, and/or integrated access and backhaul (IAB) support functions. The interface management functions include, but are not limited to, reset procedures, error indication, F1 setup procedures, gNB-DU configuration updates, gNB-CU configuration updates, gNB-DU resource coordination, and/or gNB-status indication.

The reset procedures are operable to initialize or re-initialize F1AP UE contexts in event of a failure of the CU or the DU. In one embodiment, the failure occurs at the CU and a reset message is transmitted to the DU. The DU then releases all assigned F1 resources and related radio resources and responds with a reset acknowledge message. In one embodiment, the failure occurs at the DU and a reset message is transmitted to the CU. The CU releases all allocated F1 resources and responds with a reset acknowledge message.

The error indication procedure is operable to be initiated by the CU or the DU. In one embodiment, the error indication procedure is initiated by an error indication message. In one embodiment, the error indication message includes cause information and/or criticality diagnostic information.

The F1 setup procedures are operable to exchange application-level data for the CU and the DU to correctly interoperate. In one embodiment, the F1 setup procedure includes the DU initiating an F1 setup request to a CU, and the CU returning an F1 setup response message. In one embodiment, an SCTP connection is established between the CU and the DU before the F1 setup procedure is operable to be initiated. In one embodiment, the F1 setup request is operable to include an identification of the DU (e.g., name) and/or a set of cells served by the DU. In one embodiment, the F1 setup response is operable to provide a list of cells to be activated.

The gNB-DU configuration update is operable to update application-level configuration data for the gNB-DU and gNB-CU to interoperate correctly on the F1 interface. In one embodiment, the gNB-DU initiates the procedure by sending a gNB-DU configuration update message including updated configuration data (e.g., served cells to add, served cells to modify, served cells to delete, cells status). The CU returns a gNB-DU configuration update acknowledge message to the DU.

The gNB-CU configuration update is also operable to update application-level configuration data for the gNB-DU and gNB-CU to interoperate correctly on the F1 interface. In one embodiment, the gNB-CU initiates the procedure by sending a gNB-CU configuration update message including updated configuration data (e.g., cells to be activated, cells to be deactivated). The DU returns a gNB-CU configuration update acknowledge message to the CU.

The gNB-DU resource coordination procedure is operable to allow coordination of resource allocation between a gNB-CU and gNB-DU for spectrum sharing. In one embodiment, the gNB-CU initiates the procedure by sending a gNB-DU resource coordination request message to a gNB-DU to the DU. The DU returns a gNB-DU resource coordination response to the CU.

The gNB-DU status indication procedure is operable to inform the CU that the DU is overloaded to allow for overload reduction actions. In one embodiment, the gNB-DU initiates the procedure by sending a gNB-DU status indication message to the CU. The overload reduction actions are applied until an updated gNB-DU status indication message indicates that the DU is no longer overloaded.

The F1 interface includes a plurality of RRC message transfer procedures including, but not limited to, initial UL RRC message transfer, DL RRC message transfer, UL RRC message transfer, and/or RRC delivery report.

The initial UL RRC message transfer procedure is operable to send an initial RRC message from the gNB-DU to the gNB-CU. The DL RRC message transfer procedure is operable to send an RRC message from the gNB-CU to the gNB-DU. The UL RRC message transfer procedure is operable to send a UL RRC message transfer response from the gNB-DU to the gNB-CU. The RRC delivery report procedure is operable to send an RRC delivery report regarding successful delivery of messages from the gNB-CU to the gNB-DU.

The F1 interface includes a plurality of UE context management procedures including, but not limited to, UE context setup, UE context release request, UE context modification, UE inactivity notification, and/or notify.

The UE context setup procedure is operable to establish UE context. In one embodiment, the UE context is related to information including, but not limited to, SRB, DRB, BH RLC channel, and/or SL DRB configuration. The UE context setup procedure is operable to send a UE context setup request from the gNB-CU to the gNB-DU. The UE context setup procedure is operable to send a UE context setup response message from the gNB-DU to the gNB-CU.

The UE context modification procedure is operable to modify an established UE context (e.g., establish, modify, and/or release radio resources or sidelink resources). The UE context modification procedure includes a UE context modification request from the gNB-CU to the gNB-DU. The UE context modification procedure includes a UE context modification response.

The UE context modification required procedure is operable to modify the established UE context (e.g., modify and/or release radio bearer resources, sidelink radio bearer resources, and/or candidate cells). The UE context modification required procedure includes a UE context modification required message sent from the gNB-DU to the gNB-CU. The UE context modification required procedure includes a UE context modification confirm message sent from the gNB-CU to the gNB-DU.

The UE context release procedure is operable to enable the gNB-CU to order the release of an existing UE context. The UE context release procedure includes the gNB-CU sending a UE context release command to the gNB-DU. The UE context release procedure includes the gNB-DU sending a UE context release complete message to the gNB-CU.

The UE inactivity notification procedure is operable to indicate an inactivity status of a UE. In one embodiment, the gNB-DU sends a UE inactivity notification message to the gNB-CU.

The notify procedure is operable to allow the gNB-DU to inform the gNB-CU that a quality of service (QoS) is not operable to fulfilled or is operable to be fulfilled again. In one embodiment, the gNB-DU initiates the notify procedure by sending a notify message to the gNB-CU. In one embodiment, the notify message is operable to indicate alternative QoS parameters the gNB-DU is operable to fulfil.

In one embodiment, the F1 interface further includes a plurality of warning message transmission procedures including, but not limited to, a write-replace warning, a public warning system (PWS) cancel, a PWS restart indication, and/or a PWS failure indication.

The write-replace warning procedure is operable to start or overwrite the broadcasting of warning messages. In one embodiment, the gNB-CU initiates the write-replace warning procedure by sending a write-replace warning request message to the gNB-DU and the gNB-DU returns a write-replace warning response.

The PWS cancel procedure is operable to cancel broadcast of a warning message. In one embodiment, the gNB-CU initiates the PWS cancel procedure by sending a PWS cancel request to the gNB-DU and the gNB-DU returns a PWS cancel response.

The PWS restart indication procedure is operable to inform the gNB-CU that PWS information for at least one cell of the gNB-DU is available for reloading. In one embodiment, the gNB-DU initiates the PWS restart indication procedure by sending a PWS restart indication to the gNB-CU.

The PWS failure indication procedure is operable to inform the gNB-CU that ongoing PWS transmission of the gNB-DU has failed for at least one cell. In one embodiment, the gNB-DU sends a PWS failure indication message to the gNB-CU. The PWS failure indication message preferably includes identification of the at least one cell.

In one embodiment, the F1 interface includes a system information delivery procedure operable to command the gNB-DU to broadcast Other System Information (OSI). In one embodiment, the gNB-CU initiates the procedure by sending a system information delivery command to the DU.

In one embodiment, the F1 interface includes a paging procedure operable to providing paging information to allow a gNB-DU to page a UE. In one embodiment, the gNB-CU initiates the procedure by sending a paging message to the DU. The paging message includes an identity of the UE (e.g., RAN UE Paging Identity (I-RNTI), Core Network UE Paging Identity (S-TMSI)). In one embodiment, the paging message further includes a paging DRX to determine a final paging cycle for the UE, a paging priority, and/or a paging cell list.

Figure 43:
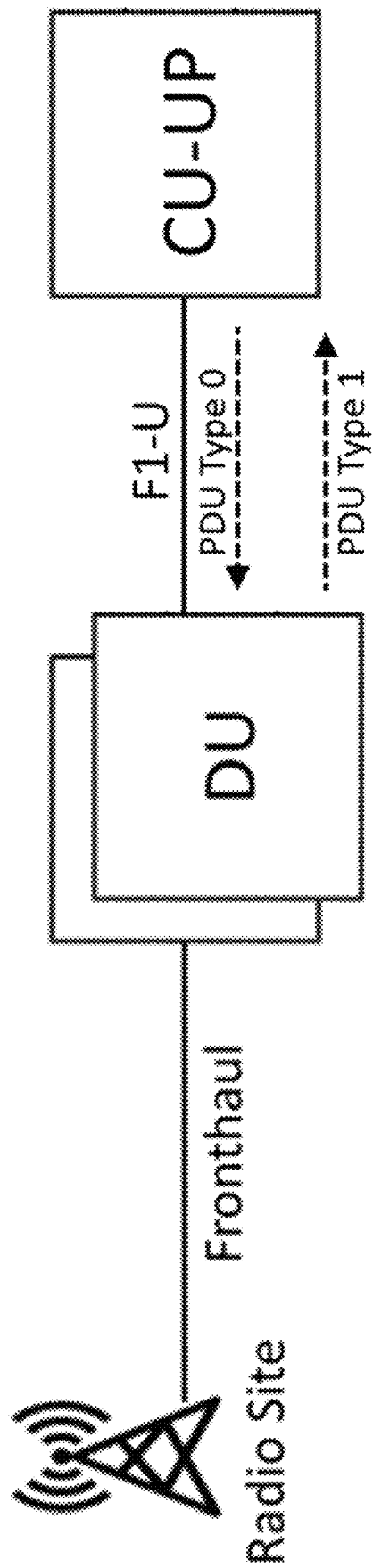
FIG. 43 illustrates transfer of application data between the DU and CU-UP using the user plane of the F1-U.

FIG. 43 illustrates transfer of application data between the DU and CU-UP using the user plane of the F1-U. A Protocol Data Unit (PDU) Type 0 is transmitted from the CU to the DU, while a PDU Type 1 is transmitted from the DU to the CU. Application data is transferred via GTP-U tunnels, which are identified using a tunnel endpoint identifier (TED). Each data radio bearer (DRB) has a tunnel.

The user plane protocol uses services of the transport network layer to provide control mechanisms for transfer of downlink data. The control mechanisms include, but are not limited to, flow control, detection of lost data packets, and/or delivery status updates (e.g., reporting successful delivery).

The CU-UP uses a PDU Type 0 frame format to track sequence numbers for each downlink data packet. In one embodiment, the sequence numbers are used by the DU to detect lost data packets. In one embodiment, the PDU Type 0 frame format is used to indicate discard instructions. FIG. 44 is a table of PDU Type 0 downlink user data.

The DU uses a PDU Type 1 frame format to report lost data packets and provide flow control. The PDU Type 1 frame format is preferably operable to indicate a sequence number of the highest successfully delivered PDCP sequence number, the desired buffer size for the data radio bearer, and/or the desired data rate. In one embodiment, the desired data rate indicates an amount of data in bytes for the DU to receive within a specified time interval (e.g., 1 second). In one embodiment, the cause value is operable to indicate a radio link outage and/or a radio link resume. FIG. 45 is a table of PDU Type 1 downlink delivery status.

See, e.g., (1) 3GPP TS 38.470 5G NG-RAN: F1 general aspects and principles, Version 16.5.0 (dated Jul. 1, 2021); (2) 3GPP TS 38.473 5G NG-RAN: F1 Application Protocol (FLAP), Version 16.8.0 (dated Dec. 23, 2021); and 3GPP TS 38.425 5G NG-RAN: NR user plane protocol, Version 16.3.0 (dated Apr. 9, 2021), each of which is incorporated herein by reference in its entirety.

Figure 46:
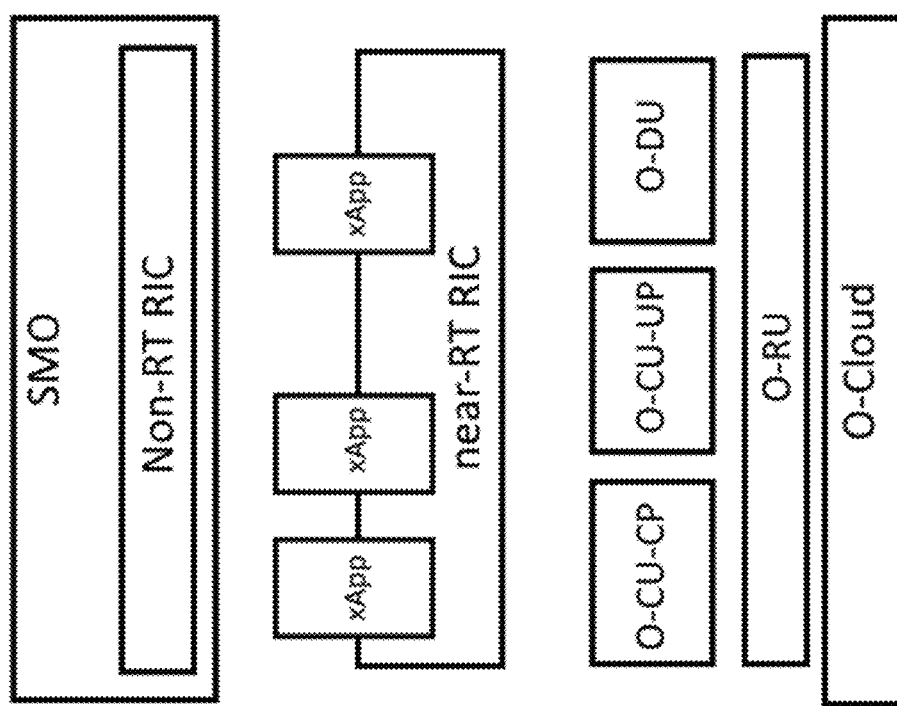
FIG. 46 illustrates one embodiment of O-RAN defined nodes.

FIG. 46 illustrates one embodiment of O-RAN defined nodes. The O-CU-CP, O-CU-UP, O-DU, and O-RU are defined by 3GPP and adapted by O-RAN specifications. The O-Cloud is a cloud computing platform formed of physical infrastructure elements operable to host O-RAN nodes (e.g., near RT-RIC, O-DU) and operable to host virtual network functions used by components (e.g., RICs). The O-RAN radio unit (O-RU) is operable to process radio frequencies received by the PHY layer. The O-DU is a logical node hosting protocols including, but not limited to, radio resource control (RLC), medium access control (MAC), and/or the physical interface (PHY). The O-CU includes the O-CU-CP and the O-CU-UP. The O-CU-CP includes radio resource control (RRC) and control plane components of Packet Data Convergence Protocol (PDCP). The O-CU-UP includes Service Data Adaptation Protocol (SDAP) and user plane components of PDCP. The near-RT RIC is operable to enable near-RT control and/or optimization of O-RAN components and resources. In one embodiment, the near-RT MC includes artificial intelligence and/or machine learning. The non-RT MC is operable to enable non-RT control and/or optimization of O-RAN components and resources. In one embodiment, the non-RT MC is operable to provide policy-based management of the near-RT MC. An xApp is an application operable to run on the near-RT RIC. In one embodiment, the xApp is independent of the near-RT RIC. The Service Management and Orchestration framework (SMO) is operable to manage the near-RT RIC, non-RT MC, the O-Cloud, the O-CU, and/or the O-DU. Advantageously, different components are operable to be provided by different manufacturers.

Figure 47:
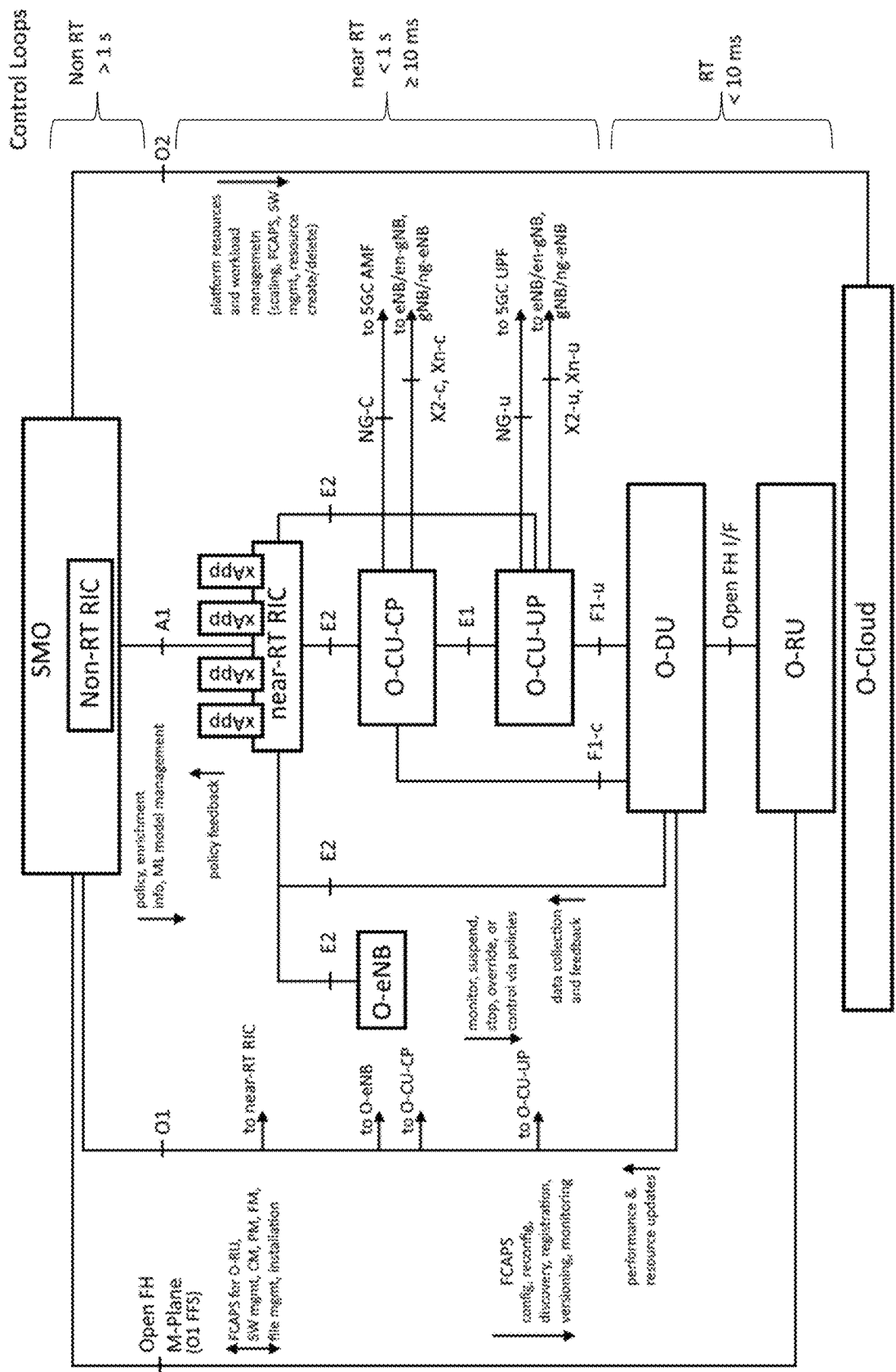
FIG. 47 illustrates one embodiment of an overall O-RAN architecture.

FIG. 47 illustrates one embodiment of an overall O-RAN architecture. The A1 interface is defined between the non-RT MC in the SMO and the near-RT RIC. The A1 interface provides at least three types of services including, but not limited to, policy management services, enrichment information services, and machine learning (ML) model management services. The E2 interface is operable to communicate with the base station (e.g., O-RU, O-DU, O-CU). At least one message (e.g., monitor, suspend, override, control) is operable to control the base station and actions are operable to executed (e.g., from xApps, from near-RT RIC). The E2 interface is operable to collect data and receive feedback from the base station (e.g., O-RU, O-DU, O-CU). The O1 and Open-Fronthaul M-plane interfaces are a Fault, Configuration, Accounting, Performance, Security (FCAPS) interface. The O1 and Open-Fronthaul M-plane interfaces are operable to exchange information (e.g., configuration, registration, security, performance, monitoring) with components including, but not limited to, the O-CU-CP, O-CU-UP, the O-DU, the O-RU, and/or the near-RT RIC. The O2 interface is operable to manage communications between the SMO and the O-Cloud (e.g., management of platform resources and workload).

FIG. 47 also illustrates three control loops. The first control loop is a real-time control loop. In one embodiment, actions in the real-time control loop occur in less than 10 ms. The second control loop is a near-real-time control loop. In one embodiment, actions in the near-real-time control loop occur between 10 ms and 1 s (e.g., functions such as Traffic Steering, Mobility Management, Interface Management). The third control loop is a non-real-time control loop. In one embodiment, actions in the non-real-time control loop occur in greater than 1 s (e.g., orchestration and optimization functions, incorporation of ML models).

FIGS. 48-51 illustrate example embodiments for the implementation of O-RAN architecture. Descriptions of O-RAN architecture are included in "O-RAN Architecture-Description 6.0", O-RAN.WG1.O-RAN-Architecture-Description-v06.00, O-RAN Alliance (March 2022), which is incorporated herein by reference in its entirety. In one embodiment, the E2 is a logical node terminating E2 interface. In one embodiment, the E2 node includes 0-CU-CP, O-CU-UP, O-DU, or any combination specified by the O-RAN Alliance. The nodes are operable to be aggregated in a plurality of different ways including, but not limited to, (1) disaggregated network functions in the O-RAN, (2) aggregated O-CU-CP and O-CU-UP, (3) aggregated O-CU-CP, O-CU-UP, (4) aggregated near-RT RIC, O-CU-CP, and O-CU-UP, (5) aggregated O-CU-CP, O-CU-UP, O-DU, and O-RU, (6) aggregated O-DU and O-RU, or (7) aggregated near-RT RIC, O-CU-CP, O-CU-UP, O-DU, and O-RU.

Figure 48:
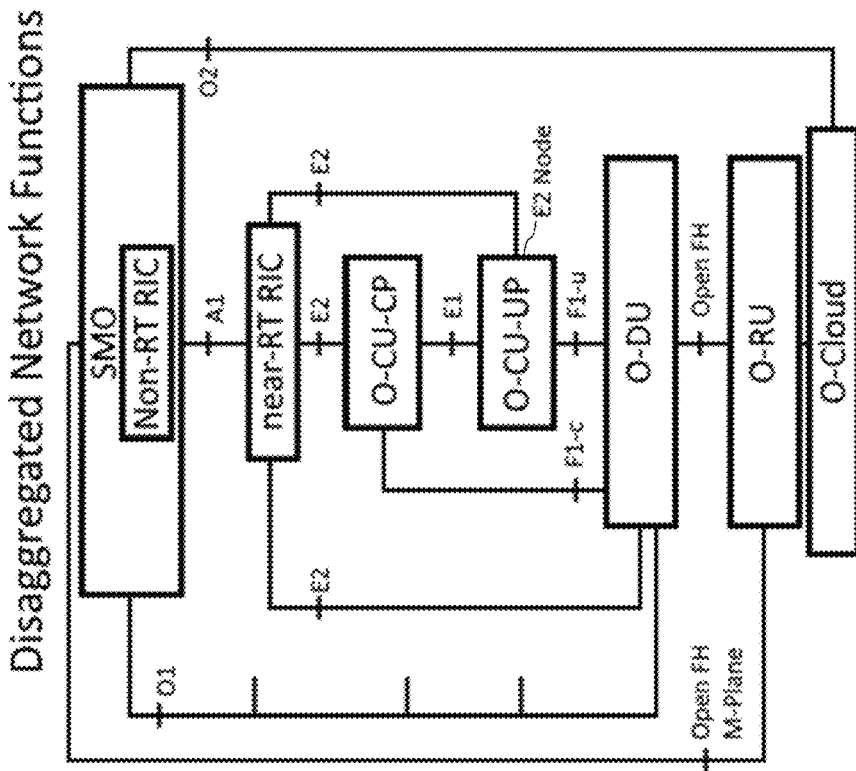
FIG. 48 illustrates disaggregated network functions in the O-RAN.

FIG. 48 illustrates disaggregated network functions in the O-RAN. In the embodiment shown in FIG. 48, the near-RT RIC has E2 connections to the O-CU-CP, the O-CU-UP, and the O-DU.

Figure 49:
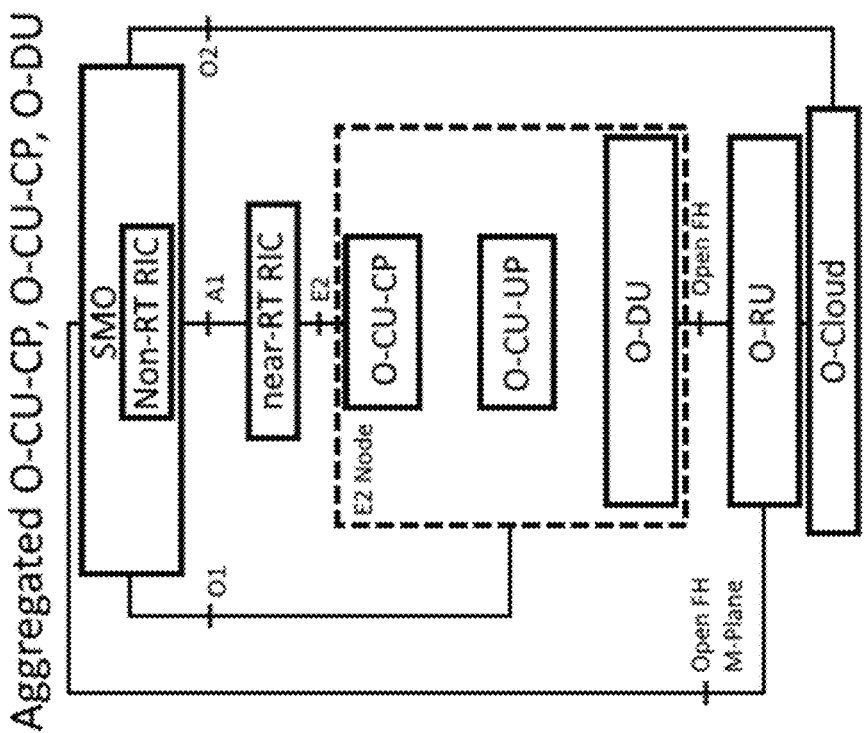
FIG. 49 illustrates an aggregated O-CU and O-DU, which form an E2 node.

FIG. 49 illustrates an aggregated O-CU and O-DU, which form an E2 node. There is only one E2 connection from the near-RT RIC to the E2 node, and only one O1 connection from the SMO to the E2 node.

Figure 50:
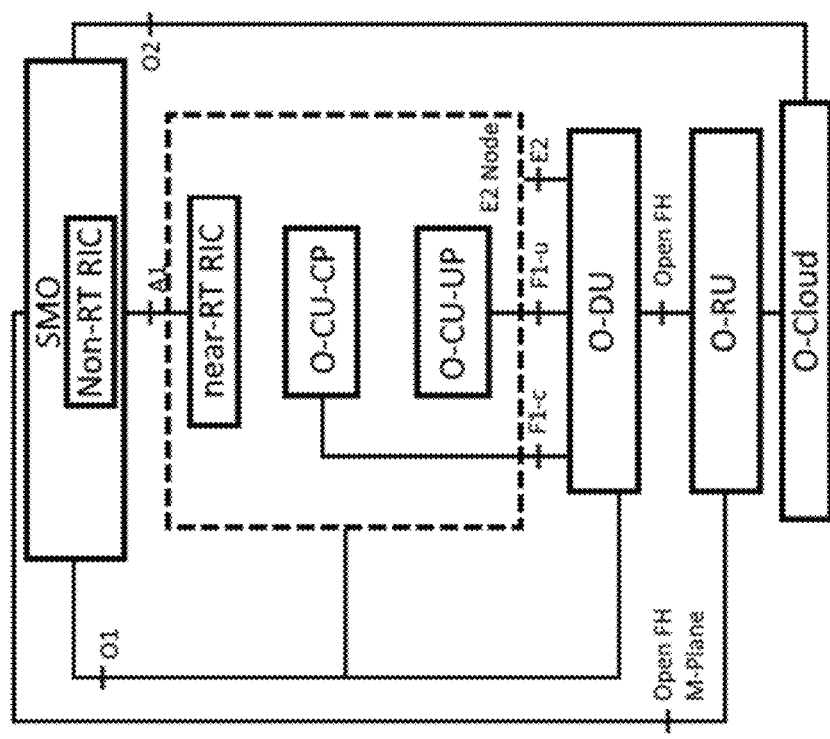
FIG. 50 illustrates an aggregated near-RT MC, O-CU-CP, and O-CU-UP.

FIG. 50 illustrates an aggregated near-RT RIC, O-CU-CP, and O-CU-UP. The E2 interfaces to control the O-CU-CP and the O-CU-UP are contained within the E2 node. The E2 node has an E2 interface with the O-DU.

Figure 51:
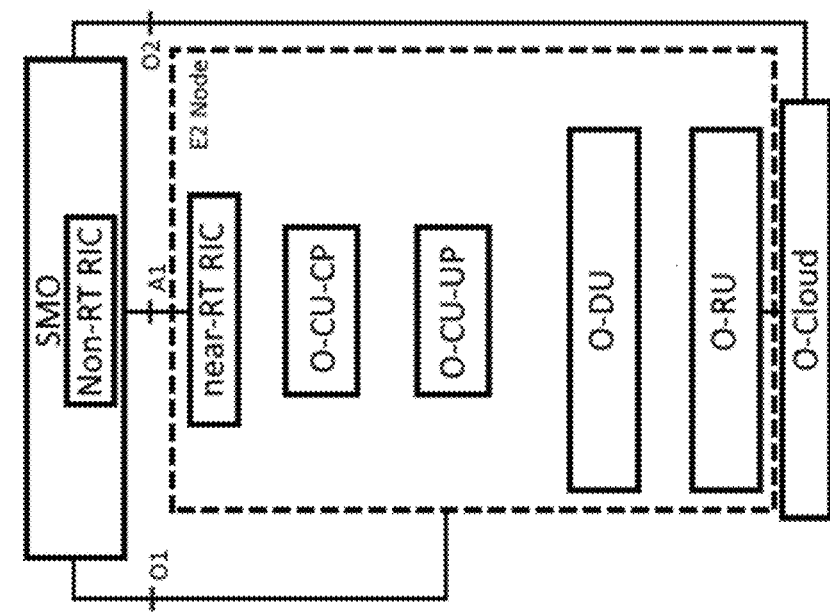
FIG. 51 illustrates an aggregated near-RT RIC, O-CU-CP, O-CU-UP, O-DU, and O-RU.

FIG. 51 illustrates an aggregated near-RT RIC, O-CU-CP, O-CU-UP, O-DU, and O-RU. The E2 interface is fully internal. A single O1 connection is present between the SMO and the E2 node, as well as an A1 connection between the non-RT MC and the near-RT MC.

The near-RT RIC hosts microservice-based applications known as xApps. xApps are operable to control a distributed collection of RAN components (e.g., eNB, gNB, CU, DU) via the E2 interface. The near-RT RIC also includes the A1 interface and the O1 interface to the non-RT MC for the management and optimization of the RAN. Advantageously, this allows the near-RT MC to utilize a plurality of RAN types (e.g., macro cells, small cells, massive MIMO) and/or a plurality of RAN data to manage and optimize the RAN. xApps are operable to utilize the E2 interface collect near-RT information. The near-RT RIC is operable to control E2 nodes via policies and data provided from the non-RT RIC via the A1 interface. The near-RT RIC includes machine learning (ML) models and is operable to provide loading balancing, handover control, interference management, and/or resource block management. The radio-network information base (R-NIB) is operable to determine a state of the network (e.g., in near RT) and transmit network state data to the RAN. In one embodiment, the network state data is used to train AI/ML models. In one embodiment, the AI/ML models are operable to facilitate radio resource management (RRM). In one embodiment, the non-RT RIC is operable to transmit trained models to the near-RT RIC via the A1 interface. The near-RT RIC is operable to execute the trained models to improve network conditions.

In one embodiment, the near-RT RIC operates in near-real time. In one embodiment, near-real time is greater than 10 ms and less than 1 s. In one embodiment, the near-RT RIC is operable to control and optimize RAN. In one embodiment, the near-RT RIC includes xApps. In one embodiment, the near-RT MC is operable to perform radio resource management (e.g., via xApps).

The near-RT RIC is described in "O-RAN Near-Real-time RAN Intelligent Controller Architecture & E2 General Aspects and Principles 2.01", O-RAN.WG3.E2GAP-v02.01, O-RAN Alliance (March 2022), which is incorporated herein by reference in its entirety.

Figure 52:
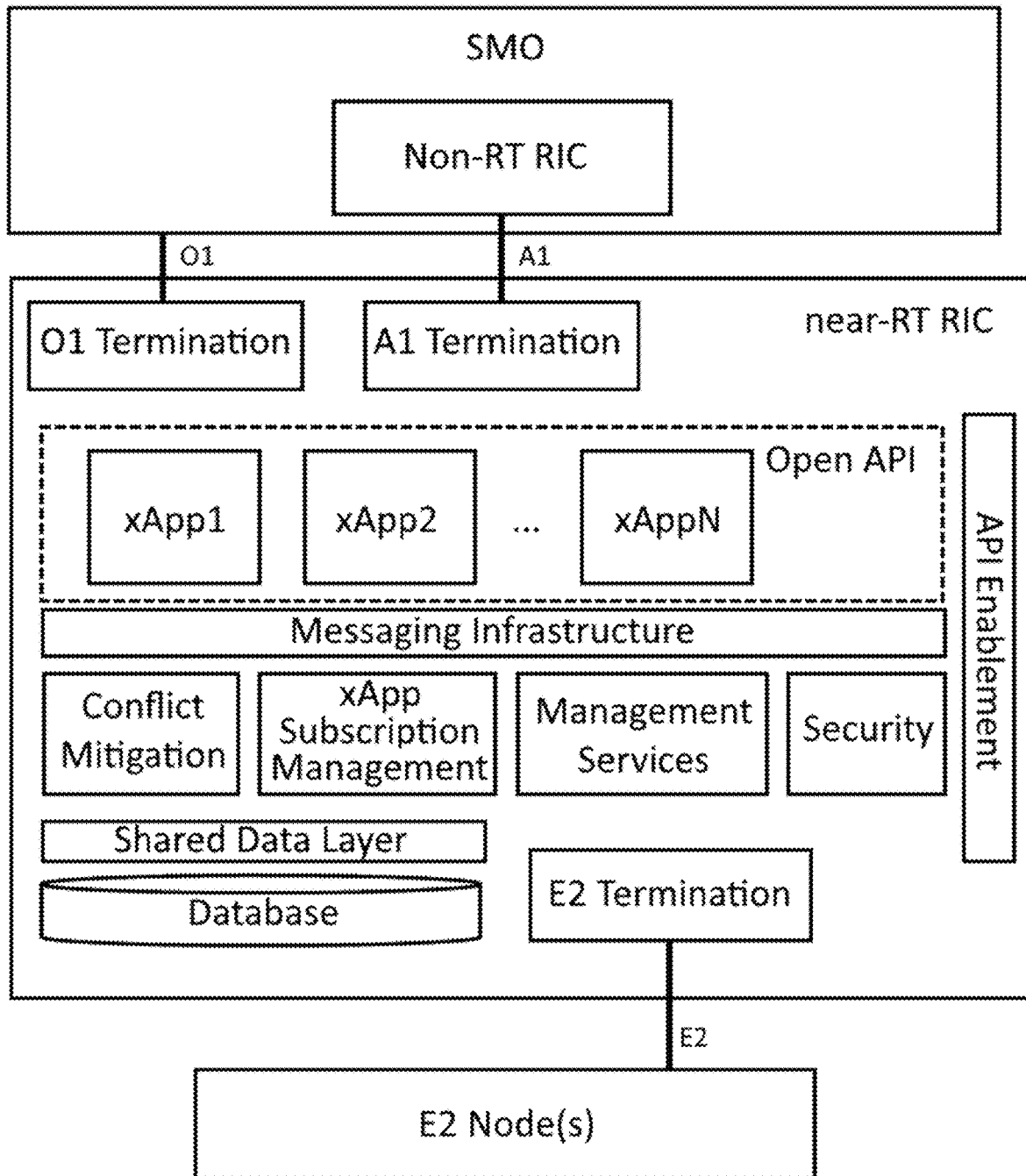
FIG. 52 illustrates one embodiment of near-RT RIC internal architecture.

FIG. 52 illustrates one embodiment of near-RT RIC internal architecture. The near-RT RIC includes a plurality of functions hosted by xApps. The plurality of functions hosted by the xApps is operable to be executed at the near-RT RIC to provide services. Outcomes of the services are operable to be sent to the E2 nodes via the E2 interface. The database and the shared data layer are operable to allow reading and/or writing of information related to the RAN and/or UE. A conflict mitigation function is operable to resolve conflicts between at least two xApps. The xApp subscription management function is operable to merge subscriptions from a plurality of xApps. The security function is operable to provide security for the xApps. The management services function is operable to provide management (e.g., configuration, performance, lifecycle, fault) of xApps. The messaging infrastructure function is operable to provide messaging between internal functions of the near-RT RIC.

Figure 53:
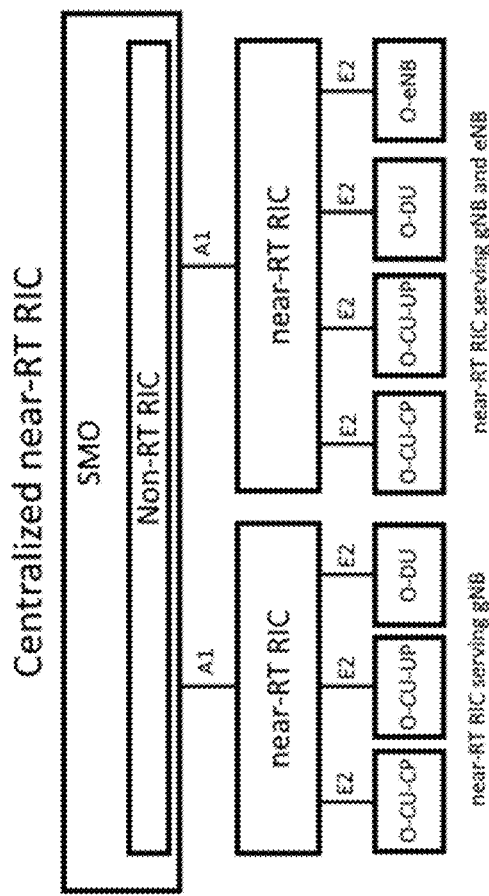
FIG. 53 illustrates a centralized near-RT RIC.

FIG. 53 illustrates a centralized near-RT RIC. In the centralized near-RT RIC, the entire gNB (e.g., via O-DU, O-CUs) and/or eNB are handled by the same near-RT RIC. Advantageously, this allows for the near-RT RIC to optimize operations and make overall decisions for an individual base station.

Figure 54:
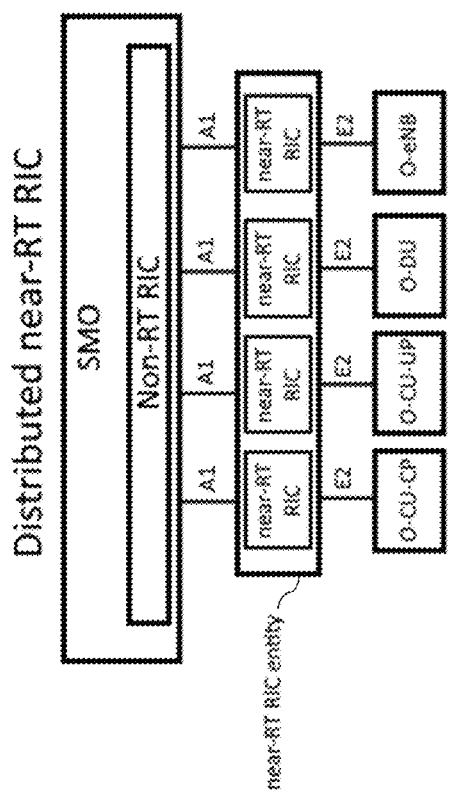
FIG. 54 illustrates a fully distributed near-RT RIC

FIG. 54 illustrates a fully distributed near-RT RIC. In the fully distributed near-RT RIC, each E2 node is handled by a near-RT RIC entity including a plurality of near-RT RICs. Individual components of the E2 node (e.g., O-CU-CP, O-CU-UP, C-DU, and/or O-eNB) are optimized by one of the plurality of near-RT RICs.

Advantageously, the flexibility of implementation options allows for different components to be supplied and deployed by different companies. However, this requires more complexity in design of the E2 interface.

The E2 interface provides communication between the near-RT RIC and E2 nodes. The near-RT RIC (e.g., via the xApps) are operable to control functions inside the E2 nodes. E2 interface architecture is described in "O-RAN Near-Real-time RAN Intelligent Controller Architecture & E2 General Aspects and Principles 2.01", O-RAN.WG3.E2GAP-v02.01, O-RAN Alliance (March 2022), which is incorporated herein by reference in its entirety. The E2 interface is open and facilitates connectivity between the near-RT RIC and the E2 node supplied by different manufacturers. Further, the E2 interface facilitates exposure of selected E2 node data towards the near-RT RIC. The selected E2 node data includes, but is not limited to, configuration information (e.g., cell configuration, supported slices, public land mobile networks (PLMNs)), network measurements, and/or context information. The E2 interface further enables the near-RT RIC to control selected functions on the E2 node.

The E2 functions include, but are not limited to, near-RT RIC services and/or near-RT RIC support functions. The near-RT RIC services include, but are not limited to, REPORT, INSERT, CONTROL, and/or POLICY. The near-RT RIC support functions include, but are not limited to, interface management (e.g., E2 setup, E2 reset, E2 node configuration update, reporting of general error situations) and/or a near-RT RIC service update.

Figure 55:
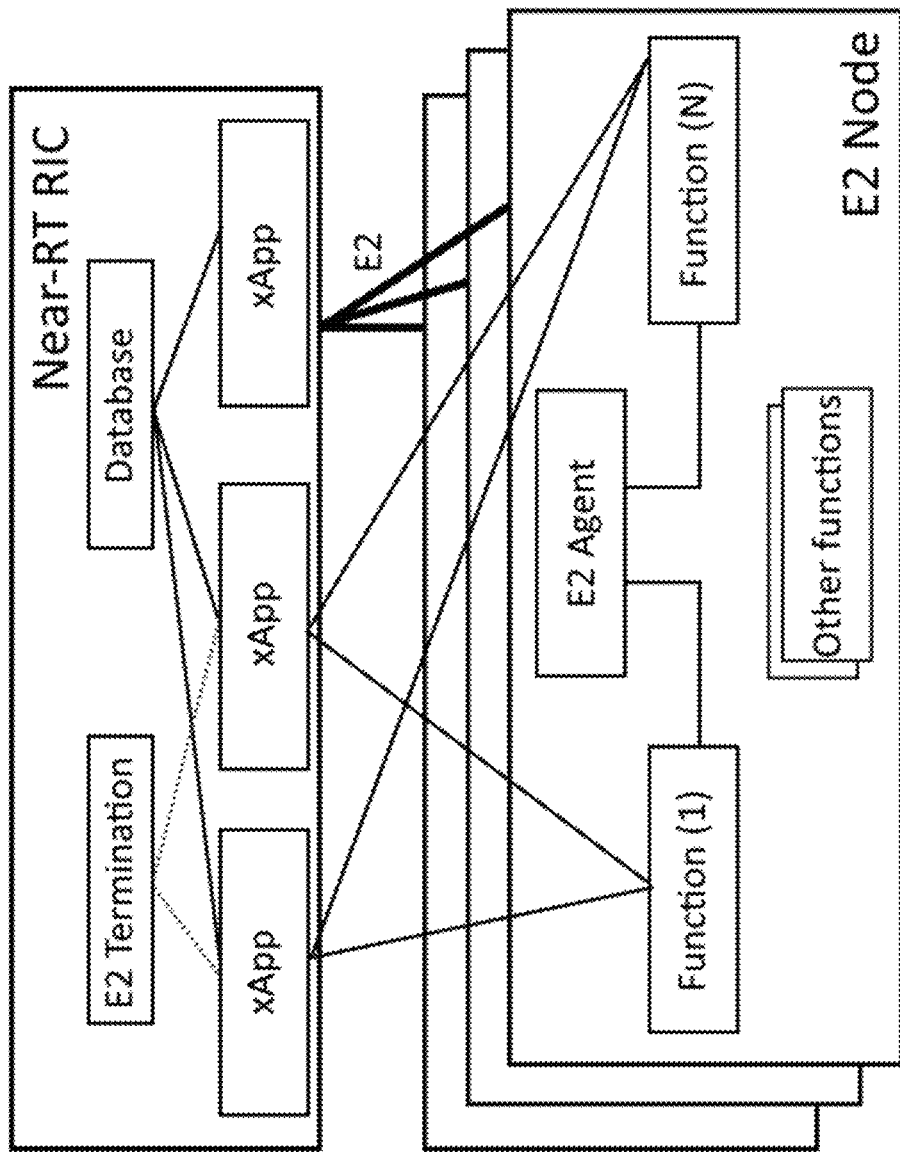
FIG. 55 illustrates one embodiment of E2 interface architecture.

FIG. 55 illustrates one embodiment of E2 interface architecture. The near-RT RIC includes a database and at least one xApp. The database is operable to store data from the at least one xApp and the E2 node. The database is also operable to provide data to the at least one xApp. The near-RT RIC further includes an E2 termination function that is operable to terminate the E2 interface. The E2 includes at least one RAN function controlled by the near-RT MC, an E2 agent, and other functions. In one embodiment, the E2 agent is operable to terminate the E2 interface. In one embodiment, the E2 agent is operable to forward and/or receive E2 messages. The at least one RAN function (e.g., Function (1), Function (N)) is controlled by the near-RT RIC and supports near-RT MC services. In one embodiment, the other functions are RAN functions that do not support near-RT RIC services.

One of the major challenges with implementing 5G networks is reducing latency. Although networking slicing and RAN modifications reduce delays relative to 3G and 4G networks, it is not enough to meet the requirements with 5G. As a result, services need to move to the edge of the network. Advantageously, this moves application services and content closer to users, providing low latency, optimized content distribution, localized data caching, and/or integration with internet of things (IoT) devices.

The integration of ETSI Multi-access Edge Computing (MEC) and 5G is viewed as a solution to the difficulty of meeting the latency requirements. One critical issue for the MEC is the management of physical resources (e.g., via at least one application). The MEC is operable to assist in traffic routing and policy control.

ETSI ISG MEC (Industry Specification Group for Multi-access Edge Computing) is responsible for developing the technical standards for edge computing. The ETSI ISG MEC has published a set of specifications for the MEC including, but limited to, the following: (1) ETSI GS MEC 003 V1.1.1, "Mobile Edge Computing (MEC); Framework and Reference Architecture" (2016-03); (2) ETSI GS MEC 010-1 V1.1.1, "Mobile Edge Computing (MEC); Mobile Edge Management; Part 1: System host and platform management" (2017-10); (3) ETSI GS MEC 010-2 V1.1.1, "Mobile Edge Computing (MEC); Mobile Edge Management; Part 2: Application lifecycle, rules and requirements management" (2017-07); (4) ETSI GS MEC 011 V1.1.1, "Mobile Edge Computing (MEC); Mobile Edge Platform Application Enablement" (2017-07); (5) ETSI GS MEC 012 V1.1.1, "Mobile Edge Computing (MEC); Radio Network Information" (2017-07); (6) ETSI GS MEC 013 V1.1.1, "Mobile Edge Computing (MEC); Location API" (2017-07); (7) ETSI GS MEC 014 V1.1.1, "Mobile Edge Computing (MEC); UE Identity API" (2018-02); (8) ETSI GS MEC 015 V1.1.1, "Mobile Edge Computing (MEC); Bandwidth Management API" (2017-10); and (9) ETSI GS MEC 016 V1.1.1, "Mobile Edge Computing (MEC); UE Application Interface" (2017-09), each of which is incorporated herein by reference in its entirety. The set of specifications include management and orchestration (MANO) of MEC applications, application enablement application programming interfaces (API), service APIs, and the user equipment (UE) API. The MANO and application enablement functions are operable to provide service environments in edge data center. The service APIs are operable to provide network information to application. Advantageously, the MEC provides contextual information and real-time status of the environment through the APIs. The UE API is operable to facilitation UE interaction with the MEC system.

Edge computing is one of the key technologies involved in 5G to support low latency, mission critical services, and/or IoT devices. The MEC is operable to be mapped onto application functions (AFs) that are operable to use services and/or information provided by network functions based on configuration policies. Further, the MEC is operable to be deployed in a plurality of configurations, which provides flexibility to the system. The MEC is operable to include a plurality of applications. The plurality of applications is operable to provide a plurality of services including, but not limited to, streaming (e.g., movies, television), gaming, IoT, and/or V2X communication.

The system architecture for 5G is specified by 3GPP in 3rd Generation Partnership Project; Technical Specification Group Services and System Aspects; System architecture for the 5G System (5GS); Stage 2 (Release 17) v17.4.0 (dated March 2022), which is incorporated herein by reference in its entirety. One of the significant changes to the 5G system is the ability to use either a point-to-point paradigm or a service based architecture (SBA) between core network functions.

Figure 56:
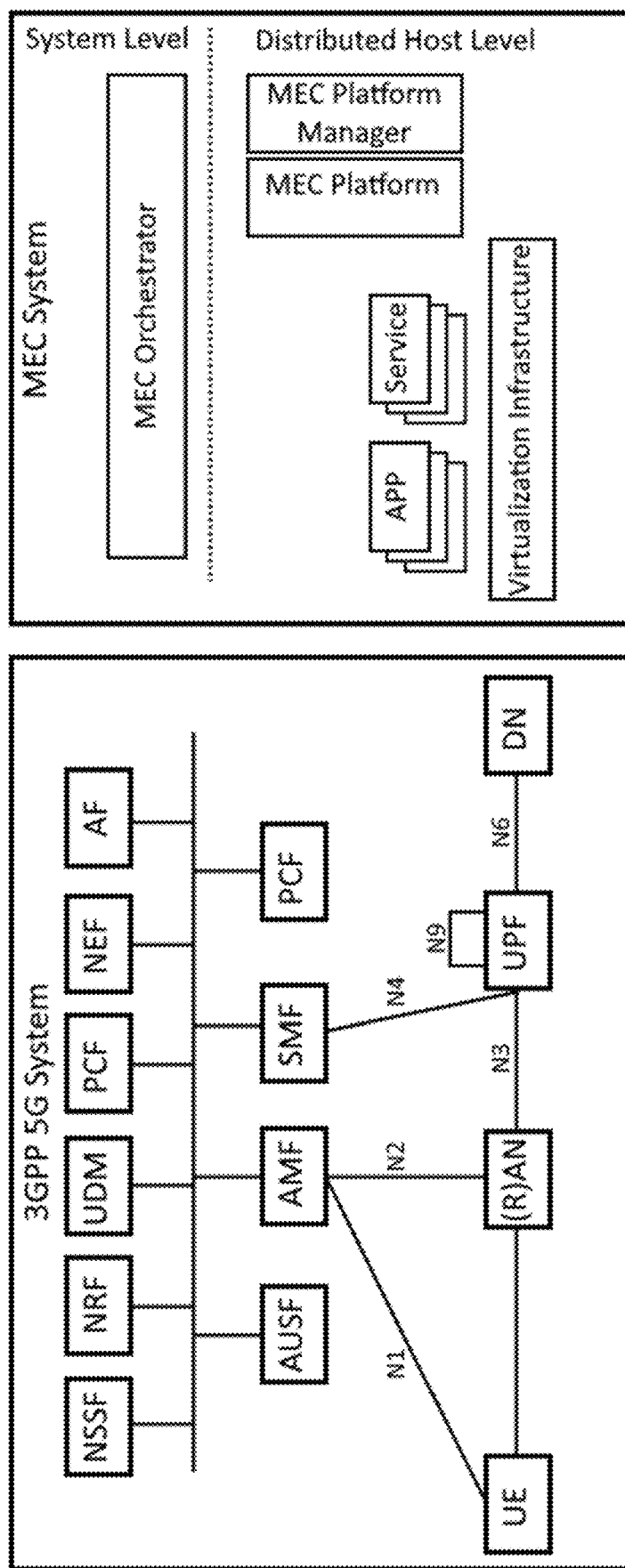
FIG. 56 illustrates a 3GPP 5G with the SBA on the left and the MEC system on the right.

The SBA includes a plurality of network functions that are operable to consume and/or produce at least one service. In one embodiment, the SBA includes a request-response model and/or a subscribe-notify model. ETSI ISG MEC defined an API framework operable to be used MEC applications. Both the API framework and the SBA are operable to provide efficient use of services using functions including, but not limited to, registration, service discovery, availability notifications, de-registration, authentication, and/or authorization. FIG. 56 illustrates a 3GPP 5G with the SBA on the left and the MEC system on the right.

The network functions and corresponding services produced by the network functions are operable to be registered in a network resource function (NRF). Services produced by MEC applications are operable to registered in a service registry of the MEC platform. A list of available services is operable to be discovered from the NRF. In one embodiment, a service is accessible only via the NEF. In one embodiment, the NEF is operable to authorize access requests external to the domain. An Authentication Server Function (AUSF) is operable to perform procedures related to authentication. A Network Slice Selection Function (NSSF) is operable to assist in selecting suitable network slice instances for user and allocating Access Management Functions. A MEC application is operable to belong to at least one network slice configured in the core network.

The Policy Control Function (PCF) is operable to handle policies and rules. An AF (e.g., a MEC platform) is operable to request services from the PCF to impact traffic steering rules. The PCF is operable to be accessed directly or via the NEF.

The unified data management (UDM) is operable to provide services related to users and subscriptions. The UDM is operable to manage data for authentication, user registration, and data network profiles.

The user plane function (UPF) is operable to connect data from the RAN to the Internet and/or route traffic for user devices to a base station. In one embodiment, UPFs are controlled via a network exposure function (NEF) to policy control function (PCF) to session management function (SMF) route. In one embodiment, the UPF is included in the MEC.

Figure 57:
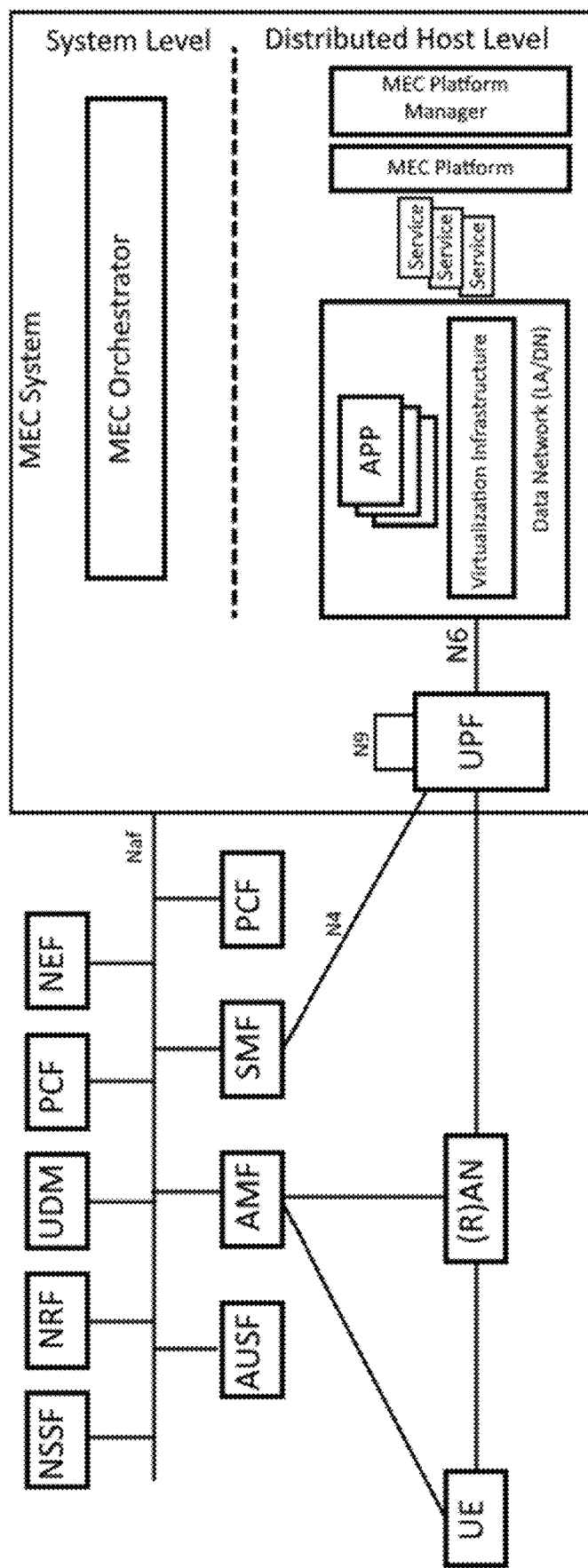
FIG. 57 illustrates one embodiment of an integrated MEC deployment.

FIG. 57 illustrates one embodiment of an integrated MEC deployment. In the embodiment shown in FIG. 57, the MEC orchestrator is included in the MEC system as a system level entity that is operable to interact as an application function with the network exposure function (NEF). In one embodiment, the MEC orchestrator is operable to interact as an application function directly with network functions. The MEC includes a host level with a MEC platform operable to interact as an application function with the network functions.

The NEF is located between the core network and external third-party applications. The NEF is operable to manage external network data and external applications. The N6 reference point is located between the UPF and a data network. In one embodiment, the MEC is deployed at the N6 reference point. In one embodiment, the MEC host includes a plurality of MEC applications, a message broker as a MEC platform service, and/or a MEC platform service operable to steer traffic. In one embodiment, an Access and Mobility Management Function (AMF) is operable to provide mobility related procedures. In one embodiment, the AMF is operable to terminate RAN control plane and/or Non-Access Stratum (NAS) procedures, protect the integrity of signaling, manage registrations, manage connections, manage reachability, interface with the lawful interception function (e.g., for access and mobility events), provide authentication and/or authorization for the access layer, and/or host Security Anchor Functionality (SEAF). The SEAF is operable to act as a "middleman" during authentication between a UE and a network. In one embodiment, the AMF is operable to provide communication and/or reachability services for at least one network function. In one embodiment, the AMF is operable to allow subscriptions to receive notifications regarding mobility events.

A Session Management Function (SMF) is operable to provide a plurality of functions including, but not limited to, session management internet protocol (IP) address allocation and management; Dynamic Host Configuration Protocol (DHCP) services; selection, reselection, and/or control of the UPF; configuring traffic rules for the UPF; interception for session management events; charging; and/or support for roaming. The SMF is operable to provide service operations to allow MEC to manage Protocol Data Unit (PDU) session, control policy sessions and traffic rules, and/or subscribe to notification on session management events.

MEC hosts are deployed in the edge or central data network. The UPF is operable to steer user plane traffic towards MEC applications in the data network. The MEC management system is operable to orchestrate operation of MEC hosts and applications. The MEC management system is further operable to dynamically deploy MEC applications.

Figure 58B:
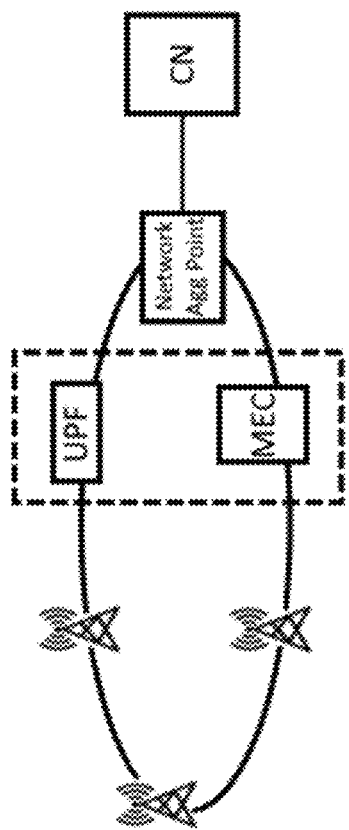
FIG. 58B illustrates a MEC co-located with a transmission node and optionally with a local UPF.
Figure 58D:
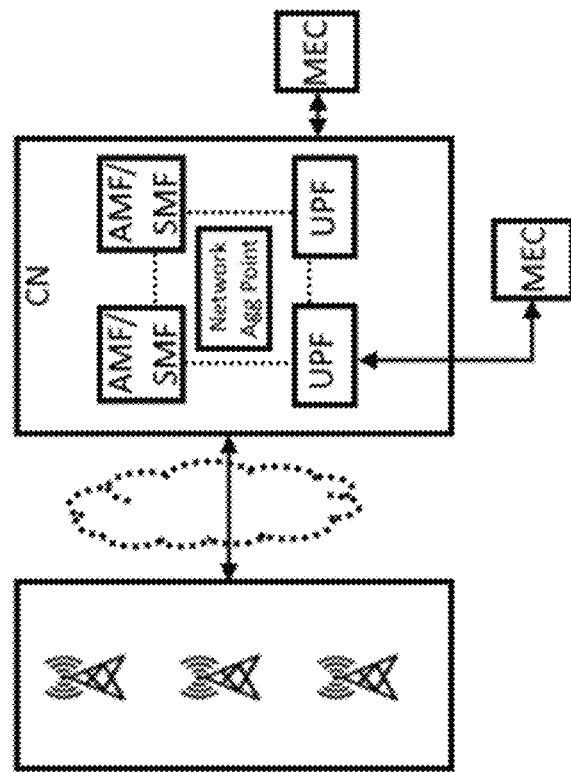
FIG. 58D illustrates a MEC co-located with the core network function (e.g., in the same data center).
Figure 58A:
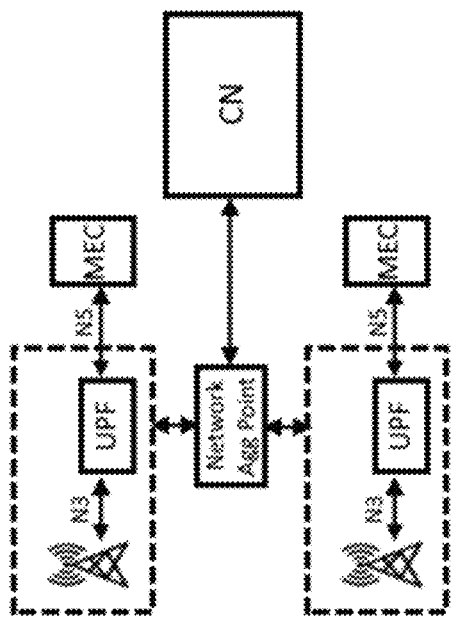
FIG. 58A illustrates a MEC and the local UPF co-located with the base station.
Figure 58C:
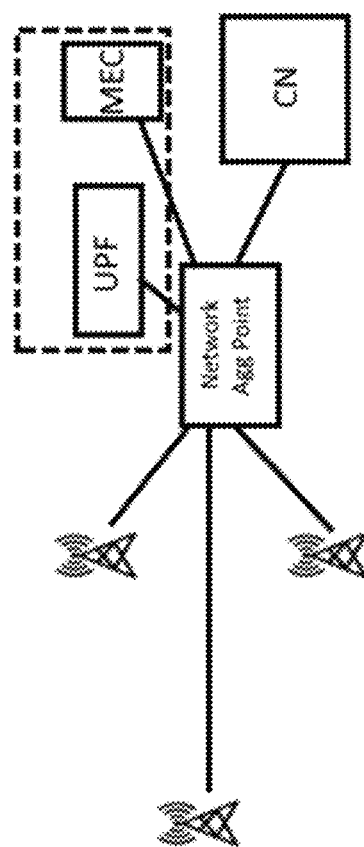
FIG. 58C illustrates a MEC and the local UPF co-located with a network aggregation point.

FIGS. 58A-58D illustrate options for the physical location of MEC. FIG. 58A illustrates a MEC and the local UPF co-located with the base station. FIG. 58B illustrates a MEC co-located with a transmission node and optionally with a local UPF. FIG. 58C illustrates a MEC and the local UPF co-located with a network aggregation point. FIG. 58D illustrates MEC co-located with the core network function (e.g., in the same data center). Advantageously, the MEC is operable to be deployed in a plurality of ways in different locations (e.g., near the base station, near the central data network).

The MEC is operable to provide traffic steering to route traffic to targeted applications in a slice or a distributed cloud. The M2 reference point between the data plane and the MEC platform is operable to provide traffic steering instructions (e.g., for applications, networks, services, etc.) to the data plane.

The Mp2 reference point between the MEC platform and the data plane of the virtualization infrastructure is used to instruct the data plane on how to route traffic among applications, networks, services, etc. The User Plane Function (UPF) is operable to route traffic to applications and/or network functions. An Application Function (AF) is operable to influence selection and/or re-selection of a UPF. The AF is also operable to configure rules to provide traffic steering to a data network.

The AF is operable to map Functional Entities (FE) of the MEC system. Traffic is not routed to MEC application unless the MEC application is prepared to receive traffic and the MEC platform has configured the data plane to route traffic to the MEC application. A MEC FE is operable to interact with the PCF to request traffic steering. In one embodiment, the MEC FE transmits information identifying the traffic to be steered to the PCF. In one embodiment, the PCF is operable to analyze the request, form policies in response to the request (e.g., policies that apply to at least one PDU session), and/or provide routing rules to the SMF. In one embodiment, the SMF is operable to initiate configuration of the routing rules in a target UPF. If no target UPF exists, the SMF is operable to designate at least one UPF.

In one embodiment, data plane functionality of the MEC is governed by the UPF. In one embodiment, the UPF is influenced by the MEC via control plane interactions with core network functions. In one embodiment, the SMF is operable to configure the UPF with a plurality of options for traffic steering. In one embodiment, the SMF inserts an uplink classifier function (UL CL) in the data path (e.g., for IPv4, IPv6, IPv4v6, ethernet). In one embodiment, the UL CL includes traffic rules operable to forward uplink traffic towards at least one application and/or network function. In one embodiment, the UL CL is operable to merge traffic destined to at least one UE in the downlink direction.

In one embodiment, a PDU session uses IPv6 or IPv4v6. In one embodiment, the SMF is operable to use a multi-homing concept for traffic steering. In one embodiment, the SMF is operable to insert a branching point function in a target UPF and/or configure the target UPF to split uplink traffic to a location application instance and/or services in a central cloud based on source prefixes of the IP data packets.

Advantageously, the system is operable to enable traffic steering based on a plurality of parameters. In one embodiment, the system is operable to provide generic traffic rule setting. In another embodiment, the system is operable to provide specific traffic rule setting for at least one specific UE. In one embodiment, the plurality of parameters includes, but is not limited to, information to identify the traffic (e.g., DNN, S-NSSAI, AF-Service-Identifier), a reference identifier operable to provide preconfigured routing information, a list of DNASs, information about at least one UE, information regarding possibilities of relocating at least one application, a timeframe when a routing condition is valid, a geographic location when the routing condition is valid, a notification type for user plane management notification, and/or a transaction identifier for the AF. In one embodiment, the system is operable to allow MEC functional entities and/or a MEC orchestrator to monitor mobility events related to MEC application instances. In one embodiment, the MEC functional entities are operable to subscribe to user plane path management notifications from at least one SMF. In one embodiment, the user plane path management notifications are operable to initiate traffic configuration procedures and/or application relocation procedures.

The MEC system is operable to provide networking and computing at the edge of the network with low latency and high bandwidth. Providing services at the edge means that the system must be operable to provide UE mobility. For example, and not limitation, handheld devices (e.g., smartphones) and/or vehicles (e.g., including V2X communication) require mobility. As such, when the handheld devices and/or the vehicles move, a location of the edge application may no longer be optimal, which is why the system must be operable to provide UE mobility. In one embodiment, the application instance is changed from a first location to a second location. In one embodiment, user context is transferred from the first location to the second location for a stateful application.

In one embodiment, an application is a stateful service. In one embodiment, application mobility for the stateful services includes transferring and synchronizing a service state between a first application instance and a second application instance. Advantageously, this process provides service continuity. In one embodiment, the application is constructed and configured to allow multiple instances of the application to run concurrently. In one embodiment, the service state of the application is operable to be captured in the first application instance and transferred to the second application instance independent of operation of the instance itself. In one embodiment, the second application instance is operable to continue in a second MEC host without disruption of service when the UE disconnects from the first application instance in a first MEC host. Alternatively, the application is a stateless service. In one embodiment, the stateless service does not require transferring and synchronizing the service state between the first application instance and the second application instance. Advantageously, the system is operable to provide application mobility within the MEC system.

Figure 59:
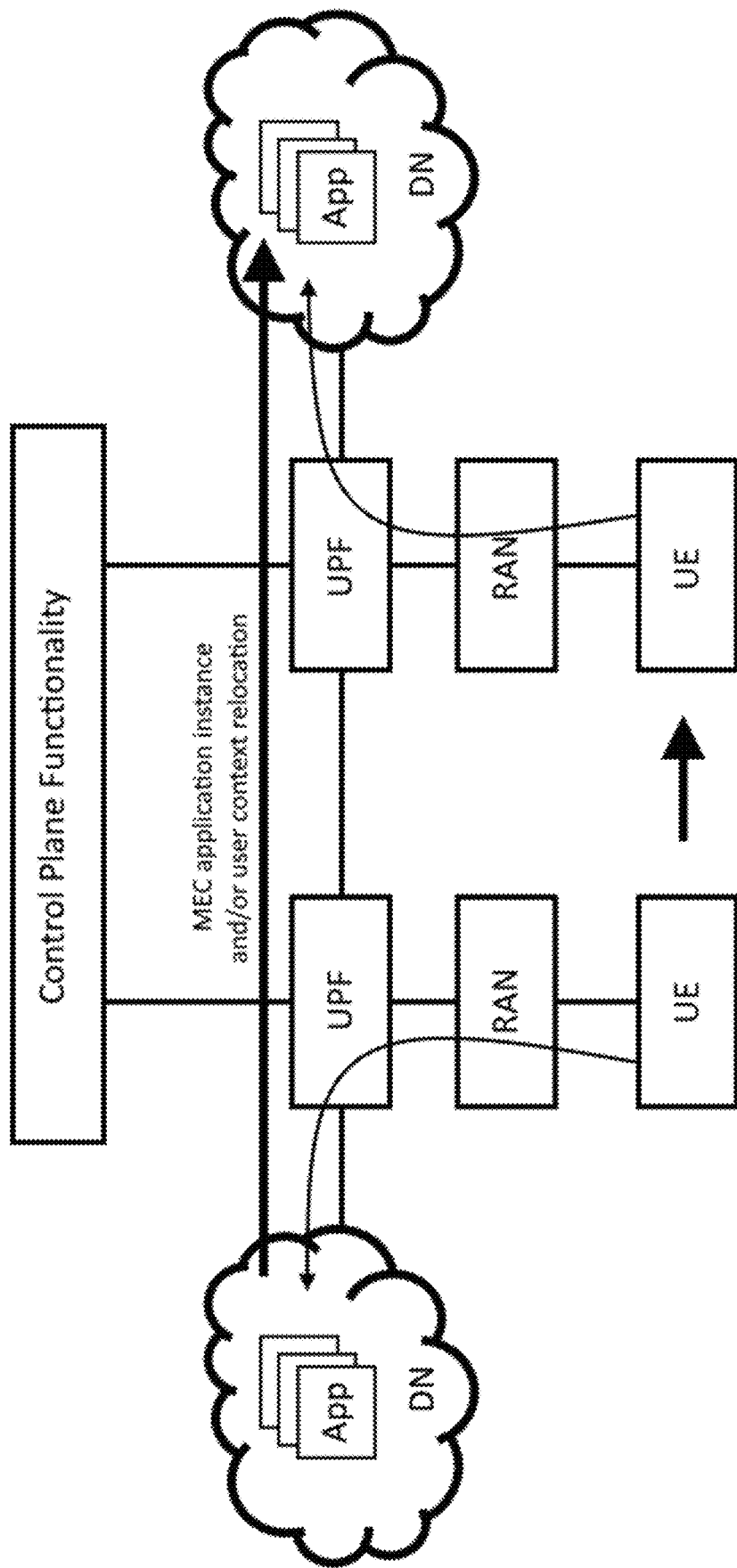
FIG. 59 illustrates one embodiment of application mobility in an integrated MEC deployment.

As previously described, in a preferred embodiment, the system is operable to provide application mobility. In one embodiment, service to a UE resumes when a user's context and/or application instance is relocated from a first MEC host to a second MEC host. FIG. 59 illustrates one embodiment of application mobility in an integrated MEC deployment.

In one embodiment, application mobility features include a plurality of procedures. In one embodiment, the plurality of procedures includes, but is not limited to, application mobility enablement, detection of UE movement, validation of application mobility, user context transfer, application instance relocation, and/or post-post processing of application relocation. In one embodiment, implementation of the plurality of procedures is dependent on characteristics of the application, characteristics of the environment, and/or capabilities of the system (e.g., MEC host, MEC orchestrator, MEC application).

In one embodiment, application mobility is triggered by detection of UE movement from a first serving cell to a second serving cell. In one embodiment, application mobility involves the NEF and/or MEC functional entities. In one embodiment, the MEC functional entities are operable to subscribe to relevant event notification. In one embodiment, the MEC platform subscribes to radio network information produces by the Radio Network Information Service (RNIS). In one embodiment, the radio network information is operable to identify at least one UE moving from the first serving cell to the second serving cell. In one embodiment, the radio network information is operable to determine whether the at least one UE is moving from a first service area of a first MEC host to a second service area of a second MEC host.

In one embodiment, the NEF is operable to expose capability information and/or services operable to be provided by core network functions to at least one external entity. In one embodiment, the at least one external entity includes at least one application function (AF) (e.g., MEC system functional entities). In one embodiment, SBA enables an authorized AF to directly access a network function. In one embodiment, services are exposed over NEF. In one embodiment, the services exposed over NEF include, but are not limited to, monitoring, provisioning, and/or policy and charging.

In one embodiment, monitoring provides for an external entity to request and/or subscribe to UE related events of interest. In one embodiment, the UE related events of interest include, but are not limited to, a roaming status of a UE, loss of connectivity of the UE, reachability of the UE, and/or location related events (e.g., location of a specific UE, identification of a UE in a geographical area). In one embodiment, the AMF and/or the UDM are operable to provide information about the UE related events of interest (e.g., predicted UE movement, communication characteristics).

In one embodiment, provisioning provides for an external entity to provision expected UE behavior in the system (e.g., predicted UE movement, communication characteristics).

In one embodiment, policy and charging is operable to handle quality of service (QoS) and charging policy for UE based requests from at least one external party. In one embodiment, policy and charging facilitates sponsored data services. In one embodiment, Policy and Charging Control (PCC) is governed by the Policy Control Function (PCF). In one embodiment, the PCC is supported by at least one NF.

FIG. 59 illustrates an example of 5G capability exposure to the MEC system. In the embodiment shown in FIG. 59, the MEC orchestrator is an AF and is operable to provide centralized functions for managing computing resources and operation of MEC hosts. The MEC orchestrator is operable to provide orchestration of MEC application running on the MEC hosts. In one embodiment, the MEC orchestrator is operable to interact with the NEF and/or network functions to provide monitoring, provisioning, and/or policy and charging. In one embodiment, the MEC host is deployed at the edge of the RAN. In one embodiment, the MEC platform is directly exposed to the CUs and/or the DUs of the RAN. Advantageously, this provides real-time radio information related to UEs, limiting latency and bandwidth consumption.

Figure 60:
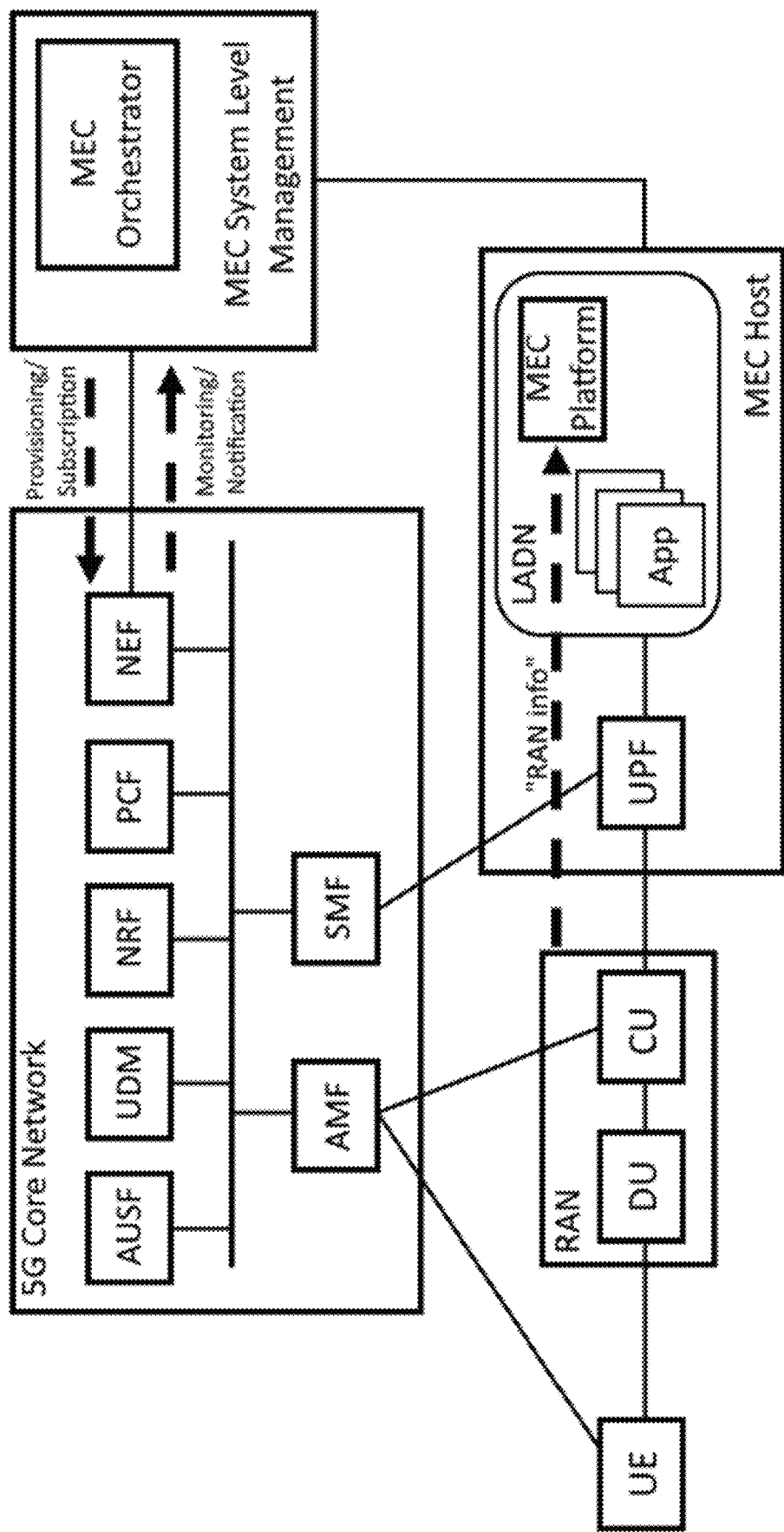
FIG. 60 illustrates one embodiment of the MEC system operable to provide add-on services to at least one MEC application.

In one embodiment, the MEC system is operable to provide add-on services to at least one MEC application by leveraging network capability information from the RAN as shown in FIG. 60. In one embodiment, the MEC platform and/or a MEC application is operable to determine a location of a UE using real-time signal information. In one embodiment, the MEC platform and/or the MEC producing application is operable to use the location to expose the UE to a MEC service consuming application via a MEC location service. In one embodiment, the location is operable to be transmitted to the 5G network. In one embodiment, the location is operable to be provided to the NEF to be used in predicting UE location. In one embodiment, the location is operable to be used to provide optimization of service and/or location-based services (LBSs) (e.g., location-based marketing) to the UE.

Figure 61:
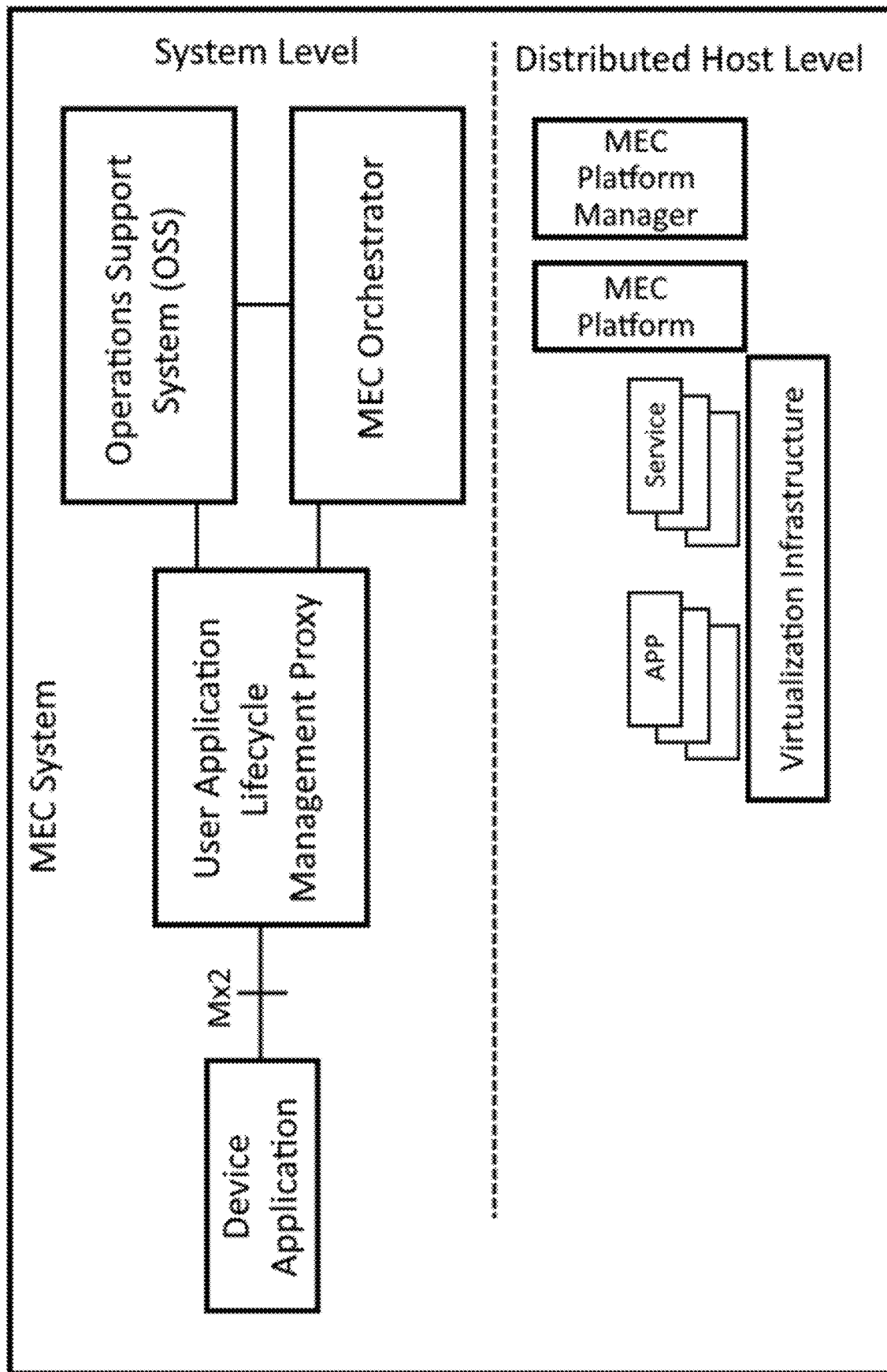
FIG. 61 illustrates one embodiment of the MEC system including a system level and distributed host level.

In one embodiment, the Mx2 reference point is positioned between the device application and the User Application Lifecycle Management proxy as shown in FIG. 61. In one embodiment, the system includes a UE Application API over the Mx2 reference point. In one embodiment, the UE Application API is operable to allow the device application to request at least one lifecycle management action in the MEC system (e.g., requesting a list of available MEC applications, instantiation of at least one MEC application, termination of at least one MEC application). In one embodiment, the UE Application API is operable to allow the device application to receive at least one notification of a change in the MEC application's IP address. The MEC applications instantiated in a MEC host in response to a request via a device application are referred to as user applications.

In one embodiment, the UE Application API is operable to assist the MEC system with application and/or context relocation. In one embodiment, the UE Application API is operable to assist the MEC system with application relocation between a first MEC system and a second MEC system. In one embodiment, the UE Application API is operable to assist the MEC system with application relocation between the MEC system and a cloud system.

In one embodiment, MEC services are provided by at least one Mobile Network Operator (MNO). Additionally or alternatively, the MEC services are provided by at least one third party. In one embodiment, the at least one third party is a cloud service provider, a venue owner, a facility owner, a management company, a cell tower provider, a neutral host vendor, and/or a fleet management company. In one embodiment, the at least one MNO leases or buys edge cloud services from the at least one third party.

Figure 62:
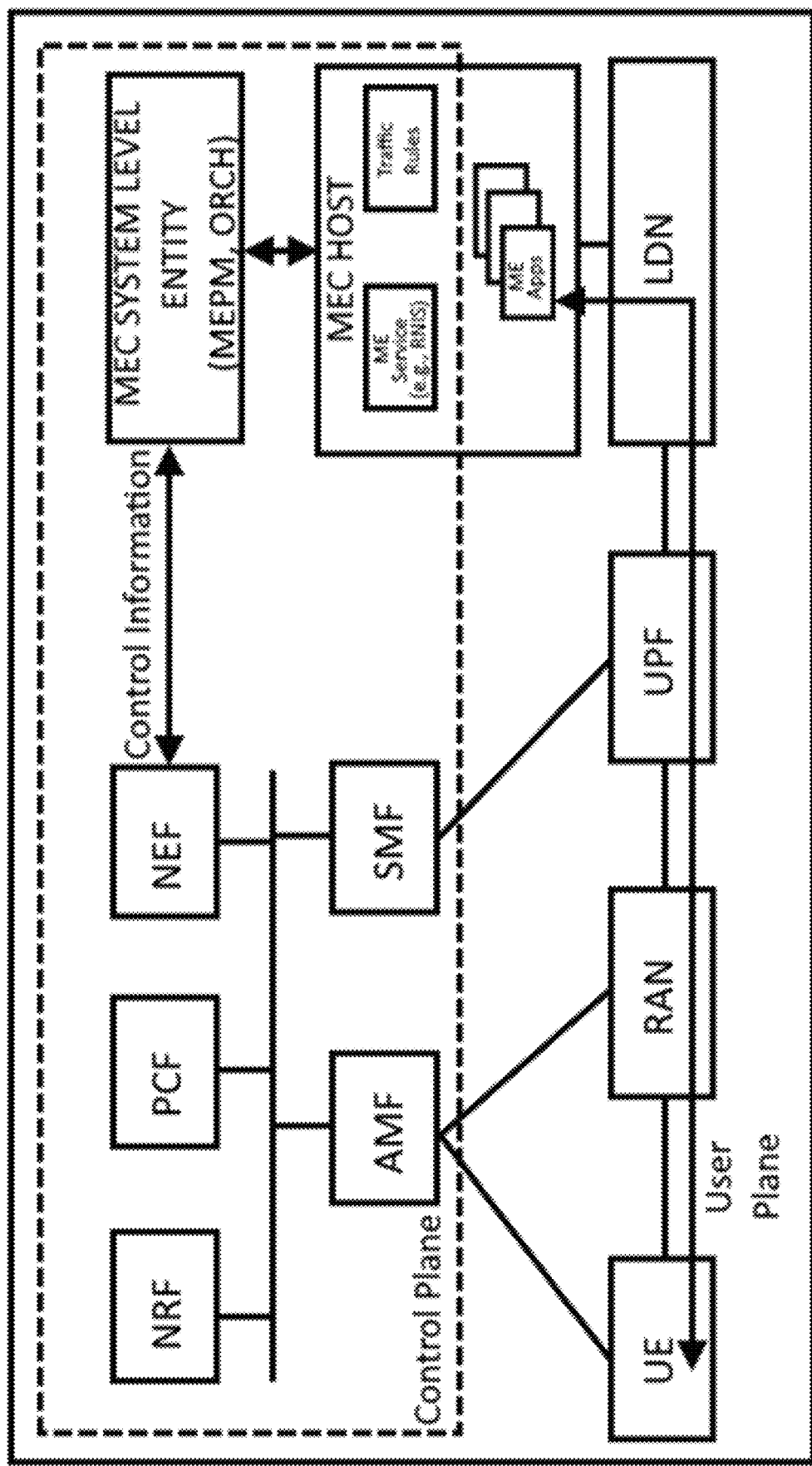
FIG. 62 illustrates one embodiment of a third-party cloud for MEC in a 5G network environment.

FIG. 62 illustrates one embodiment of a third-party cloud for MEC in a 5G network environment. The Network Exposure Function (NEF) is operable to be used an entry point into the 5G network for at least one authorized third party. The at least one authorized third party is operable to configure application traffic in the user plane and direct the application traffic to at least one MEC application in a local data network (LDN). The NEF is also operable to provide network information (e.g., mobility information, radio resource information) to the MEC system. The NEF is operable to handle control functions to manage MEC operations (e.g., for the at least one authorized third party). Advantageously, this provides separation between the MNO and the at least one authorized third party.

Traffic on the user place is directed to MEC applications via configuration and placement of UPF functions. The configuration and placement of the UPF functions is operable to be influenced (e.g., by third party cloud service providers) via a control interface exposed through the NEF.

MEC enables serverless computing by hosting Function as a service (FaaS) at the edge and integrating with a cloud service provider. FaaS is operable to be implemented via at least one cloud wrapper MEC application running on at least one MEC host. A MEC service application is operable to manage local resources.

Figure 63:
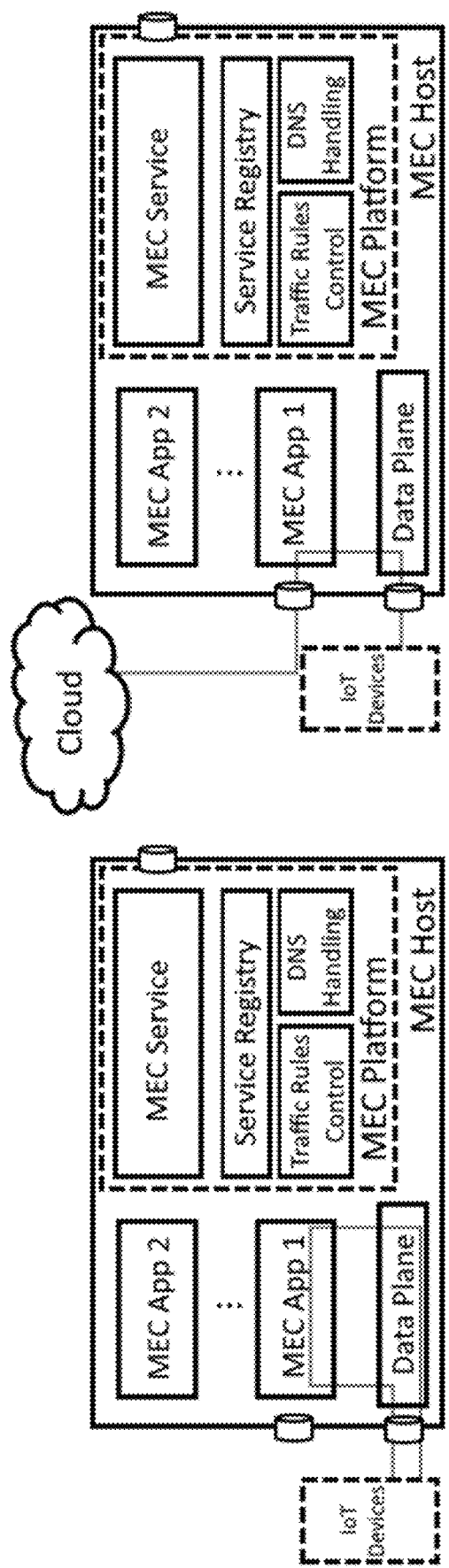
FIG. 63 illustrates one embodiment of a MEC host with and without a break-out to cloud.

FIG. 63 illustrates one embodiment of a MEC host with and without a break-out to cloud. Traffic is operable to be sent back to an IoT device, sent to a cloud service provider from a cloud wrapper MEC application, or transferred to an alternate MEC application with sufficient resources. The MEC application and/or the MEC service is operable to indicate to the AF to initiate traffic steering to an alternative MEC host with sufficient resources. In one embodiment, the indication includes traffic rule activation over an application enablement API.

Figure 64:
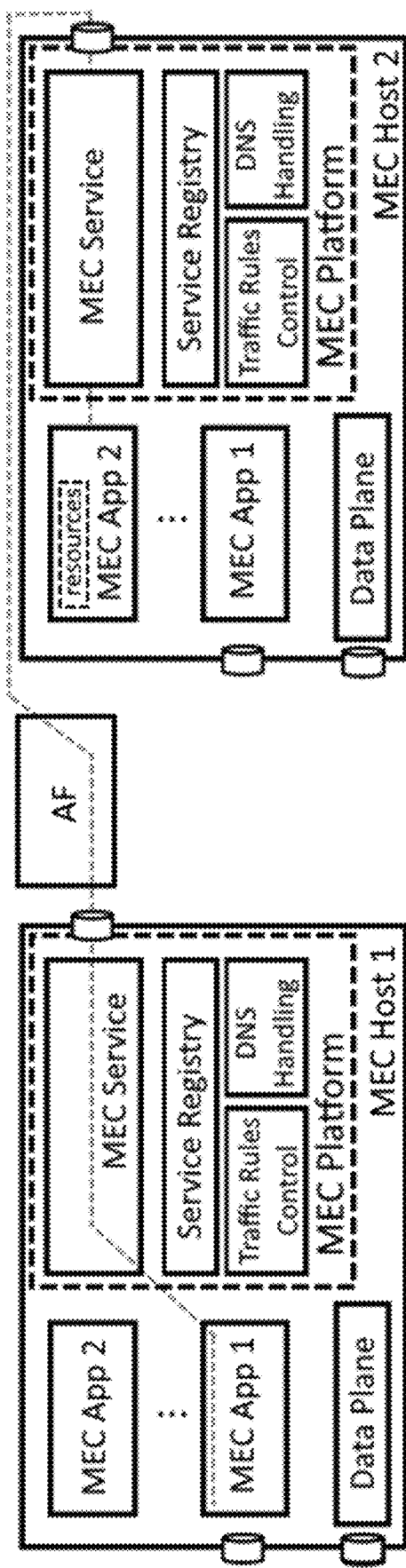
FIG. 64 illustrates one embodiment of traffic steering to an alternative MEC host.

FIG. 64 illustrates one embodiment of traffic steering to an alternative MEC host.

MEC is operable to support enterprise applications and provide enterprise connectivity. For example, and not limitation, MEC-based applications are expected to benefit a plurality of industry sectors (e.g., traffic management, healthcare, government entities). Network slicing and flexibility of UPF deployment are operable to enable the enterprise applications for the plurality of industry sectors.

In one embodiment, a network includes ultra-reliable low latency communications (URLLC) including local processing (e.g., in an edge cloud). Advantageously, the URLLC provides benefits for IoT devices. In one embodiment, the edge cloud is used in Massive IoT (e.g., hundreds to billions of connected devices or sensors). Network slicing provides dedicated resources for tenants (e.g., for IoT). Additional information is included in ETSI, MEC in 5G networks, ETSI White Paper No. 28, ISBN No. 979-10-92620-22-1 (June 2018), which is incorporated herein by reference in its entirety.

In one embodiment, the MEC provides traffic steering and policy control information of applications. In one embodiment, information is exchanged between the MEC and the network exposure function (NEF). See, e.g., ETSI: ETSI GS MEC 002 Multi-access Edge Computing (MEC); Phase 2: Use Cases and Requirements, v2.1.1. ETSI MEC ISG (October 2018), which is incorporated herein by reference in its entirety.

In one embodiment, the system includes an NFV MANO as part of the management and orchestration domain. In one embodiment, the NFVO and/or the VFNM are operable to provide life cycle management of the MEC platform and/or the MEC applications. In one embodiment, the NFV infrastructure (NFVI) is operable to deploy the MEC applications, the MEC platforms, and/or the MEC platform managers.

In one embodiment, a slice is included in the MEC. In one embodiment, the MEC Platform (MEP) and the MEC Platform Management (MEPM) entities are operable to be shared by more than one slice. In one embodiment, each slice includes a MEP and a MEPM. In one embodiment, the MEC includes a MEC Applications Orchestrator (MEAD) and/or a virtualized MEPM (MEPM-V). In one embodiment, each slice is isolated from other slices.

In one embodiment, the MEC includes procedures for migration and/or service continuity of applications. In one embodiment, the procedures include, but are not limited to, MEC host pre-allocation based on UE movement prediction and/or creation of relocation groups. In one embodiment, the relocation groups include at least one MEC host pre-configured to run at least one application. Advantageously, pre-configuring the at least one MEC host to run the at least one application reduces deployment time required for a handover. See, e.g., ETSI: ETSI GR MEC 018, Multi-access Edge Computing (MEC); End to End Mobility Aspects, v1.1.1 ETSI MEC ISG (October 2017), which is incorporated herein by reference in its entirety.

In one embodiment, the MEC is defined as a separate orchestration domain. In one embodiment, the MEC is implemented on the same NFVI and VNFs. In one embodiment, the MEC is hosted by the ETSI NFV MANO stack of the VNF domain. The MEC is operable to reduce latency, offload computation, scale data, and/or offload some network functions.

In one embodiment, the system is operable to perform network slicing. In one embodiment, the network slicing is based on an ETSI NFV MANO architecture. In one embodiment, the network slicing is operable to support tenant-oriented operations and interfaces. In one embodiment, the network slicing includes at least one embedded in-slice manager.

Figure 65:
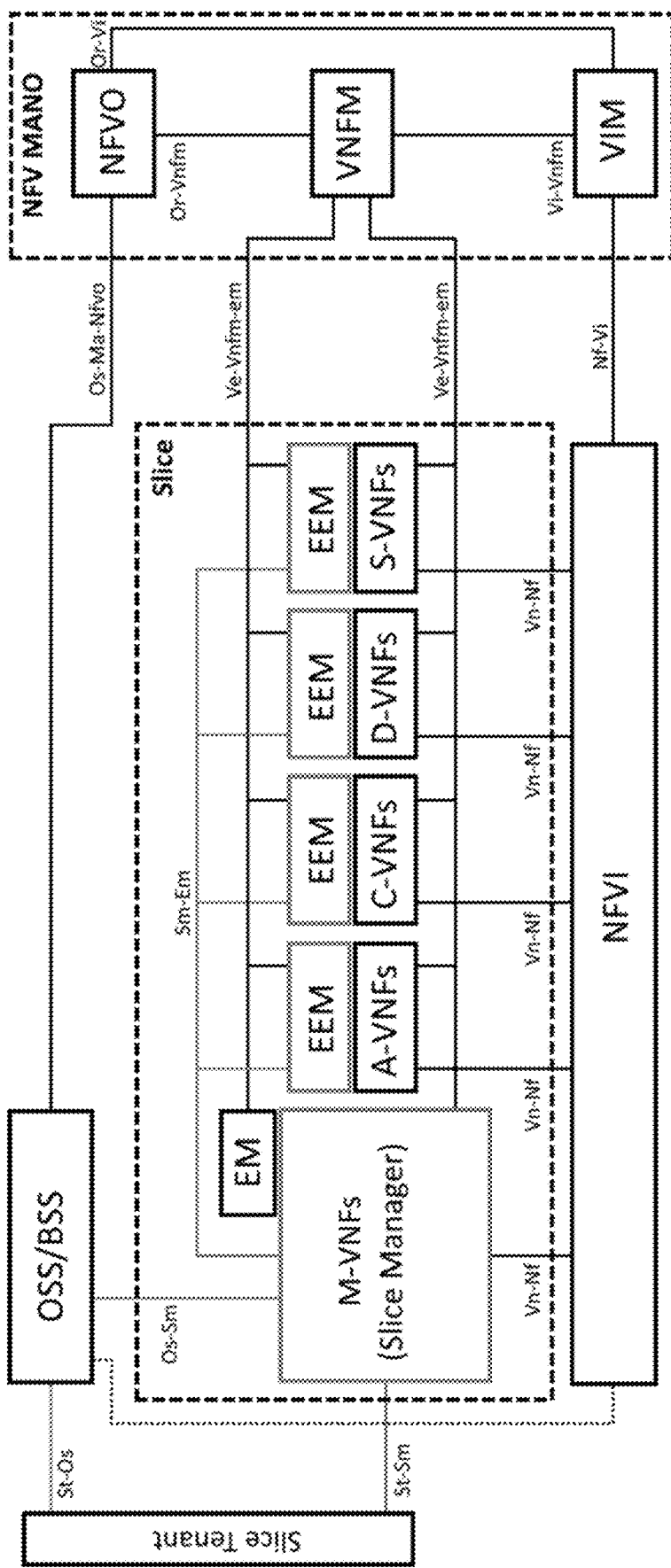
FIG. 65 illustrates one embodiment of a Distributed Autonomous Slice Management and Orchestration (DASMO).

In one embodiment, the system includes a Distributed Autonomous Slice Management and Orchestration (DASMO), which is illustrated in FIG. 65. DASMO is described in S. Kukliński and L. Tomaszewski, "DASMO: A scalable approach to network slices management and orchestration," NOMS 2018-2018 IEEE/IFIP Network Operations and Management Symposium, 2018, pp. 1-6, doi: 10.1109/NOMS.2018.8406279, which is incorporated herein by reference in its entirety. In one embodiment, a slice includes a core. The core includes a plurality of functions and/or at least one functional block. In one embodiment, the plurality of functions includes, but is not limited to, application virtual network functions (A-VNFs), control virtual network functions (C-VNFs), management virtual network functions (M-VNFs), and/or support virtual network functions (S-VNFs). In one embodiment, the at least one function includes a Slice Manager (SM) and/or a Slice Operation Support (SOS). In one embodiment, the SM is operable to implement M-VNFs. In one embodiment, the SOS is operable to implement S-VNFs.

The SM includes connections to Embedded Element Managers (EEMs) of VNFs implemented within a slice. The EEMs are operable to provide slice-level management support, VNF monitoring, actuating, and/or autonomic control loops. In one embodiment, the SM is operable to provide a real-time feedback loop. In one embodiment, the real-time feedback loop is compatible with a Monitor-Analyze-Plan-Execute (MAPE) model. In one embodiment, the SM further provides accounting, KPI monitoring and reporting, and/or configuration support as tenant-oriented functions. In one embodiment, the SM includes an interface to the global OSS/BSS. In one embodiment, SOS functions are operable to provide slice-level operations including, but not limited to, slice selection, subscription, authentication, and/or stitching of sub-slices.

In one embodiment, the SM is centrally located within the slice management plane. In one embodiment, the SM is linked to Embedded Element Managers (EEMs) of VNFs implemented within a slice. In one embodiment, the EEMs are compatible with ETSI NFV concepts of an Element Manager (EM). In one embodiment, the EEMs are operable to include Advantageously, the in-slice management (ISM) concept is scalable. For example, and not limitation, orchestration is operable to be scaled using recursive orchestration (e.g., "MANO in MANO"). Further, this ISM concept is compatible with DASMO. In one embodiment, slicing architecture of the MEC is based on a plurality of factors including, but not limited to, limited geographic scope, specificity of services, flexible architecture, implementation of MEC applications as part of slice AP, and/or tight integration of MEC APIs.

Figure 66:
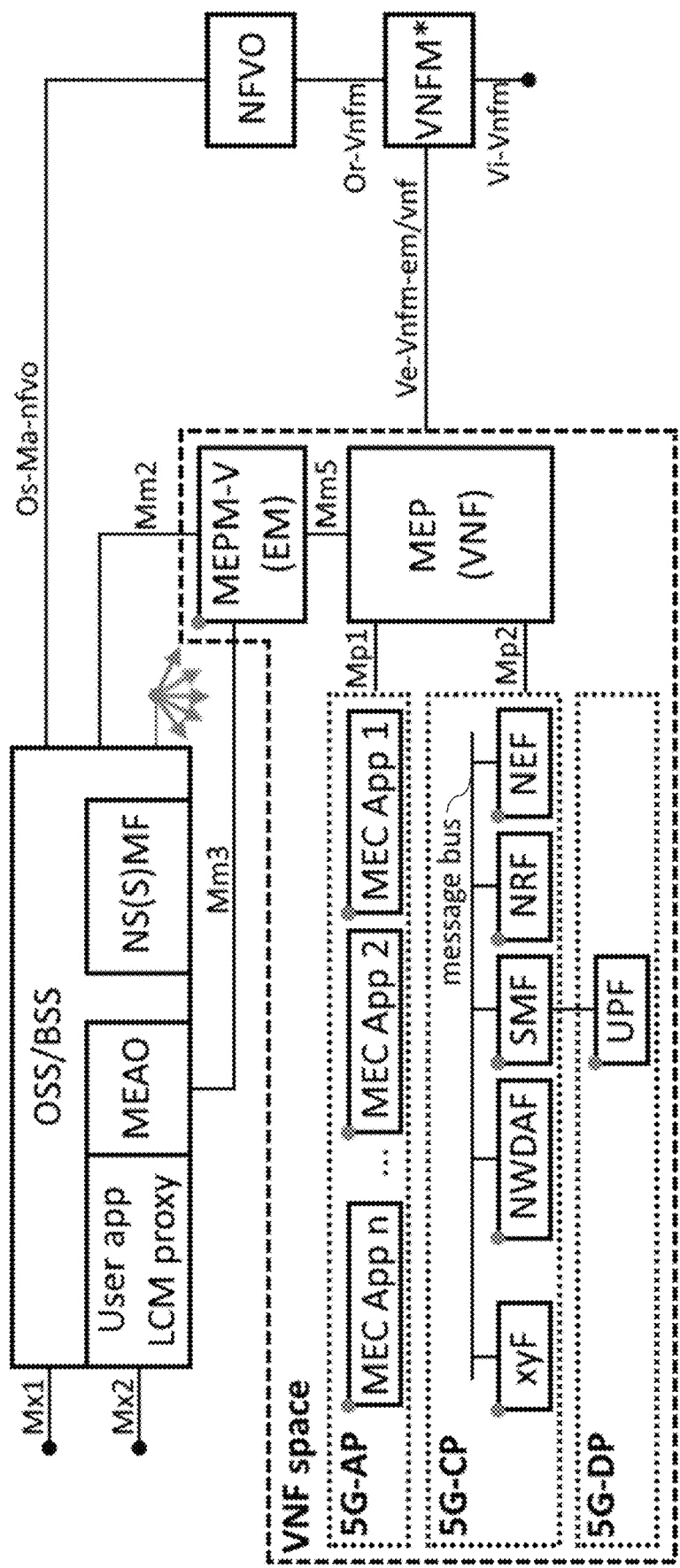
FIG. 66 illustrates one embodiment of proposed generalized MEC architecture.

FIG. 66 illustrates one embodiment of proposed generalized MEC architecture. In one embodiment, the VNFs are implemented in a VNF space. In one embodiment, the VNFs utilize a common NFVI managed by a VIM. In one embodiment, the NFVI is a single-domain. Alternatively, the NFVI is a multi-domain. In one embodiment, the VNFs have EMs (shown in gray dots) connected to the OSS/BSS (shown using gray arrows). The MEC Apps include management functions. In one embodiment, the management functions are embedded in the applications. The VNFs and the Ems are connected to at least one VNFM. The at least one VNFM is operable to provide life cycle management of MEC applications and VNFs. In one embodiment, all interactions with the NFV MANO stack are provided by an OSS-NFVO interface. In one embodiment, at least one MEC reference point is internalized. In one embodiment, the OSS/BSS opens the M×1 interface and/or the M×2 interface to the customer domain.

In one embodiment, the system includes a MEP-MEP-V (Variant 1). In FIG. 66, the "VNF space" is operable to be renamed as "5G Network" using Variant 1. Alternatively, the system includes a MEP/MEPM-V shared by multiple networks (Variant 2). In Variant 2, the MEP-MEPM-V are dedicated and external to 5G networks. In one embodiment, the system is operable to provide network privacy via externalized MEP relative to connected networks (e.g., in Variant 2). In one embodiment, the system is operable to provide inter-application privacy.

Moving network functions to the edge of a distributed network decreases latency and increases performance but reduces control and management of the system overall. Distributed networks generally do not use centralized management due to the inefficiencies created by transporting data to a centralized location.

Figure 67:
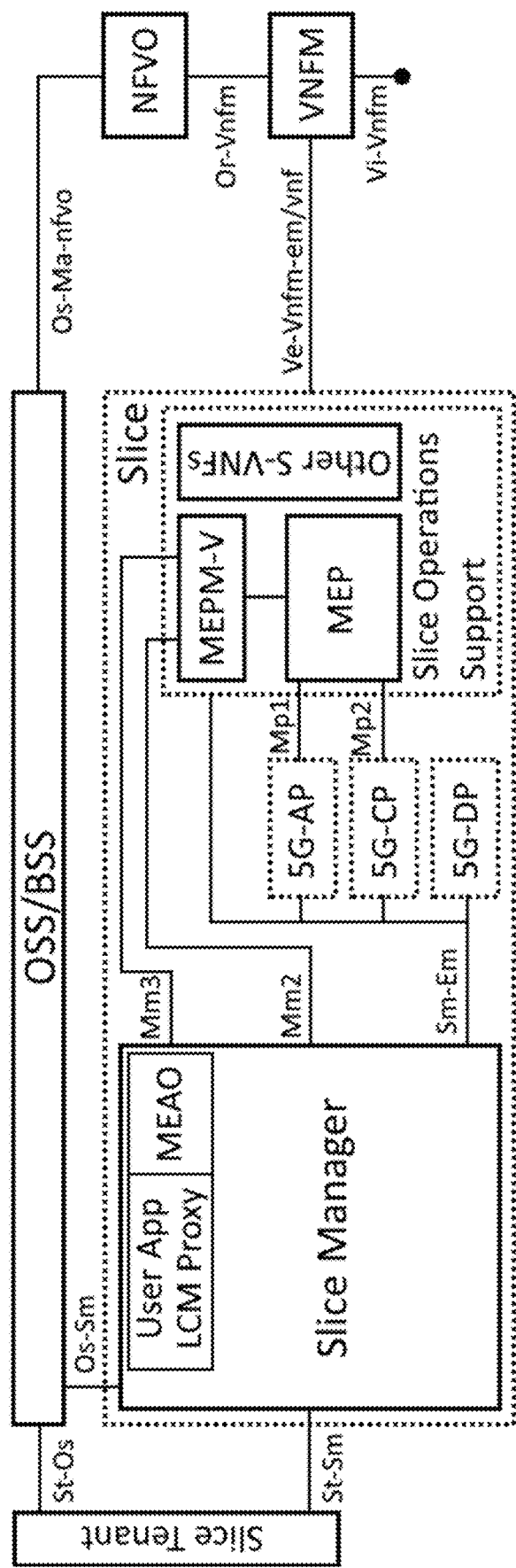
FIG. 67 illustrates one embodiment of DASMO extended with MEC.

FIG. 67 illustrates one embodiment of DASMO extended with MEC. Each VNF has a corresponding EEM, which is required in DASMO. Each corresponding EEM is connected to the SM. The MEAO and the User App LCM proxy are located in the SM. The SM is operable to provide routing of data. The MEP and the MEPM-V are located in the SOS.

The DASMO architecture is also operable to support multi-domain sliced networks. In one embodiment, the global OSS/BSS includes Multi-Domain Management and Orchestration Support functions including a Multi-Domain Slice Configurator (MDSC) and/or a Multi-Domain Orchestrator ("Umbrella NFVO"). In one embodiment, the MDSC is operable to monitor the end-to-end slice and/or coordinate reconfiguration of the end-to-end slice. In one embodiment, the MDSC is operable to configure local SOS entities for inter-domain operations.

In one embodiment, the system is operable to provide horizontal end-to-end slice stitching to enable operations in a multi-domain environment. In one embodiment, the system utilizes Inter-Domain Operations Support (DOS) to provide the horizontal end-to-end slice stitching. In one embodiment, the DOS is operable to provide exchange of information between neighboring domains. In one embodiment, the Mp3 reference point is operable to control information transfer between MEPs. In one embodiment, the information transfer is via DOS.

In one embodiment, the system includes service APIs exposed to MEC applications by the MEP. In one embodiment, the service APIs include, but are not limited to, Radio Network Information, Location, UE Identity, and/or Bandwidth Management. In one embodiment, the service APIs are provided via the Mp2 reference point.

In one embodiment, the MEC is where the RF environmental information and the customer goals are used to optimize the customer utilization of spectrum and RF environment. The RF environmental information collected and analyzed in the RU, DU, and/or CU are first combined with customer goals to filter and use only relevant data (e.g., actionable data) to optimize customer utilization of the RF environment and spectrum.

In the RU, DU, and/or CU, the environment is collected, aggregated, and analyzed to obtain RF environmental awareness information. This is represented in a vector ensemble class (SD) for each signal in the RF environment. If N signals are detected in the RF environment, then this ensemble is operable to be represented by the following group:

$$SD_t = \bigcup_{i=1}^{N} S_{c_i}$$

where $S_{c_i}$ is the ith detected signal information. The detected signal information includes, but is not limited to, a center frequency ($f_{c_i}$), a bandwidth ($BW_i$), a power ($P_i$), a signal to noise ratio ($SNR_i$), a signal to total noise and interference ratio ($SNIR_i$), a modulation type ($M_i$), a type of signal ($T_i$), a location of signal or angle of arrival relative to the RU ($L_i$), an antenna index ($A_i$), an arrival rate ($\alpha r_i$), a time of arrival of signal i to antenna index j ($TOA_{i,j}$), a priority latency ($PL_i$, an interaction vector ($I_{v_i}$) (e.g., list of signals that the ith signal interacts with), customer jth actionable data or information ($ADI_j$), a lower frequency component of signal i ($f_{L_i}$), an upper frequency component of signal i ($f_{U_i}$), and/or a time duration of the ith signal ($TD_i$). $S_{c_i}$ is operable to be represented by the following, among other environmental RF awareness metadata:

$$S_{c_i}=[f_{c_i},BW_i,P_i,SNR_i,SNIR_i,M_i,T_i,L_i,A_i,ar_i,TOA_{i,j},PL_i, I_{v_i},ADI_j,f_{L_i},TD_i, \ldots]$$

The signal information is then analyzed for all signals in the capture environment. Statistical information (e.g., simple statistics) of the signals are obtained, and possible interactions are analyzed $\{I_{v_i}\}$. The customer goals are analyzed and actionable data is extracted on $SD_i$ for the customer. This operation is operable to be performed for a plurality of customers simultaneously (e.g., using the vectors described herein).

Figure 68:
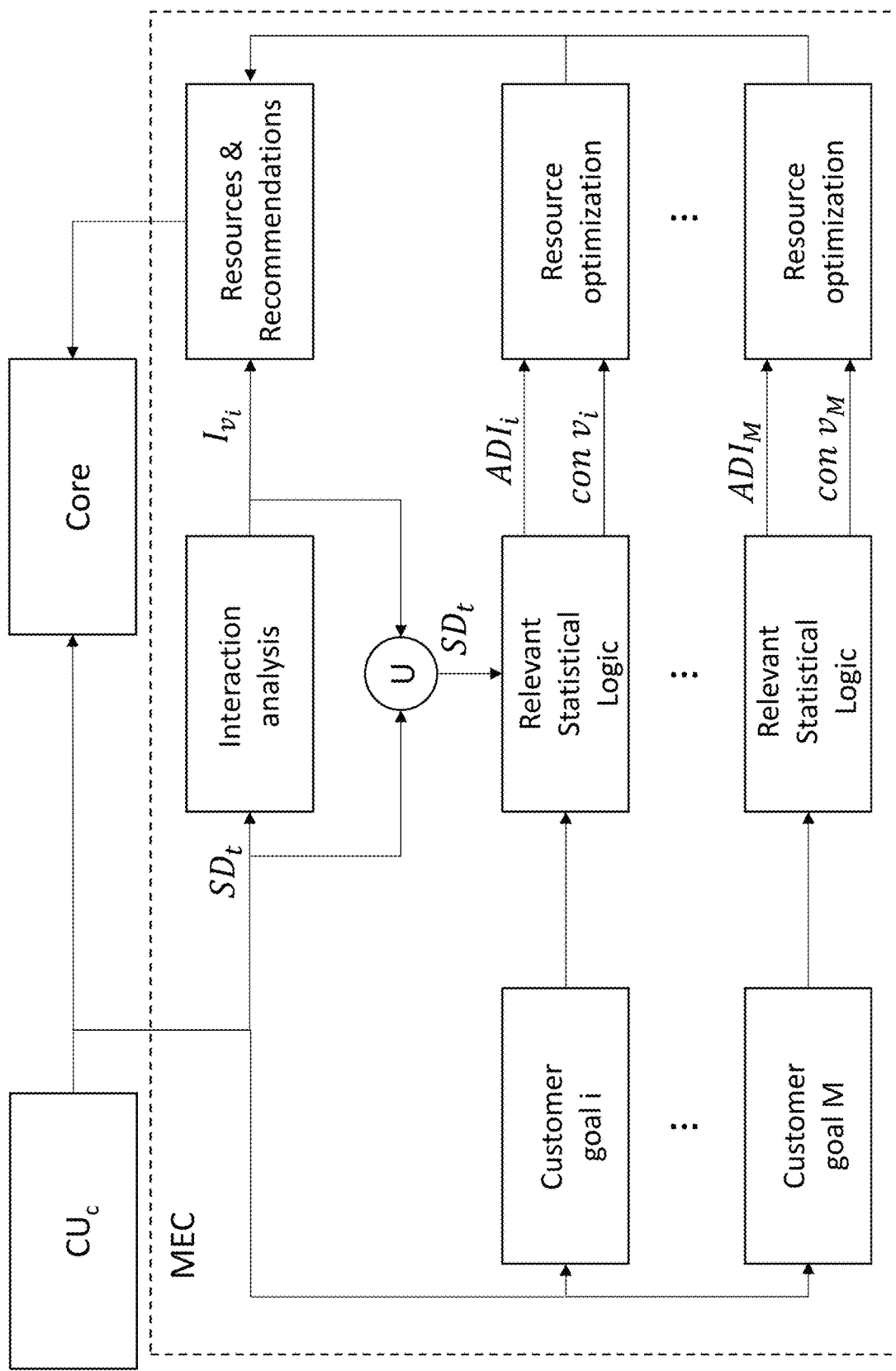
FIG. 68 illustrates one embodiment of the system including resource optimization.

As seen in FIG. 68, the CU passes the set $SD_t$ containing all information available for each signal in the environment to the MEC application. The following steps are performed. First, each signal in the $SD_t$ is analyzed for possible interactions. For example, and not limitation:
a) Center frequency: $f_{c_i}=f_{c_j}\pm\Delta_i$
b) For the jth signal: $f_{L_i} \leq f_{L_j} < f_{L_i}+BW_i$
c) For the jth signal: $f_{L_i} < f_{L_j}+BW_j < f_{U_i}$.

If these conditions are satisfied, then i and j interact and power levels are checked for lower estimate of $SNIR_i$ contribution of that interaction for the signal i and $s_j$ is added to $IV_i$.

Once all possible interaction between signals in the $SD_t$ are detected, a new set is created by adding the set $\{IV_i\}_i^v$ to $\overline{SD}^t$. The resulting set SD t is then combined with the customer goals index vector $\{CG_{i=1}\}_i^M$, which is a vector of binary values {0,1}, where 1 in the Kth index denotes the $SC_i$. K index $\forall_i$ is used for further analysis to satisfy the customer goals:

$$CG_j = [a_1 \ a_2 \ \ldots \ a_{IL}]$$

where $a_j \in \{0,1\}$ and IL is the length of $SC_i$ $\forall_i$. This result is the $ADI_i$, which is the actionable data information for customer i.

The customer goal index vector for the jth customer is obtained by a semantic engine. The semantic engine is operable to associate information required for each goal requested and assign a one or a zero to each index in $SC_j$. In a preferred embodiment, a one is assigned if the information is relevant and a zero is assigned if the information is not relevant. Alternatively, a zero is assigned if the information is relevant and a one is assigned if the information is not relevant. This is performed in the relevant statistical logic function. Additionally, this function uses a constraint vector $$h_{c_p}]_{p=1}^{M}$$

is generated if and only if information about the network resources (e.g., both transmitter and receiver of each node on the network) are known and part of the customer goals information supplied to the function (e.g., during initialization or setup). This constraint vector is used to set order of importance for the usage of each resource. Each customer goal generates a unique set of constraint vectors. An additional factor influencing this constraint vector includes, but is not limited to, the granularity at which the network resources are operable to be accessed. In general, the optimization is operable to be expressed as follows:

$$J_{ru} = \min_{ru}[G(ADI_i) + \lambda_C{}^T A(ru) - CGV]$$

where ru is the resource unit, G(•) is a function defined by customer goals, A(•) is a function defined by the customer goals and the available resource units in the network, and CGV is the optimal values reflecting the customer goals under ideal circumstances. G(•), A(•), and CGV are dictated by the customer goals and network resource knowledge, which are a priori information (e.g., loaded during initialization or set up).

Before proceeding with examples of customer goals, the network resources available for optimization must first be established. The following examples begin with simple examples and move to more comprehensive examples relevant to current 4G, 5G, and new 6G networks.

Example 1

The first example includes a customer goal to minimize interference for a transmitted signal ($s_2$).

Figure 69:
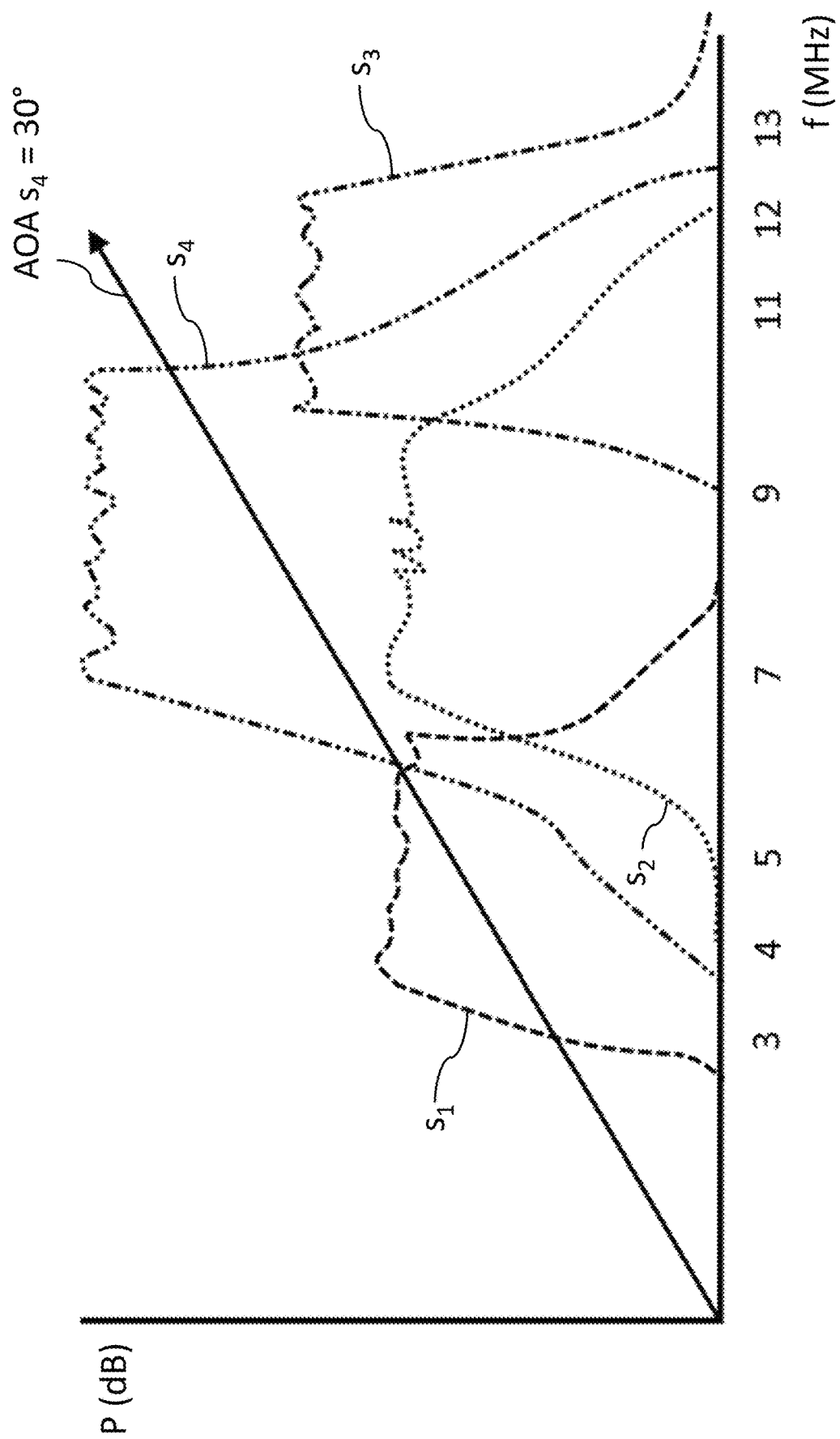
FIG. 69 illustrates one example of an RF environment.

FIG. 69 illustrates one example of an RF environment. In the example shown, a first signal ($s_1$) is a QPSK signal having a power $P_1$ with $f_{1L}$=3 MHz, $f_{1U}$=6 MHz, $BW_1$=3 MHz, $L_1$=0°, $TOA_1$=15 samples, $SNR_1$=20, $SINR_1$=9.2 dB, $M_1$=3 (QPSK), $A_1$=1, $ar_1$=1, $P_{L_1}$=0 dB, $I_{v_1}$=[2], and $TD_1$=1. A second signal ($s_2$) is the customer signal, which is a QPSK signal having a power $P_2$ similar to $P_1$ with $f_{2L}$=4 MHz, $f_{2U}$=11 MHz, $BW_2$=7 MHz, $L_2$=0°, $TOA_2$=40 samples, $SNR_2$=20, $SINR_2$=2.92 dB, $M_2$=3 (QPSK), $A_2$=1, $ar_2$=1, $P_{L_2}$=0 dB, $I_{v_1}$=[1,3], and $TD_2$=1. A third signal ($s_3$) is a 16-QAM signal having a power $P_3$ that is 3 dB above $P_1$ and $P_2$ with $f_{3L}$=9 MHz, $f_{3U}$=13 MHz, $BW_3$=4 MHz, $L_3$=0°, $TOA_3$=20 samples, $SNR_3 \approx 23$, $SINR_3 \approx 18$ dB, $M_3$=16 (16-QAM), $A_3$=1, $ar_3$=1, $P_{L_3}$=0 dB, $I_{v_3}$=[2], and $TD_3$=1. A fourth signal ($s_4$) is a BPSK signal having a power $P_4$ that is 1 dB above $P_1$ and $P_2$ with $f_{4L}$=4 MHz, $f_{4U}$=12 MHz, $BW_4$=8 MHz, $L_4$=30°, $TOA_4$=100 samples, $SNR_4 \approx 21$ dB, $SINR_4 \approx 37$ dB, $M_4$=1 (BPSK), $A_4$=1, $ar_4$=1, $P_{L_4}$=0 dB, $I_{v_4}$=[0], and $TD_4$=1.

The customer goal is to minimize interference, then actionable data relevant to customer 2 is included in the following vector:

$$ADI_2 = [s_{c_2}, M_1, M_3, P_1, P_3, f_{1U}, f_{1L}, f_{3U}, f_{3L}, B_{W1}, B_{W3}, L_1, L_3]$$

Optimization according to the goal of reducing overall SINR for signal 2 and reducing interference while only controlling the parameters associated with signal $s_2$ provides the following equation:

G=SINR for $s_2$ based on $ADI_2$

First, if $BW_2$ is operable to be adjusted (e.g., no throughput constraint), then G is operable to be calculated as follows:

$$G(ADI_2) = 10\log\left[\frac{P_2}{N_2 + (f_{1U} - f_{2L})\frac{P_1}{BW_1} + (f_{2U} - f_{3L})\frac{P_3}{BW_3}}\right]$$

The A(•) function is calculated as:

$$A_2(\bullet) = SNR_2 + SINR_2$$

and $CVG_2$ is calculated as follows:

$$CGV_2 = SNR_2$$

The optimization is given as follows:

$$J_{ru} = \min_{RU_2}[G(ADI_2) + \lambda(SNR_2 + SINR_2 - SNR_2)]$$

where $\min_{RU_2}$ is minimized over all parameters (e.g., $P_2$, $f_{2L}$, $f_{2U}$, $BW_2$, etc.). This results in the following equation (eq. A):

$$J_{ru} = \min_{RU_2}\left[10\log\left[\frac{P_2}{N_2 + (f_{1U} - f_{2L})\frac{P_1}{BW_1} + (f_{2U} - f_{3L})\frac{P_3}{BW_3}}\right] + \lambda(SNR_2 + SINR_2 - SNR_2)\right]$$

If there is no constraint on $BW_2$ (and throughput, assuming $M_2$ remains constant), then $f_{2L} = f_{1U}$ and $f_{2U} = f_{3L}$, $SINR_2$ becomes $SNR_2$. Thus, the above cost function is minimized to zero and interference is removed from $s_2$.

However, if $BW_2$ has a constraint of $BW_2$=7 MHz, then the above expression is minimized relative to $P_2$ by making $P_2$ as large as possible. Typically, there are constraints on $P_{max}$ for each signal. For example, and not limitation, if $P_{2max}$=10 dBm, $P_1$=5 dBm, and $P_3$=8 dBm, the cost function becomes:

$$\text{Cost} = [1 + \lambda]\left[10\log_{10}\left(\frac{10^{(10/10)}}{\frac{10^{(10/10)}}{100} + 10\left(\frac{5(2)}{30}\right) + 10\left(\frac{8(2)}{40}\right)}\right)\right] = 5.98 \text{ dB}$$

Example 2

The second example includes optimizing over the customer transmitting signal 4 ($s_4$) as well as customer 2 transmitting $s_2$. The goal of customer 4 is to maximize throughput given a power constraint of $P_{4max}$=8 dBm.

In this case, the cost function has the previous cost function as its first component and the second component is provided in the following equation:

$$\max{}_{RU_4}(f_{4U}-f_{4L})+\Delta[BW_4-BW_{4max}] \text{ where } BW_{4max}=15 \text{ MHz}$$

Thus, the component cost function becomes:

$$C_{total}=eq\ A+\max{}_{RU_4}(f_{4U}-f_{4L})+\lambda[BW_4-15]$$

$s_4$ is at AOA of 30° compared to $s_1$, $s_2$, and $s_3$, which are at 0°. Thus, the spatial filtering separates both signals. Therefore, the two components of the compound cost function are operable to be treated as two optimizations because $I_{v_4}$=[Ø] and $I_{v_2}$=[1,3] so it does not contain $s_4$. Therefore, in this example, the second optimization results in $f_{4U}$=15 MHz and $f_{4L}$=0 MHz for $BW_4$=$BW_{max}$=15 MHz.

Example 3

The third example includes utilization of spectrum in the Citizens Broadband Radio Service (CBRS) band (3.4 to 3.55 GHz) for private wireless networks. A private wireless network provides a private cellular network for use by a customer. In one embodiment, the private wireless network uses cellular infrastructure both for the customer access point and user equipment (e.g., based on 4G LTE or 5G protocols). In one embodiment, the private wireless network uses spectrum in the CBRS band in the unlicensed portion of the 150 MHz (the General Authorized Access (GAA) portion). In one embodiment, the private wireless network uses Spectrum Access System (SaS) allocation methodology. In one embodiment, the allocation is based on information stored in at least one database. In one embodiment, the information includes information about at least one network access point (e.g., all network access points) for the private wireless network. In one embodiment, the information includes, but is not limited to, transmitter power, static location, bandwidth requirements, protocol used, priority of service, and/or other quality of service requirements supported. In one embodiment, the system includes propagation models to estimate spectrum utilization by at least one user in at least one user location by at least one CBRS registered device (e.g., all CBRS registered devices).

In one embodiment, the allocation of spectrum is based on propagation models estimation of spectrum utilization. However, as a number of CBRS registered devices increases and a number of private wireless networks grows, the propagation modeling will become more computationally complex and less flexible (e.g., exponential computational growth will make this prohibitive). As the number of services used in the private network and the number of private networks increases, interference will increase between services trying to use the same and/or adjacent frequencies. Thus, there is a need to track interference events affecting a mission critical service provided by a private wireless network.

The present invention is operable to detect and/or track at least one interference events. Information about the at least one interference event is operable to be provided to the SaS to allow for a more effect reallocation of the spectrum among CBRS network users. In one embodiment, one or more of the at least one interference event is parameterized based on at least one intended service requirement. In one embodiment, the present invention uses RF environmental information (e.g., channel spectrum utilization by at least one other signal), not signals associated with the intended service or signals associated with the signal itself (e.g., $S_{c_i}$).

In one embodiment, interference between an intended service's signal and at least one signal affecting the intended service's signal is defined to select a channel in the CBRS band that is optimal for the service intended. In one embodiment, in a similar case to the first example discussed above, the channel is selected to minimize the interference to the intended service by using RF environmental information from the interference signals to predict their spectrum utilization and recommend to the network operator the channel with less interference to the intended service.

In one embodiment, interference event information and/or recommended spectrum preference for the private wireless network are provided to the SaS. In one embodiment, the interference event is reported to the SaS.

FIG. 71A illustrates one embodiment of an interference template including interference metrics, adjacent channel measurements, and geolocation.

FIG. 71B illustrates one embodiment of an interference template including additional evidence of external interference. The interference template preferably includes the interference metrics, the adjacent channel measurements, the geolocation, and the additional evidence of external interference.

Figure 72:
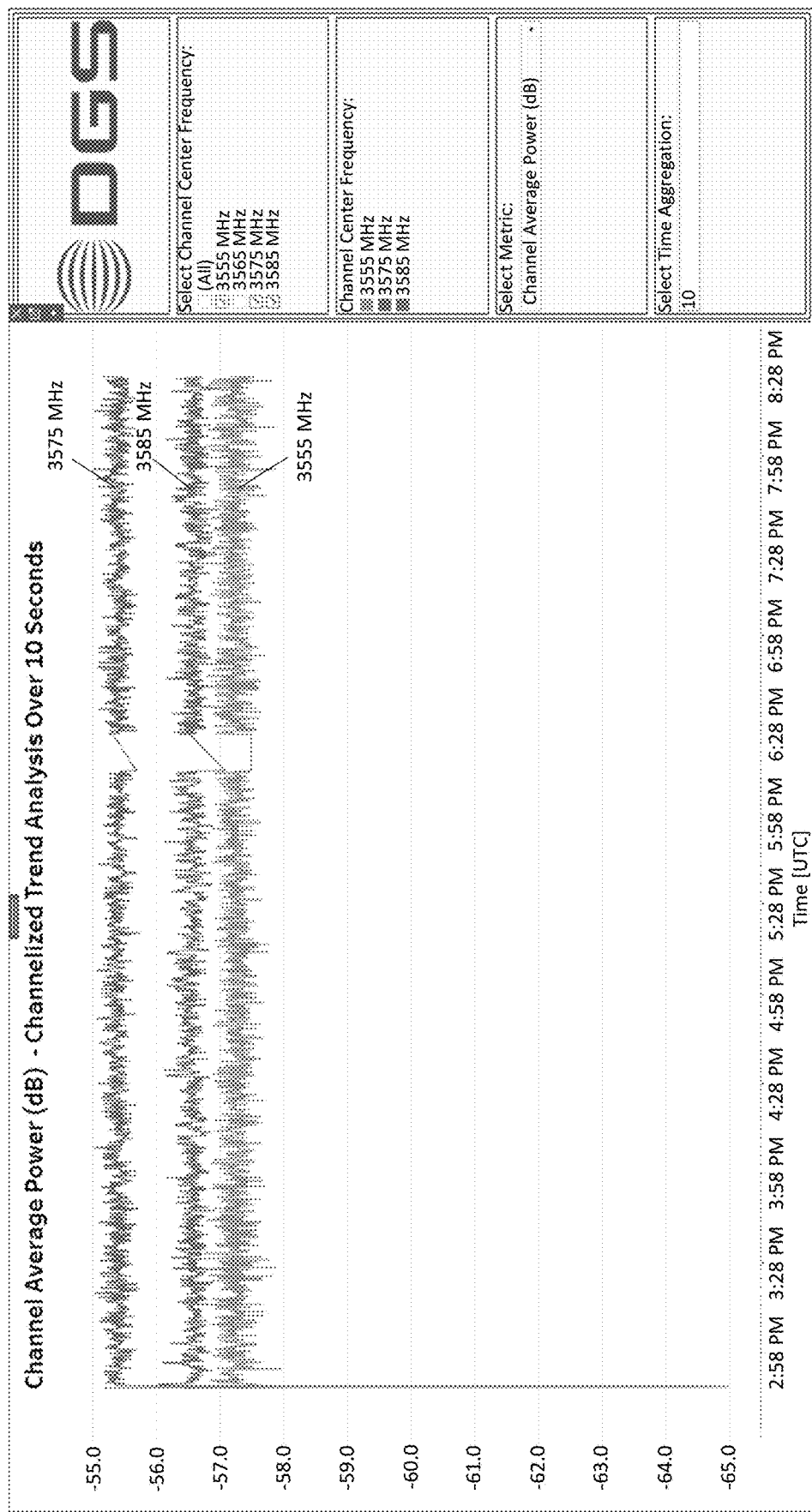
FIG. 72 illustrates one example of a graphical user interface (GUI) for a channel average power.
Figure 73:
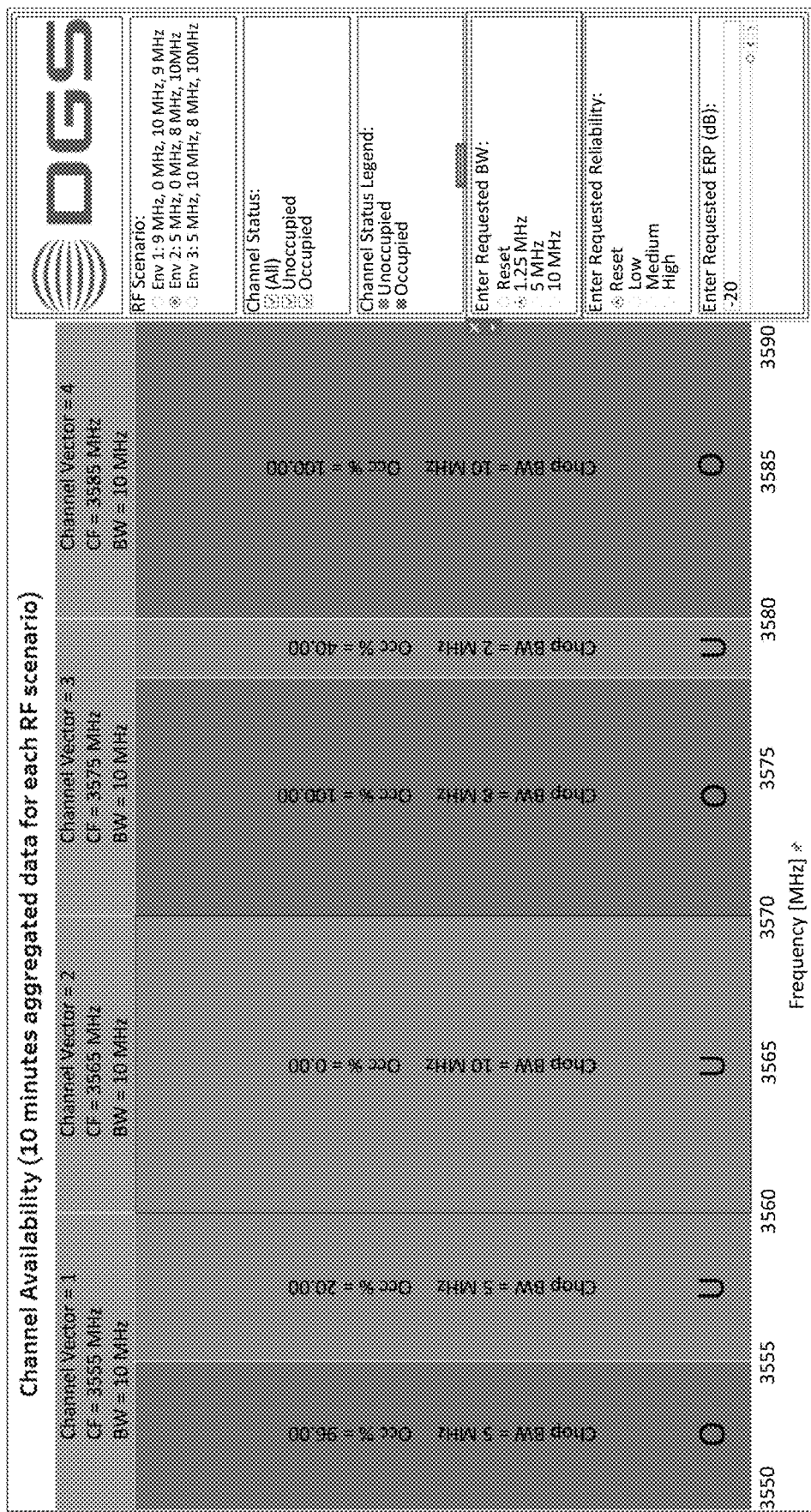
FIG. 73 illustrates one example of a GUI for channel availability.

FIGS. 72-73 represent an example of the quality of the channels, after processing by the analytical engine, associated with the CBRS spectrum. This allows the private wireless network operator the ability to request the best channel for their mission critical applications. The figures represent a GUI for interference detection and minimization as well as a spectrum utilization optimization display for the private wireless operator in the CBRS band.

FIG. 72 illustrates one example of a graphical user interface (GUI) for a channel average power. In the example shown in FIG. 72, channelized trend analysis is shown over a 10 second interval. Other time intervals are compatible with the present invention (e.g., using the time aggregation feature). In one embodiment, the GUI is operable to display a plurality of channel center frequencies and select one or more frequencies from the plurality of channel center frequencies. In one embodiment, the one or more frequencies are displayed using a plurality of colors (e.g., a first frequency is displayed using a first color, a second frequency is displayed using a second color, etc.).

FIG. 73 illustrates one example of a GUI for channel availability. In one embodiment, the GUI provides selection between a plurality of RF scenarios (e.g., a first environment, a second environment, a third environment, etc.). In one embodiment, the GUI provides selection of channel status (e.g., all, unoccupied channels, occupied channels). In one embodiment, the channel status is displayed using a plurality of colors (e.g., a first channel status is displayed using a first color, a second channel status is displayed using a second color). In the example shown in FIG. 73, the occupied channels are displayed in red and the unoccupied channels are displayed in green. In one embodiment, the GUI provides selection of a requested bandwidth and provides an option to reset the requested bandwidth. In one embodiment, the selection is between a set of fixed values. Alternatively, the selection is adjustable (e.g., via manual input). In one embodiment, the GUI provides a selection of requested reliability (e.g., low, medium, high) and provides an option to reset the requested reliability. In one embodiment, a requested Effective Radiated Power (ERP) is selectable (e.g., via manual input).

System Configuration

The system is operable to be implemented through a plurality of configurations of hardware and/or software. For example, and not limitation, the components described in the description and figures herein are operable to be included in a plurality of configurations of hardware and/or software. Examples of system components are found in U.S. Pat. No. 11,395,149, filed Oct. 30, 2020, U.S. Pat. No. 11,638,160, filed Nov. 11, 2022, U.S. Pat. No. 11,653,213, filed Nov. 22, 2022, U.S. Pat. No. 11,665,547, filed Nov. 23, 2022, U.S. Patent Publication No. 2023/0110731, filed Dec. 8, 2022, U.S. Pat. No. 11,700,533, filed Dec. 21, 2022, U.S. Pat. No. 11,711,726, filed Dec. 21, 2022, and U.S. Pat. No. 11,751,064, filed Dec. 21, 2022, each of which is incorporated herein by reference in its entirety.

In one embodiment, the hardware includes, but is not limited to, at least one very-large-scale integration (VLSI) circuit, at least one field programmable gate array (FPGA), at least one system on a chip (SoC), at least one system in a package (SiP), at least one application-specific integrated circuit (ASIC), at least one multi-chip package (MCP), at least one logic circuit, at least one logic chip, at least one programmable logic controller (PLC), at least one programmable logic device (PLD), at least one transistor, at least one switch, at least one filter, at least one amplifier, at least one antenna, at least one transceiver, and/or similar hardware elements. In one embodiment, components of the system are combined in a single chip, a single chipset, multiple chips, multiple chipsets, or provided on a single circuit board (e.g., a plurality of SoCs mounted on the single circuit board). In one embodiment, the hardware is referred to as a circuit or a system of multiple circuits configured to perform at least one function in an electronic device. In one embodiment, the circuit or the system of multiple circuits is operable to execute at least one software and/or at least one firmware program to perform at least one function in the system. The combination of the hardware and the at least one software and/or the at least one firmware program is operable to be referred to as circuitry.

In one embodiment, the software is operable to be executed by at least one processor. In one embodiment, the at least one processor includes, but is not limited to, at least one central processing unit (CPU), at least one graphics processing unit (GPU), at least one data processing unit (DPU), at least one neural processing unit (NPU), at least one crosspoint unit (XPU), at least one application processor, at least one baseband processor, at least one ultra-low voltage processor, at least one embedded processor, at least one reduced instruction set computer (RISC) processor, at least one complex instruction set computer (CISC), at least one advanced RISC machine (ARM) processor, at least one digital signal processor (DSP), at least one field programmable gate array (FPGA), at least one application-specific integrated circuit (ASIC), at least one programmable logic controller (PLC), at least one programmable logic device (PLD), at least one radio-frequency integrated circuit (RFIC), at least one microprocessor, at least one microcontroller, at least one single-core processor, at least one multi-core processor (e.g., a dual-core processor, a triple-core processor, a quad-core processor, etc.), and/or at least one multithreaded processor. In one embodiment, one or more of the at least one processor includes a special-purpose processor and/or a special-purpose controller constructed and configured to execute one or more components in the system. For example, but not limitation, the at least one processor is operable to include an INTEL ARCHITECTURE CORE-based processor, an INTEL microcontroller-based processor, an INTEL PENTIUM processor, an ADVANCED MICRO DEVICES (AMD) ZEN ARCHITECTURE-based processor, a QUALCOMM SNAPDRAGON processor, and/or an ARM processor.

In one embodiment, one or more of the at least one processor includes and/or is in communication with at least one memory (e.g., volatile and/or non-volatile memory). The at least one memory includes, but is not limited to, random-access memory (RAM), dynamic random-access memory (DRAM), static random-access memory (SRAM), synchronous dynamic random-access memory (SDRAM), magnetoresistive random-access memory (MRAM), phase-change memory (PRAM), read-only memory (ROM), erasable programmable read-only memory (EPROM), electrically erasable programmable read-only memory (EEPROM), flash memory, solid-state memory, optical drive, magnetic hard drive, and/or any other suitable type of memory. In one embodiment, the at least one memory includes electronic, magnetic, optical, electromagnetic, infrared, holographic, micromechanical, phase change, resistance change, chemical, and/or semiconductor systems, devices, and/or apparatuses. In one embodiment, the at least one memory includes at least one shared memory. In one embodiment, the at least one memory includes at least one single die package (SDP), at least one dual die package (DDP), at least one quad die package (QDP), and/or at least one octo die package (ODP). In one embodiment, the at least one shared memory is operable to be accessed by a plurality of processing elements. In one embodiment, one or more of the at least one memory is operable to store data and/or processor-executable code. In one embodiment, the data and/or processor-executable code is loaded in response to execution of a function by one or more of the at least one processor. In one embodiment, the at least one processor is operable to read data from and/or write data to the at least one memory.

One or more of the at least one processor is operable to execute computer-executable instructions (e.g., program code, software, firmware, operating system) stored in one or more of the at least one memory. The computer-executable instructions are operable to be written in any computer language and/or combination of computer languages (e.g., Python, Ruby, Java, C++, C, assembly, etc.). The computer-executable instructions are operable to include at least one instruction (e.g., one instruction, a plurality of instructions). The computer-executable instructions are operable to be stored in one or more of the at least one memory. In one embodiment, the computer-executable instructions are distributed between a plurality of the at least one memory. In one embodiment, the computer-executable instructions are organized as at least one object, at least one procedure, and/or at least one function. In one embodiment, one or more of the at least one processor is operable to execute machine learning, artificial intelligence, and/or computer vision algorithms.

In one embodiment, the system includes at least one secure execution environment. In one embodiment, the at least one processor includes a secure-embedded controller, a dedicated SoC, and/or a tamper-resistant chipset or microcontroller. In one embodiment, the at least one secure execution environment further includes at least one tamper-resistant or secure memory. In one embodiment, the at least one secure execution environment includes at least one secure enclave. The at least one secure enclave is operable to access, process, and/or execute data stored within the at least one secure enclave.

In one embodiment, the system further includes at least one power supply (e.g., battery, power bus), at least one power controller, and/or at least one power manager. For example, and not limitation, the at least one power manager is operable to save power and/or provide thermal management. In one embodiment, the at least one power manager is operable to adjust a power supply voltage in real time and/or in near-real time, control production of thermal energy, and/or provide other power management. In one embodiment, the at least one power manager includes a power management integrated circuit (PMIC). In one embodiment, the PMIC provides power via at least one voltage rail to one or more system components (e.g., at least one processor, etc.). In one embodiment, the system includes dynamic clock and voltage scaling (DCVS). For example, and not limitation, the at least one processor is operable to be adjusted dynamically (e.g., in real time, in near-real time) in response to operating conditions.

In one embodiment, the system includes at least one interface operable to exchange information between at least two components or devices. In one embodiment, the at least one interface includes, but is not limited to, at least one bus, at least one input/output (I/O) interface, at least one peripheral component interface, and/or similar interfaces.

In one embodiment, the system includes at least one communication interface operable to provide communications between at least two components or devices. For example, and not limitation, the at least one communication interface is operable to provide communications between the system and a remote device (e.g., an edge device) and/or between a first component of the system (e.g., the RF awareness subsystem) and a second component of the system (e.g., data analysis engine). In one embodiment, the at least one communication interface is any communication circuit or device operable to transmit and/or receive data over a network. The at least one communication interface is operable to transmit and/or receive data via wired or wireless communications. In one embodiment, the at least one communication interface includes WI-FI, WORLDWIDE INTEROPERABILITY FOR MICROWAVE ACCESS (WIMAX), Radio Frequency (RF) communication including RF identification (RFD)), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In one embodiment, the at least one communication interface further includes at least one wire, at least one cable, and/or at least one printed circuit board trace.

The following documents include additional information about chipsets, SoCs, VLSIs, and/or components thereof: U.S. Pat. Nos. 9,170,957; 9,300,320; 9,330,736; 9,354,812; 9,386,521; 9,396,070; 9,400,295; 9,443,810; 9,467,453; 9,489,305; 9,542,333; 9,552,034; 9,552,163; 9,558,117; 9,575,881; 9,588,804; 9,612,615; 9,639,128; 9,640,242; 9,652,026; 9,658,671; 9,690,364; 9,690,710; 9,699,683; 9,703,493; 9,734,013; 9,734,073; 9,734,878; 9,747,038; 9,747,209; 9,748,847; 9,749,962; 9,778,871; 9,785,371; 9,819,357; 9,823,846; 9,846,612; 9,858,637; 9,921,909; 9,928,168; 9,928,924; 9,940,109; 9,959,075; 9,973,431; 9,983,930; 10,019,602; 10,048,316; 10,061,644; 10,090,040; 10,101,756; 10,121,001; 10,140,223; 10,157,008; 10,162,543; 10,169,262; 10,247,617; 10,296,069; 10,310,757; 10,359,803; 10,387,333; 10,454,487; 10,482,943; 10,509,588; 10,558,369; 10,579,516; 10,586,038; 10,591,965; 10,591,975; 10,628,308; 10,707,753; 10,713,189; 10,725,932; 10,769,073; 10,783,252; 10,817,224; 10,878,880; 11,115,176; 11,139,830; 11,249,134; 11,360,897; 11,416,049; 11,452,001; 11,463,141; 11,489,608; 11,490,457; 11,493,970; 11,493,980; 11,493,986; and 11,494,248 and U.S. Patent Publication Nos. 20150138714, 20160105549, 20160269185, 20160270134, 20160338137, 20170078890, 20170079012, 20170127411, 20170164220, 20170181134, 20170187886, 20180007627, 20180020365, 20180020462, 20180059863, 20180063820, 20180063869, 20180069651, 20180069664, 20180070219, 20180083684, 20180098370, 20180109346, 20180124685, 20180146487, 20180146494, 20180152819, 20180152950, 20180159668, 20180159935, 20180205438, 20180206108, 20180206260, 20180206269, 20180212733, 20180213425, 20180213498, 20180219605, 20180219662, 20180220386, 20180220399, 20180227958, 20180241458, 20180242224, 20180254805, 20180254851, 20180254853, 20180255576, 20180263013, 20180269945, 20180270860, 20180279408, 20180288715, 20180294924, 20180302868, 20180302900, 20180309928, 20180316409, 20180316453, 20180324826, 20180338281, 20180352564, 20180376474, 20180376531, 20190007812, 20190013901, 20190013908, 20190020451, 20190021026, 20190021053, 20190021105, 20190036552, 20190037429, 20190041223, 20190043968, 20190044066, 20190044794, 20190045390, 20190045581, 20190052317, 20190068352, 20190074887, 20190081679, 20190086955, 20190132089, 20190132860, 20190141679, 20190149379, 20190149434, 20190150017, 20190150155, 20190150157, 20190158331, 20190174423, 20190182696, 20190208507, 20190215907, 20190230550, 20190239093, 20190239212, 20190239245, 20190239286, 20190246377, 20190257916, 20190261361, 20190261453, 20190261454, 20190268061, 20190268128, 20190268935, 20190268970, 20190273569, 20190288811, 20190289668, 20190296790, 20190296877, 20190297662, 20190306737, 20190319699, 20190319868, 20190326959, 20190327024, 20190327117, 20190327621, 20190334611, 20190349272, 20190356463, 20190364456, 20190364556, 20190373667, 20190379492, 20190387401, 20190387424, 20190387577, 20190394719, 20190394741, 20200008088, 20200014483, 20200015128, 20200022218, 20200029392, 20200045618, 20200077414, 20200092876, 20200092946, 20200112943, 20200119893, 20200128579, 20200136777, 20200163156, 20200178288, 20200196186, 20200236572, 20200260526, 20200260527, 20200274666, 20200280466, 20200281021, 20200296155, 20200382190, 20200389836, 20200389917, 20210007023, 20210014656, 20210058206, 20210058748, 20210058785, 20210058946, 20210076389, 20210076397, 20210099976, 20210112528, 20210135803, 20210144517, 20210144624, 20210168577, 20210176762, 20210176769, 20210219166, 20210258811, 20210266915, 20210297204, 20210307051, 20210314954, 20210328739, 20210345163, 20210345395, 20210352655, 20210360563, 20210378041, 20210385865, 20210392673, 20210392714, 20210400584, 20210409335, 20220014286, 20220022019, 20220022167, 20220030475, 20220038164, 20220039032, 20220060905, 20220108092, 20220110018, 20220116334, 20220123849, 20220124043, 20220286972, 20220287083, 20220300418, 20220317901, 20220318343, 20220332350, 20220343241, 20220345863, and 20220353732, each of which is incorporated herein by reference in its entirety.

Figure 74:
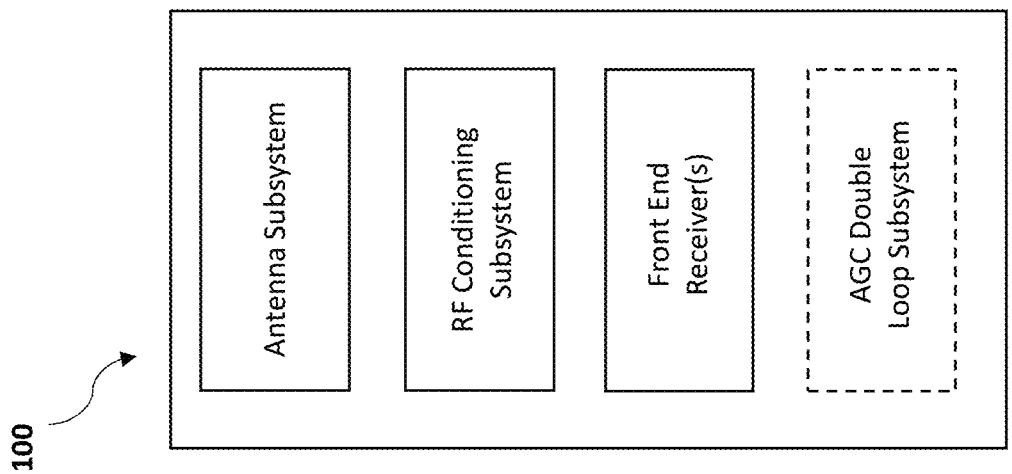
FIG. 74 illustrates one embodiment of a system including an antenna subsystem, an RF conditioning subsystem, and at least one front end receiver.

FIG. 74 illustrates one embodiment of a system 7100 including an antenna subsystem, an RF conditioning subsystem, and at least one front end receiver. In one embodiment, the system 7100 further includes an AGC double loop subsystem. In one embodiment, the system 7100 further includes at least one power supply, at least one power controller, and/or at least one power manager. In one embodiment, the system 7100 further includes at least one processor and/or at least one memory. As previously described, the system 7100 is operable to be configured using hardware and/or software. For example, and not limitation, the system 7100 is operable to be combined in a single chip, a single chipset, multiple chips, multiple chipsets, or provided on a single circuit board. In one embodiment, the single chip, the single chipset, the multiple chips, the multiple chipsets, or the single circuit board includes additional hardware (e.g., at least one very-large-scale integration (VLSI) circuit, at least one field programmable gate array (FPGA)).

Figure 75:
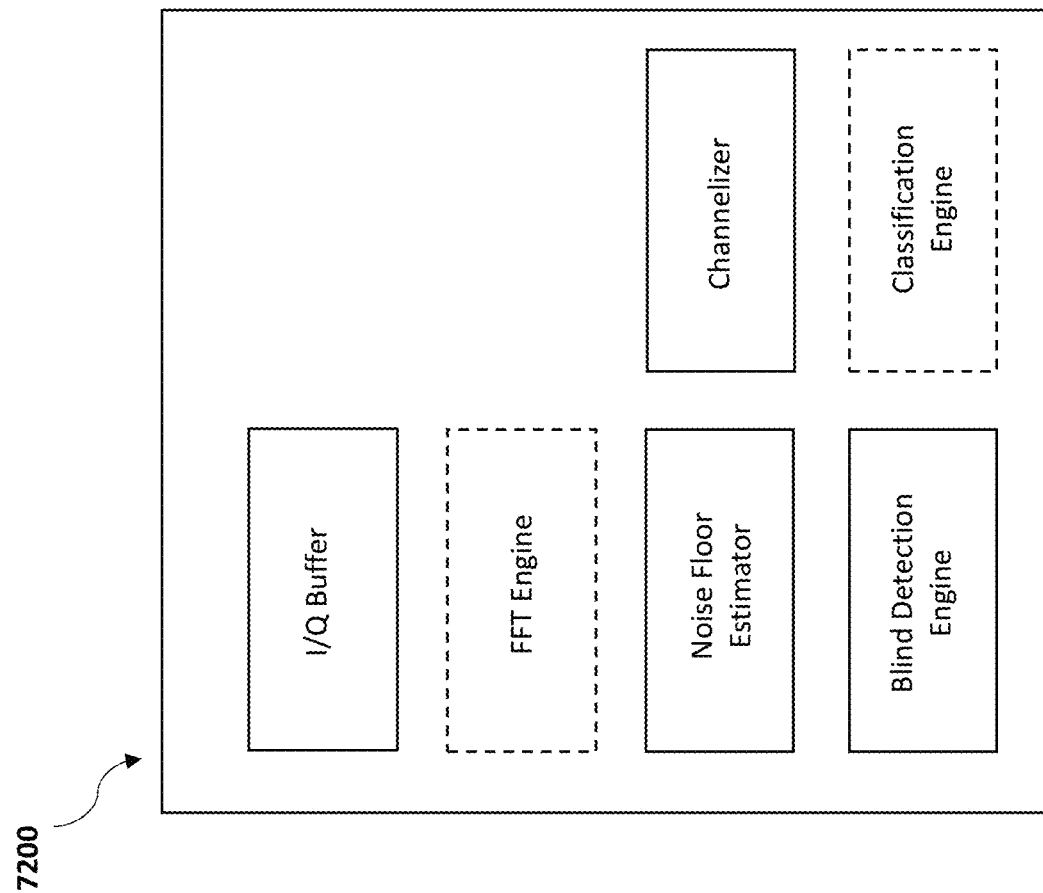
FIG. 75 illustrates one embodiment of a system including a channelizer (e.g., a frequency domain programmable channelizer), a blind detection engine, a noise floor estimator, and an I/Q buffer.
Figure 77:
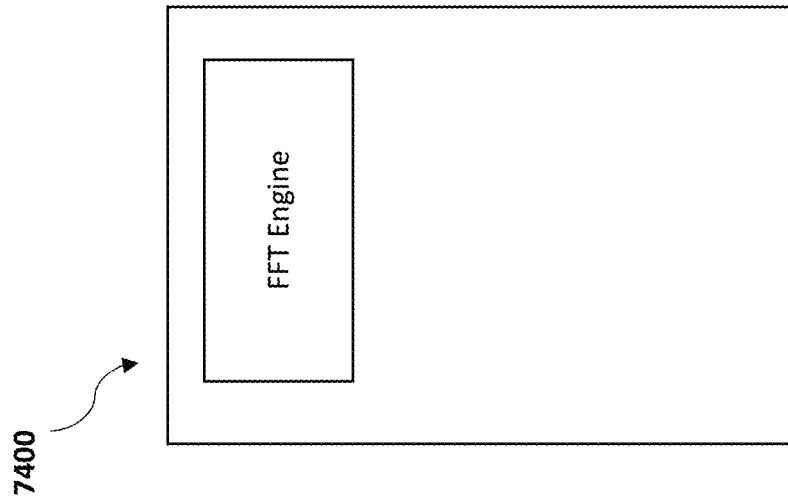
FIG. 77 illustrates one embodiment of a system including an FFT engine.

FIG. 75 illustrates one embodiment of a system 7200 including a channelizer (e.g., a frequency domain programmable channelizer), a blind detection engine, a noise floor estimator, and an I/Q buffer. In one embodiment, the system 7200 further includes an FFT engine and/or a classification engine. In another embodiment, the FFT engine is included as a separate system (FIG. 77). In one embodiment, the system 7200 further includes at least one power supply, at least one power controller, and/or at least one power manager. In one embodiment, the system 7200 further includes at least one processor and/or at least one memory. As previously described, the system 7200 is operable to be configured using hardware and/or software. For example, and not limitation, the system 7200 is operable to be combined in a single chip, a single chipset, multiple chips, multiple chipsets, or provided on a single circuit board. In one embodiment, the single chip, the single chipset, the multiple chips, the multiple chipsets, or the single circuit board includes additional hardware (e.g., at least one very-large-scale integration (VLSI) circuit, at least one field programmable gate array (FPGA)).

Figure 76:
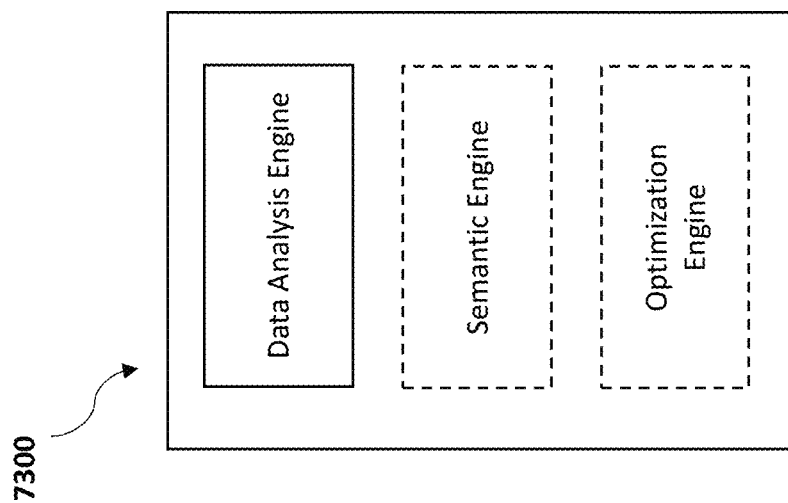
FIG. 76 illustrates one embodiment of a system including at least one data analysis engine.

FIG. 76 illustrates one embodiment of a system 7300 including at least one data analysis engine. In one embodiment, the system 7300 includes a semantic engine and an optimization engine. In one embodiment, the system further includes at least one power supply, at least one power controller, and/or at least one power manager. In one embodiment, the system 7300 is operable to provide actionable data about the electromagnetic environment (e.g., RF environment). In one embodiment, the system 7300 further includes at least one processor and/or at least one memory. As previously described, the system 7300 is operable to be configured using hardware and/or software. For example, and not limitation, the system 7300 is operable to be combined in a single chip, a single chipset, multiple chips, multiple chipsets, or provided on a single circuit board. In one embodiment, the single chip, the single chipset, the multiple chips, the multiple chipsets, or the single circuit board includes additional hardware (e.g., at least one very-large-scale integration (VLSI) circuit, at least one field programmable gate array (FPGA)).

FIG. 77 illustrates one embodiment of a system 7400 including an FFT engine. As previously described, the system 7400 is operable to be configured using hardware and/or software. For example, and not limitation, the system 7400 is operable to be combined in a single chip, a single chipset, multiple chips, multiple chipsets, or provided on a single circuit board. In one embodiment, the single chip, the single chipset, the multiple chips, the multiple chipsets, or the single circuit board includes additional hardware (e.g., at least one very-large-scale integration (VLSI) circuit, at least one field programmable gate array (FPGA)).

Figure 78:
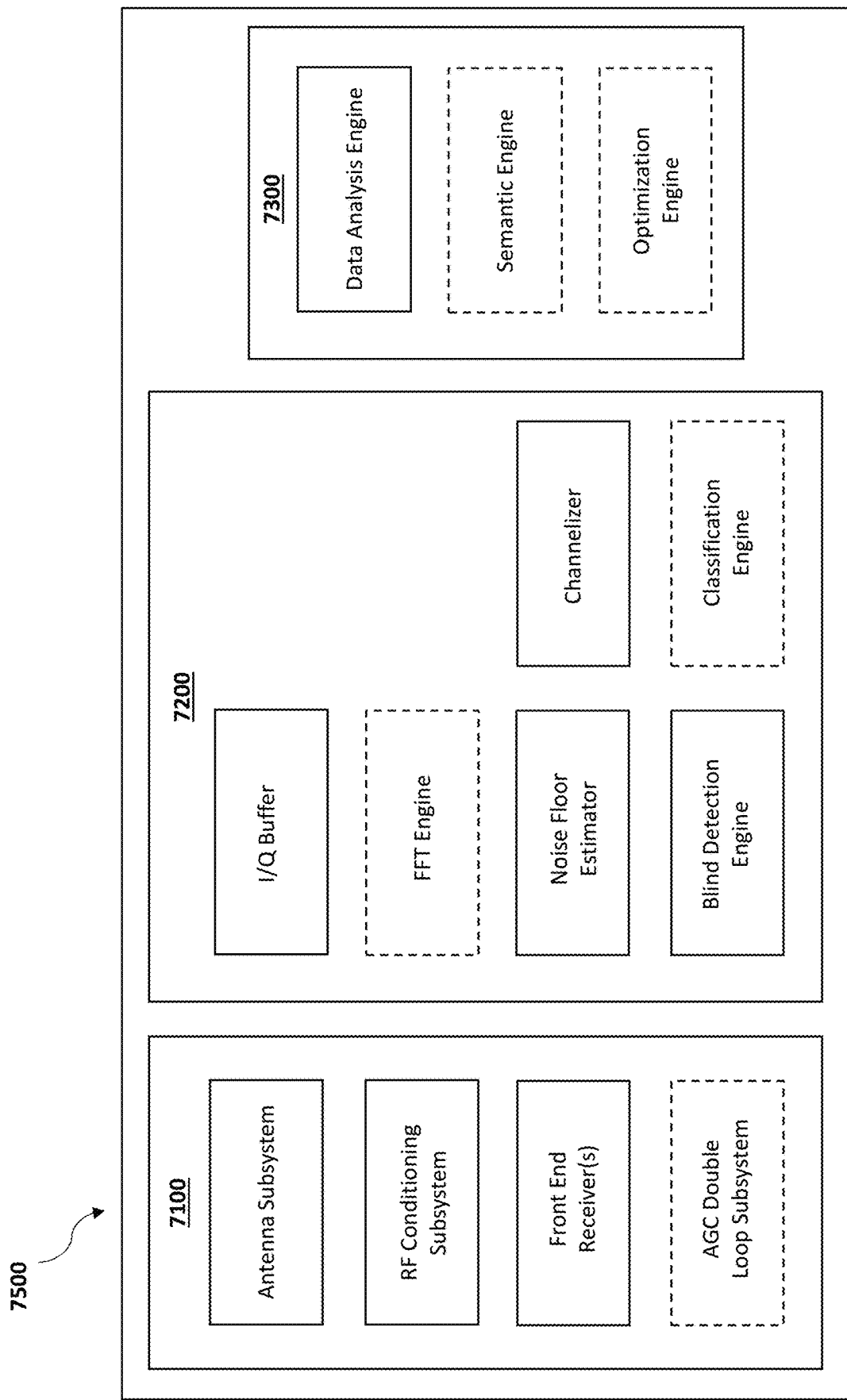
FIG. 78 illustrates one embodiment of a system including the systems from FIGS. 74-76.

FIG. 78 illustrates one embodiment of a system 7500 including the systems from FIGS. 74-76. In one embodiment, the system 7500 further includes at least one power supply, at least one power controller, and/or at least one power manager. In one embodiment, the system 7500 further includes at least one processor and/or at least one memory. As previously described, the system 7500 is operable to be configured using hardware and/or software. For example, and not limitation, the system 7500 is operable to be combined in a single chip, a single chipset, multiple chips, multiple chipsets, or provided on a single circuit board. In one embodiment, the single chip, the single chipset, the multiple chips, the multiple chipsets, or the single circuit board includes additional hardware (e.g., at least one very-large-scale integration (VLSI) circuit, at least one field programmable gate array (FPGA)).

Figure 79:
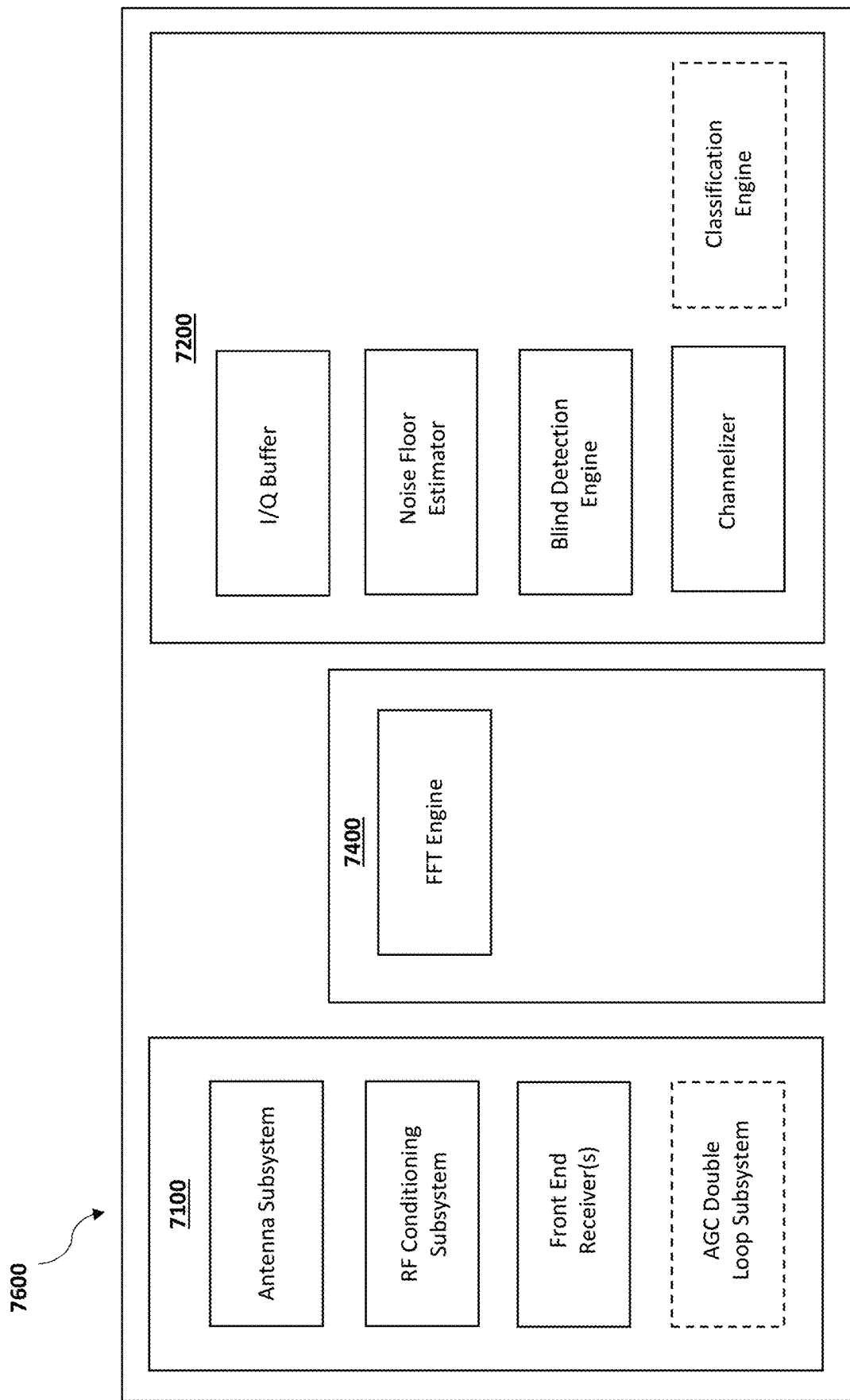
FIG. 79 illustrates one embodiment of a system including the systems from FIGS. 74-75 and 77.

FIG. 79 illustrates one embodiment of a system 7600 including the systems from FIGS. 74-75 and 77. In one embodiment, the system 7600 further includes at least one power supply, at least one power controller, and/or at least one power manager. In one embodiment, the system 7600 further includes at least one processor and/or at least one memory. As previously described, the system 7600 is operable to be configured using hardware and/or software. For example, and not limitation, the system 7600 is operable to be combined in a single chip, a single chipset, multiple chips, multiple chipsets, or provided on a single circuit board. In one embodiment, the single chip, the single chipset, the multiple chips, the multiple chipsets, or the single circuit board includes additional hardware (e.g., at least one very-large-scale integration (VLSI) circuit, at least one field programmable gate array (FPGA)).

In one example, provided for example and not limitation, the present invention includes the system 7100 in a system on a chip (SoC) and the system 7200 in a custom VLSI and/or FPGA chipset.

Alternative combinations are compatible with the present invention.

The present invention advantageously provides for providing multiple applications and data analysis capabilities that traditionally have been provided on multiple network devices or devices remote from a local electronic device including a processor and a memory connected to an electromagnetic network, such as an RF network, on a single chip, a single chipset, multiple chips, multiple chipsets, or on a single circuit board on the local electronic device. This provides for acceleration of the RF awareness at the physical layer into the RAN. Essentially, every communications device having such a single chip, a single chipset, multiple chips, multiple chipsets, or on a single circuit board transforms every device comprising them into a sensor for the RF spectrum, i.e., every device with such a single chip, a single chipset, multiple chips, multiple chipsets, or on a single circuit board and RF awareness functions operable thereon provides RF data for real-time, dynamic spectrum measurement and monitoring for shared spectrum management and dynamic spectrum sharing to optimize utilization based on the distributed sensors and the single chip, a single chipset, multiple chips, multiple chipsets, or on a single circuit board having RF awareness via software operable thereon. RF awareness functions include, but are not limited to, any function or method used to analyze or process RF data, such as FFT, Noise Floor Extension (NFE), blind detection, blind classification, and a priori detection. Providing this functionality for communications devices advantageously provides for point-to-point communication about the RF environment, especially for congested and contested environments, e.g., in dynamic spectrum sharing environments. The RF awareness functions are embedded in the RAN for providing actionable data, geolocation, INQ, time, spatial, frequency in space to create environmental awareness based on the data provided by the at least one sensor and RF awareness captured and processed on the single chip, single chipset, multiple chips, multiple chipsets, or single circuit board; and the MEC provides for optimization parameters. The systems and methods of the present invention provide for approximately 40% less computation (about 60% faster) related to real time dynamic RF spectrum environment awareness processing by the software embedded in the single chip, single chipset, multiple chips, multiple chipsets, or on the single circuit board, and the data is passed directly to the MEC. The systems and methods of the present invention also provide for uplink from distributed handheld communications devices or other communications equipment to the base station, and from the base station back to the distributed handheld communications devices having the single chip, a single chipset, multiple chips, multiple chipsets, or on a single circuit board with RF awareness functionality included therein.

The present invention with the RF awareness via extraction of physical layer (layer 1) data via the software operable on a single chip, a single chipset, multiple chips, multiple chipsets, or on a single circuit board improves performance for modulation and/or demodulation, and beam forming for better RF awareness in real time for spectrum management, interference detection, and with low latency and high reliability, thereby enhancing 5-layer performance with equalizers, demodulators, and beam formation by reducing computation and/or improving the performance of these components or functions. Specifically, the present invention provides improved performance of receiver beamforming, as well as improved performance of demodulation functions, including improved performance of equalizers, improved interference detection and mitigation, and symbol demodulations. This results in low latency and high reliability for a variety of services.

The single chip, single chipset, multiple chips, multiple chipsets, or on a single circuit board including software operable for RF sensing provides for a duty cycle, a sample rate, etc. with computations per stream, calculated assuming 4 or 8 streams. Surprising results showed that FFT using 4 streams and 1 second per stream is accelerated at the physical layer (layer 1) and reduced calculations provide for up to 1000 times more sampling in real time. This is due to the relatively small computations required for the present invention.

Figure 80:
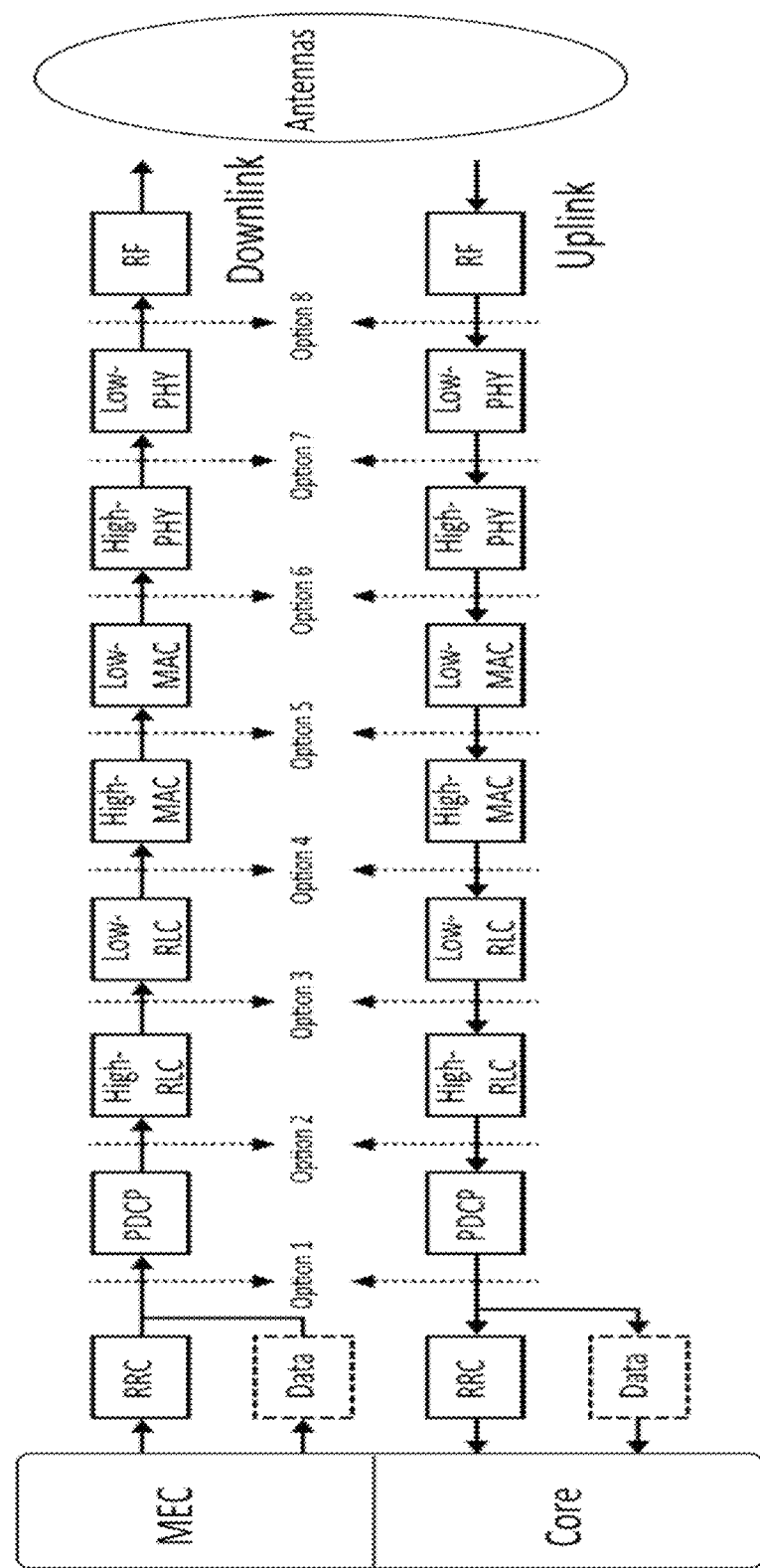
FIG. 80 shows typical functions in a RAN.

FIG. 80 shows typical functions in a RAN, including all the options proposed in 3GPP release 15 for decomposing the RAN's functions:

Option 1 (RRC/PCDP 1A like split, RRC in CU while PDCP, RLC, MAC, Phy, in DU and RF in RU).

Option 2 (PDCP/RLC spilt User plane only (like option 3) RRC, PDCP are in CU. RLC, MAC, and Phy in DU).

Option 3 (High RLC/Low RLC split two sub approaches based on real time need vs non-real time, segmentation or ARQ).

Option 4 (RLC-MAC split, RRC, PDCP and RLC in the CU and MAC, PHY in DU).

Option 5 (Intra MAC split, Phy and Lower MAC in DU while High layer MAC RLC and PDCP in CU).

Option 6 (Mac-Phy Split, RRC, PDCP, RLC and MAC in CU, Phy in DU, RF configuration data pass to CU).

Option 7 (Intra Phy split with three distinct possible implementations including Option 7, Option 7a, and Option 7x).

Option 8 (Phy RF split RF in RU, Phy in DU and all other functions in the CU).

Figure 81:
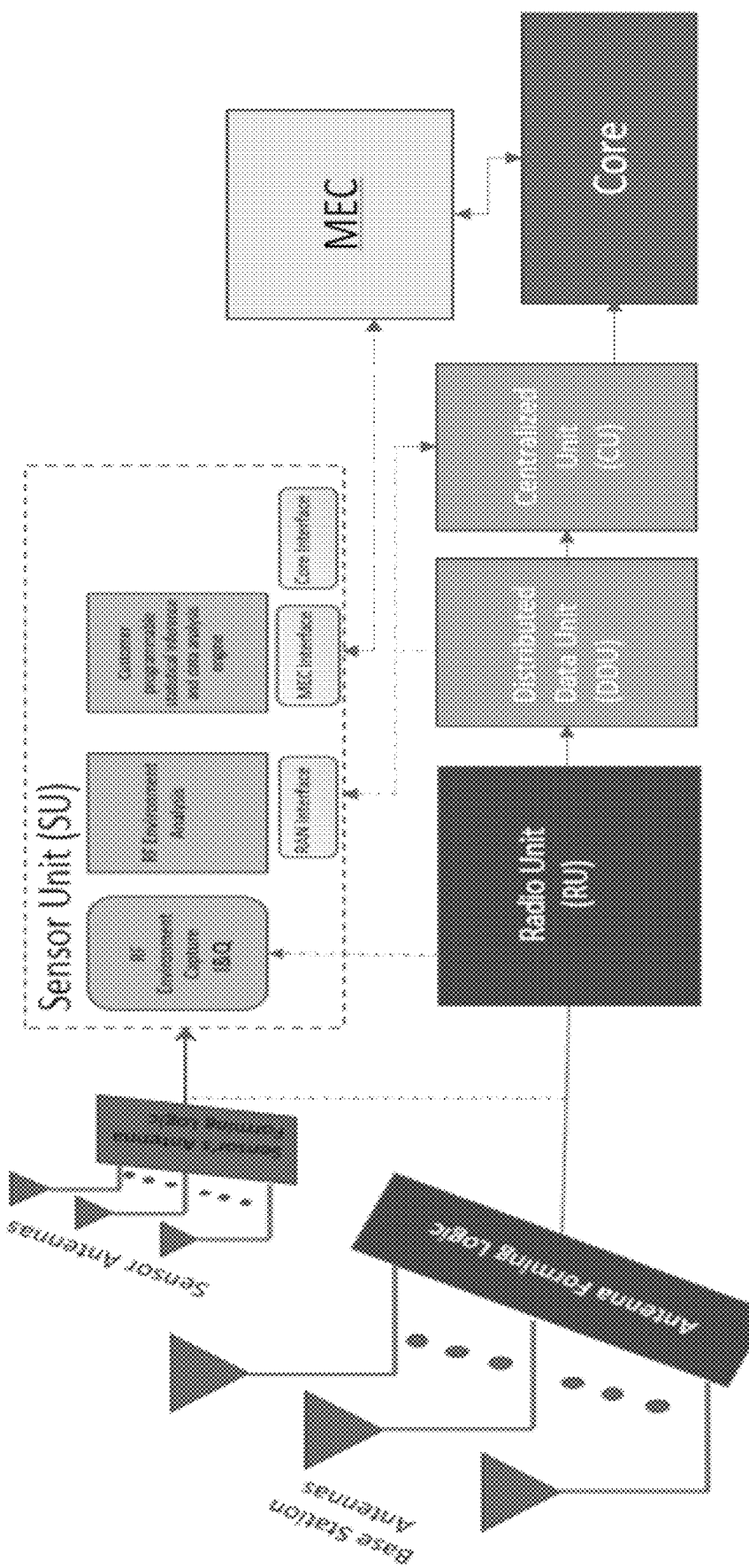
FIG. 81 illustrates a block diagram of a sensor unit and its communications with other components in a system of the present invention.

Regarding FIG. 81, the sensor unit has three (3) major subfunctions: RF capture (I&Q), RF environment analysis (channelizer, detection, classification, identification, geolocation, and associated ML algorithm to get RF awareness), and customer programmable and data analysis (customer actionable data). The present invention provides for several options for interfaces with the RAN, including all RF capture being split between RU and DU (depending on the split option used); RF environment analysis being split between DU and CU (depending on the split, and some basic data analysis (only for channel interference) will be in the CU); noting that most of the customer inputs for programmable and data analysis functions are operable in the MEC and core.

Figure 82A:
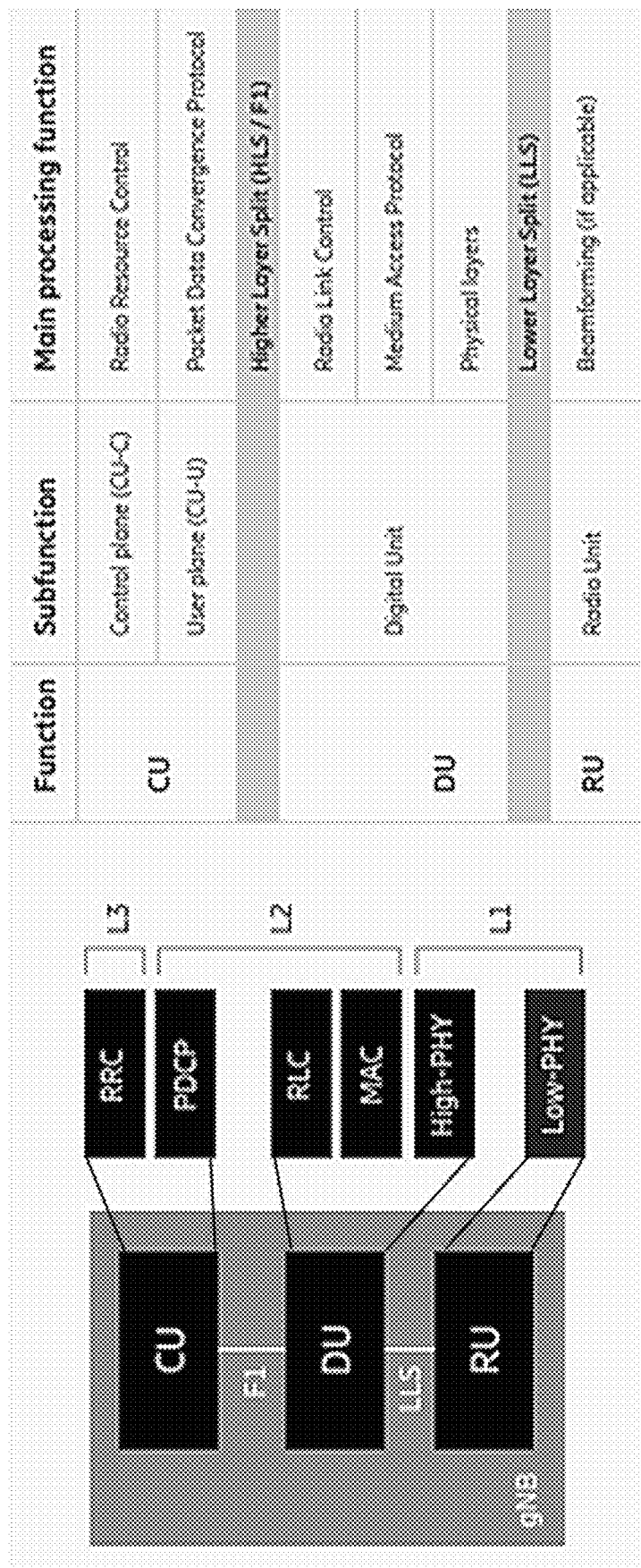
FIG. 82A illustrates the ORAN functions partition according to an embodiment of the present invention.

FIG. 82A illustrates the ORAN functions partition according to an embodiment of the present invention. There is a concentration of how to implement RF awareness functionality, including but not limited to data capture, analysis, actionable data, and process optimization with the Layer 1/Layer 2/Layer 3 (L1/L2/L3) and Core/MEC function partitions in the new 5G architecture. The present invention provides for L1 and L2 functions migrating from external software to software embedded in the single chip, single chipset, multiple chips, multiple chipsets, or on the single circuit board providing for new physical layer (L1) interactions including data capture, I&Q conditioning (including FFT, NFE, channelization, enveloped processing classification), BB demodulation public protocol synchronization, channel extraction and correlation to classification observables, identification observables, geolocation observables, and data link layer (L2) aggregation of multiple L1 data from several RU per DU. Network layer (L3) functions remain mostly implemented in external software in the present invention. The systems and methods also provide for aggregation of multiple DU's for L2 data to the CU for providing actionable data extracted according to service from aggregated RF awareness data. The Core and MEC include software applications providing for network resource optimization according to service and policies that are predetermined or based on customer-derived inputs.

Figure 82B:
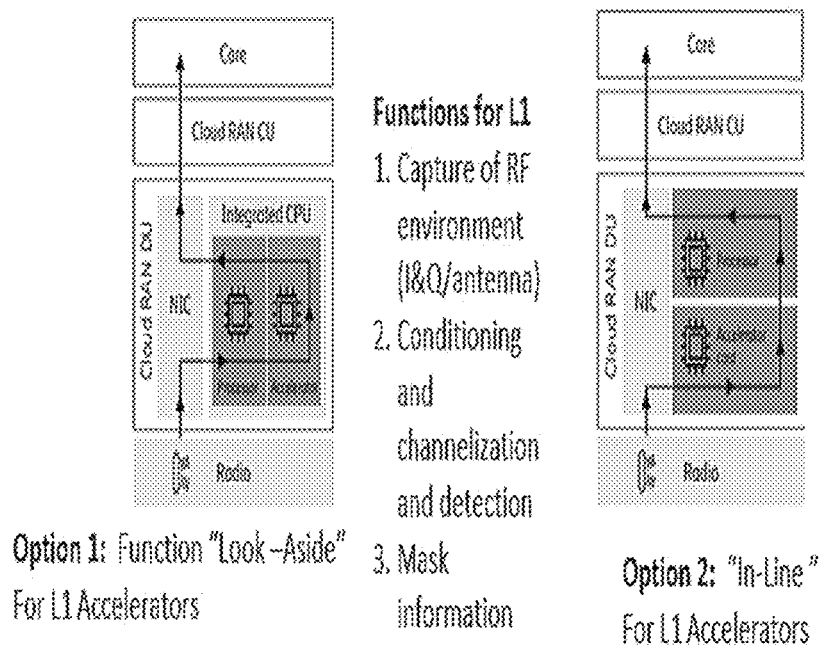
FIG. 82B illustrates two options for RF sensor functions that are implemented in the software embedded in the single chip, single chipset, multiple chips, multiple chipsets, or on the single circuit board of the present invention.

FIG. 82B illustrates two options for RF sensor functions that are implemented in the software embedded in the single chip, single chipset, multiple chips, multiple chipsets, or on the single circuit board including front end analysis features comprising I&Q conditioning and rendering for time, spatial, frequency, and signal space via FFT, NFE, channelization (blind and a priori), a priori detection, utilization mask (occupancy over time), anomaly detection and flagging, moments-blind classification, and partial beam forming. Implementations suitable for both approaches (Option 1: Look Aside; and Option 2: In-Line) provide for acceleration of L1 RAN functions. Option 1: Look Aside provide for easy implementation to follow data flow from the CPU to accelerator functions where RF awareness functions are considered one of at least one accelerator functions and use the same data flow. It advantageously allows for all devices to perform basic sensing analysis functions in the same architecture, integration of data from L1 upper to L2 for higher RF sensing functions classification, identification, geolocation, anomaly detection, and prediction of supportable service, and provides for aggregation of multiple RU/DU units. Option 2: In-Line provides an alternative wherein the frontend analysis features are incorporated into the conventional L1-Physical layer functions by sharing intermediate computation, for example for each RU, while in the accelerator the antenna and resource including demapping, mimo BF is being performed, the ADC I&Q samples are tagged with the antenna, and conducting a partial beam forming computation. While the filtering and FFT is being done in preparation for data demodulation, there is computing of the average FFT, the NFE, and conducting channelization of the I&Q samples. While demodulation is being performed, anomaly detection and classification of channels is being computed and determined. The partial results of the above computation are then passed along with the PUSCH, PDSCH, and PARCH channel data to help provide RF environmental information to the MAC layer implemented in the DUs. There is a partial results data flow as part of transport block information.

Computation complexity generally varies by sensors subfunction and estimated multiple/add/accumulator core required in a GPU/CPU/FPA type of cores.

Figure 83A:
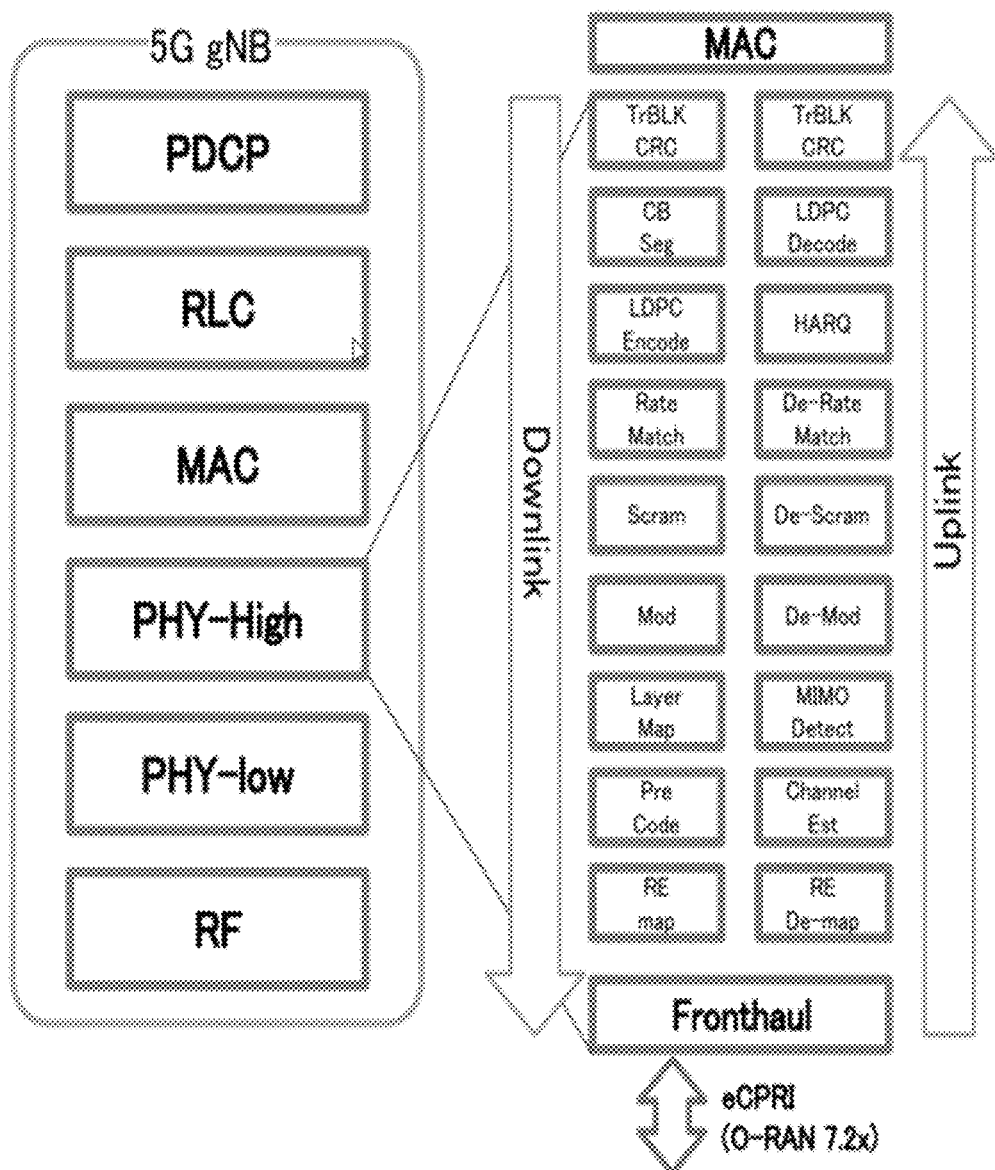
FIG. 83A illustrates the downlink and uplink from fronthaul to MAC associated with the L1 physical layer.

FIG. 83A illustrates the downlink and uplink from fronthaul to MAC associated with the L1 physical layer according to one embodiment of the present invention.

Figure 83B:
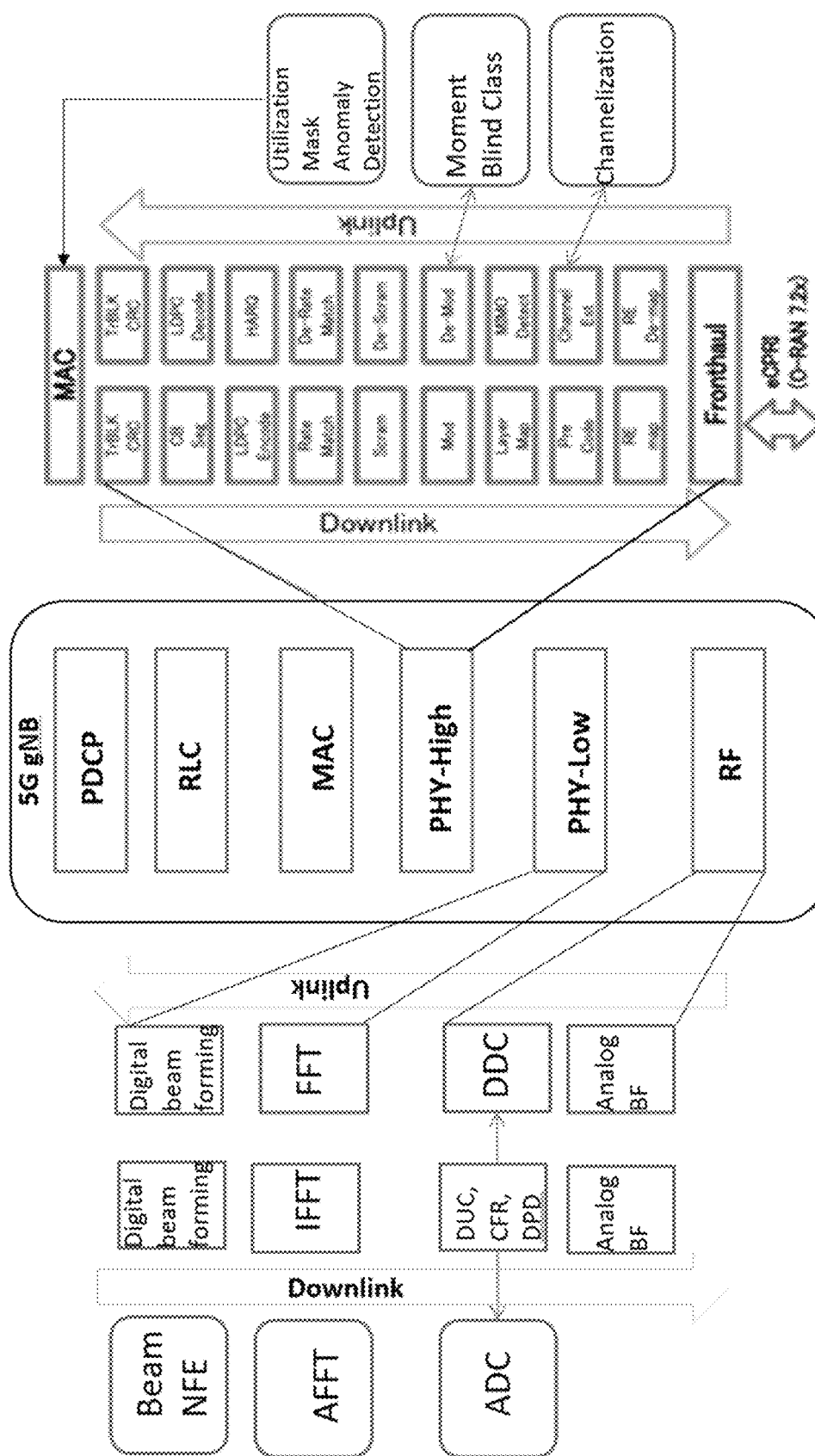
FIG. 83B illustrates the functionality of the present invention integrated into the physical layers.

FIG. 83B illustrates the functionality of the present invention integrated into the physical layers.

Figure 84A:
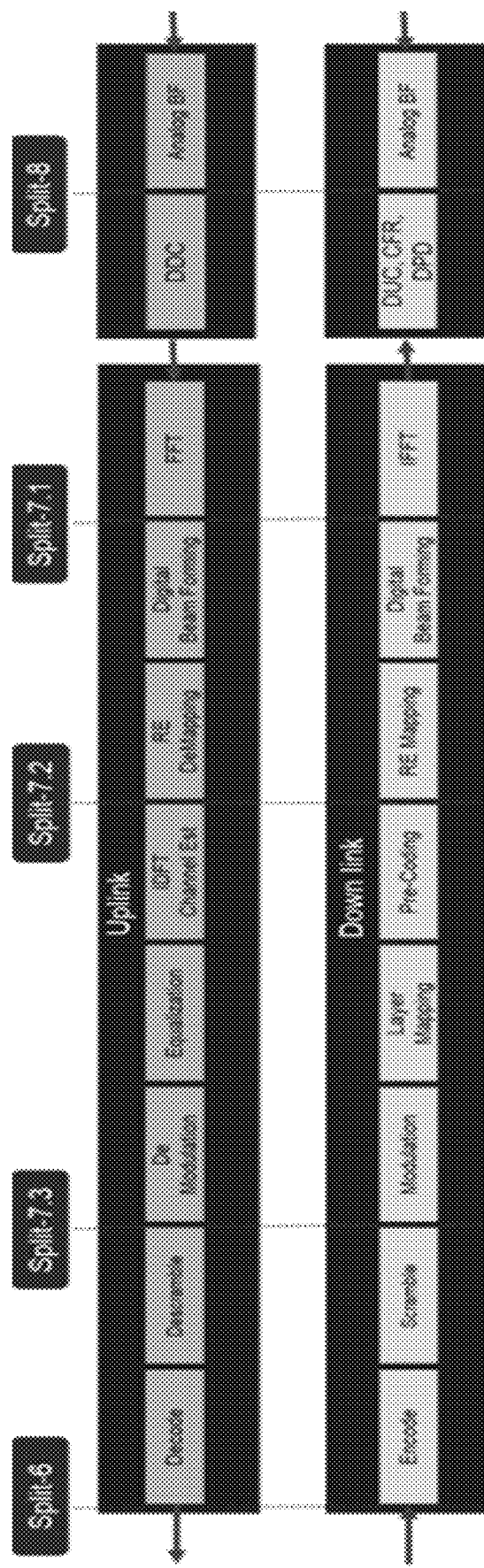
FIG. 84A illustrates different options for lower layer split architectures.

FIG. 84A illustrates different options for lower layer split architectures. Different split architectures determine gNodeB architecture. Functional partitions are shown between RU and DU. The split between RU and DU affects timing and latency.

Figure 84B:
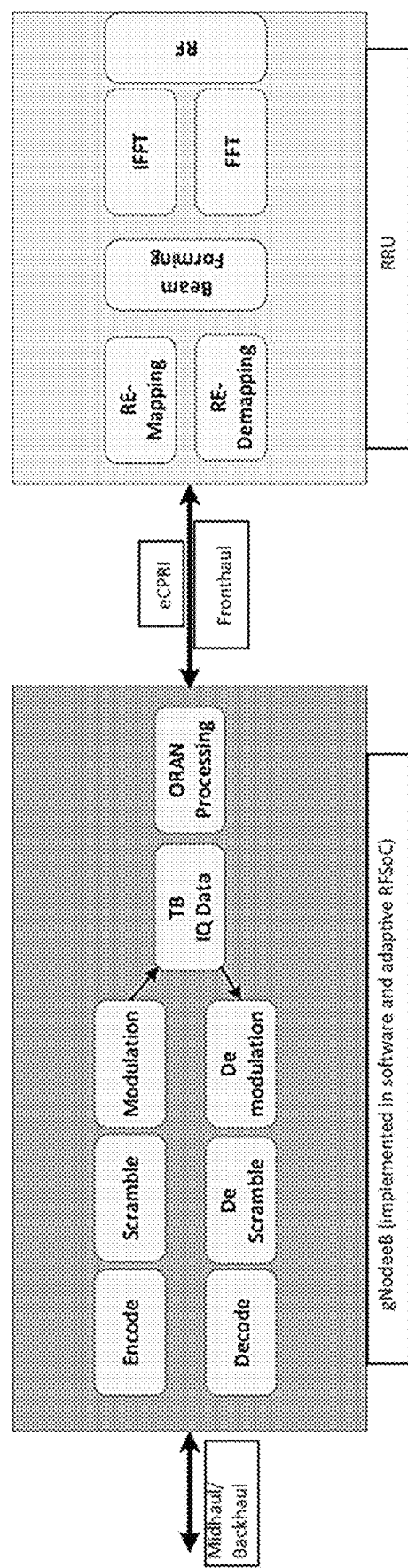
FIG. 84B illustrates a schematic of one embodiment of a 5G option 7-2 split implemented via software of the present invention.

FIG. 84B illustrates a schematic of one embodiment of a 5G option 7-2 split implemented via software of the present invention. This option includes implementing functionality such as precoding, FFT/IFFT, and resource element (RE) mapping/de-mapping on a node between RU and DU or on RU. These functions are low-PHY functions. High-PHY functions are performed on DU. High-PHY functions include modulation, demodulation, scrambling, and encode/decode.

The present invention provides supports multiple services and associated protocols, and provides data to support understanding of how the RF environment is used to optimize its utilization by multiple, disparate services concurrently. It is operable for time, frequency, space, signals and service goals for multiple services, including frequencies used by services and adjacent bands, multiple protocols, signal characteristics and interactions, and utilization statistics in real time based on the data provided from the sensors, and software embedded in the single chip, single chipset, multiple chips, multiple chipsets, or on the single circuit board. The RF environment and impact on 5G services and other services is based on goals and utilization policies that are automatically implemented for signals in the environment and their characteristics, including interference and coexistence information and validation of utilization policies, including error sources consideration. The optimization of network resources supports coexistence to share the RF environment for multiple services based on the service goals and coexistence policies, thus providing for dynamic spectrum sharing (DSSMS) based on the service needs and policies implemented in an autonomous, scalable basis in real time.

The system of the present invention is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The system is operable to use any of the aforementioned learning techniques alone or in combination.

Further, the system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The system is preferably operable to recommend and/or perform actions based on historical data, external data sources, ML, AI, NNs, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Additionally, the system is operable to employ control theory concepts and methods. This enables the system to determine if every data set processed and/or analyzed by the system represents a sufficient statistical data set.

Location data is created in the present invention using one or more hardware and/or software components. By way of example and not limitation, location data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

Figure 70:
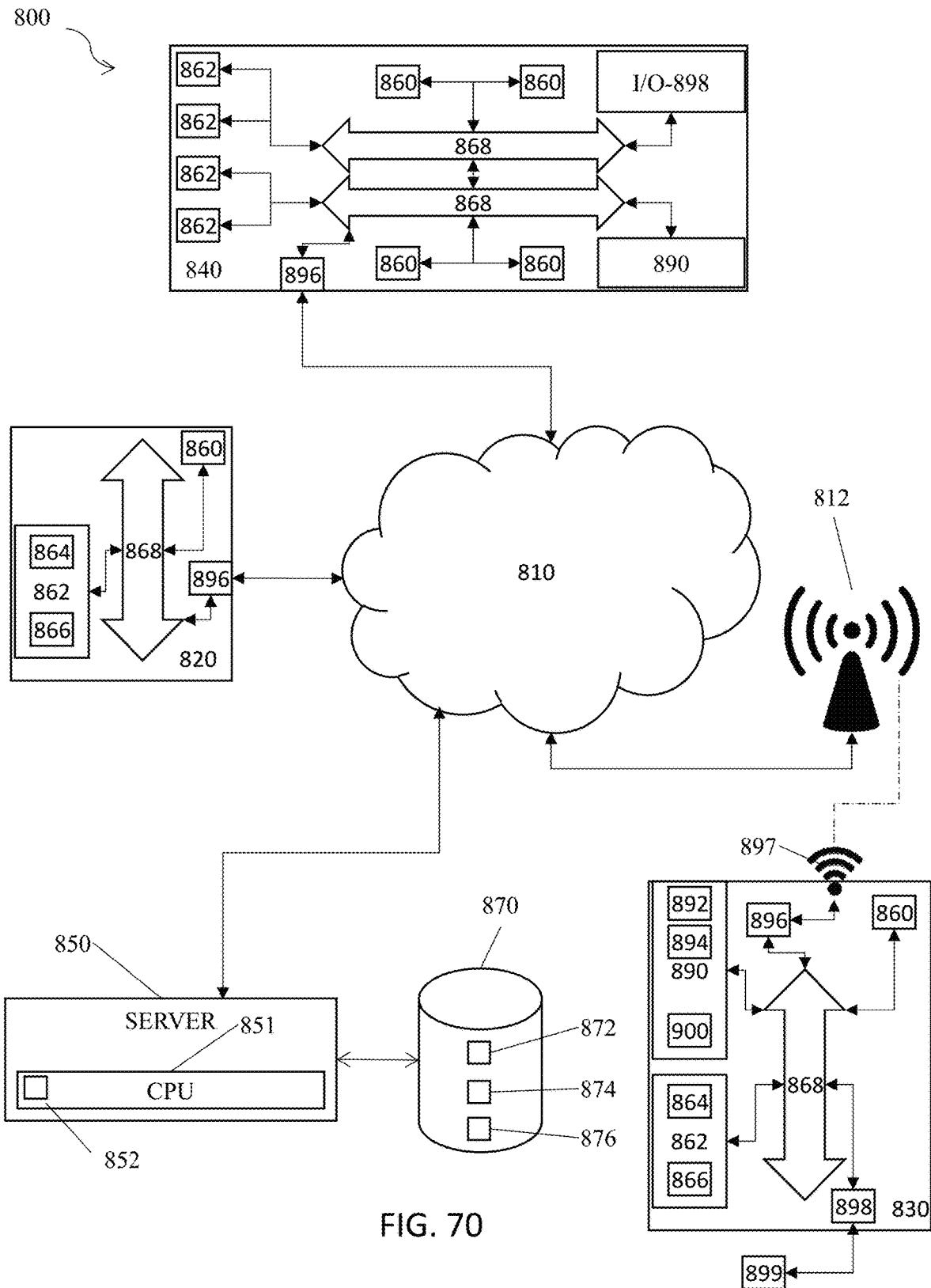
FIG. 70 is a schematic diagram of a system of the present invention.

FIG. 70 is a schematic diagram of an embodiment of the invention illustrating a computer system, generally described as 800, having a network 810, a plurality of computing devices 820, 830, 840, a server 850, and a database 870.

The at least one server 850 is constructed, configured, and coupled to enable communication over a network 810 with a plurality of computing devices 820, 830, 840. The at least one server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFD)), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 70, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG.

70, is operable to include other components that are not explicitly shown in FIG. 70, or is operable to utilize an architecture completely different than that shown in FIG. 70. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for spectrum utilization management in an electromagnetic environment comprising:
   at least one sensor unit operable to measure radiofrequency (RF) data;
   an RF analysis engine operable to extract physical layer data from the measured RF data;
   wherein the RF analysis engine is operable to analyze or process extracted physical layer data from the measured RF data;
   wherein the at least one sensor unit and the RF analysis engine are provided on a chip, a chipset, multiple chips, multiple chipsets, or on a circuit board;
   wherein the chip, the chipset, the multiple chips, multiple chipsets, or the circuit board are provided on an electronic device;
   wherein the electronic device is operable to send the analyzed or processed extracted physical layer data to a distributed data unit (DDU), a centralized unit (CU), a radio unit (RU), and/or a Multi-Access Edge Computing (MEC) layer;
   wherein the analyzed or processed extracted physical layer data is used by the DDU, the CU, the RU, and/or MEC layer to create actionable data for spectrum sharing in the electromagnetic environment; and
   wherein the RF analysis engine includes a Fast Fourier Transform (FFT) engine operable to provide for a duty cycle using four streams and one second per stream to reduce calculations and provide for increased real-time sampling.

2. The system of claim 1, wherein the actionable data for spectrum sharing in the electromagnetic environment includes actionable data for modulation and/or demodulation, beam forming, and/or interference detection.

3. The system of claim 1, wherein the at least one sensor unit further includes a programmable rules and policy editor, wherein the programmable rules and policy editor is operable to communicate the analyzed or processed physical layer data to the MEC layer.

4. The system of claim 1, wherein the RF analysis engine includes a channelizer.

5. The system of claim 1, wherein the RF analysis engine includes a blind classification engine.

6. The system of claim 1, wherein the RF analysis engine is operable to perform a priori detection.

7. The system of claim 1, wherein the RF analysis engine is operable to provide Noise Floor Extension (NFE) for noise compensation.

8. The system of claim 1, wherein the electronic device is operable to send the analyzed or processed extracted physical layer data to the DDU, the CU, the RU, and/or the MEC layer in real-time.

9. The system of claim 1, wherein the analyzed or processed extracted physical layer data is used by the DDU, the CU, the RU, and/or MEC layer to create actionable data for spectrum sharing in the electromagnetic environment in real time.

10. The system of claim 1, wherein the at least one sensor unit is operable to perform data link aggregation of multiple physical layer data from multiple RUs.

11. The system of claim 1, wherein the electronic device is operable to change at least one physical layer parameter based on the analyzed or processed extracted physical layer data.

12. A system for spectrum utilization management in an electromagnetic environment comprising:
   at least one sensor unit operable to measure radiofrequency (RF) data;
   an RF analysis engine operable to extract physical layer data from the measured RF data;
   wherein the RF analysis engine is operable to analyze or process extracted physical layer data from the measured RF data;
   wherein the at least one sensor unit and the RF analysis engine are provided on a chip, a chipset, multiple chips, multiple chipsets, or on a circuit board;
   wherein the chip, the chipset, the multiple chips, multiple chipsets, or the circuit board are provided on an electronic device;
   wherein the electronic device is operable to send the analyzed or processed extracted physical layer data to a remote device;
   wherein the analyzed or processed extracted physical layer data is used by the remote device to create actionable data for spectrum sharing in the electromagnetic environment; and
   wherein the RF analysis engine includes a Fast Fourier Transform (FFT) engine operable to provide for a duty cycle using four streams and one second per stream to reduce calculations and provide for increased real-time sampling.

13. The system of claim 12, wherein the actionable data for spectrum sharing in the electromagnetic environment includes actionable data for real-time, dynamic spectrum sharing in the electromagnetic environment.

14. An apparatus for dynamic spectrum utilization management in an electromagnetic environment comprising:
   an electronic device including a chip, a chipset, multiple chips, multiple chipsets, or a circuit board;
   wherein the electronic device includes at least one sensor unit operable to measure radiofrequency (RF) data and an RF analysis engine operable to provide physical layer data based on the measured RF data;
   wherein the RF analysis engine is operable to analyze or process the extracted physical layer data from the measured RF data;

wherein the electronic device is operable to change at least one physical layer parameter based on the analyzed or processed extracted physical layer data; and wherein the RF analysis engine includes a Fast Fourier Transform (FFT) engine operable to provide for a duty cycle using four streams and one second per stream to reduce calculations and provide for increased real-time sampling.

15. The apparatus of claim 14, wherein the at least one sensor unit is operable to perform data link layer aggregation of multiple physical layer data from multiple RUs.

16. The apparatus of claim 14, wherein the RF analysis engine includes a channelizer.

17. The apparatus of claim 14, wherein the RF analysis engine is operable to perform a priori detection.

* * * * *